United States Patent
Fujisaki

(10) Patent No.: US 9,948,890 B1
(45) Date of Patent: *Apr. 17, 2018

(54) COMMUNICATION DEVICE

(71) Applicant: Iwao Fujisaki, Tokyo (JP)

(72) Inventor: Iwao Fujisaki, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/406,806

(22) Filed: Jan. 16, 2017

Related U.S. Application Data

(63) Continuation of application No. 14/857,862, filed on Sep. 18, 2015, now Pat. No. 9,549,150, which is a continuation of application No. 13/872,294, filed on Apr. 29, 2013, now Pat. No. 9,143,723, which is a continuation of application No. 13/472,382, filed on May 15, 2012, now Pat. No. 8,433,364, which is a continuation of application No. 12/549,417, filed on Aug. 28, 2009, now Pat. No. 8,208,954, which is a continuation of application No. 11/276,957, filed on Mar. 18, 2006, now abandoned.

(60) Provisional application No. 60/594,445, filed on Apr. 8, 2005.

(51) Int. Cl.
*H04M 3/42* (2006.01)
*H04N 7/14* (2006.01)
*H04M 1/725* (2006.01)
*G11B 27/00* (2006.01)

(52) U.S. Cl.
CPC ........... *H04N 7/147* (2013.01); *G11B 27/005* (2013.01); *H04M 1/72519* (2013.01)

(58) Field of Classification Search
CPC .. H04N 7/147; H04M 1/72519; G11B 27/005

USPC ................ 455/414.1, 414.2, 418, 419, 550.1
See application file for complete search history.

(56) References Cited

U.S. PATENT DOCUMENTS

| | | | |
|---|---|---|---|
| 4,934,773 A | 6/1990 | Becker | |
| 5,173,881 A | 12/1992 | Sindle | |
| 5,257,313 A | 10/1993 | Fujishita et al. | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,405,152 A | 4/1995 | Katanics et al. | |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |

(Continued)

FOREIGN PATENT DOCUMENTS

| | | | |
|---|---|---|---|
| GB | 2386027 A1 | 9/2003 | |
| JP | 2196373 A1 | 8/1990 | |

(Continued)

OTHER PUBLICATIONS

Audiovox, "Pocket PC Phone User Manual" published on May 19, 2004.*

(Continued)

*Primary Examiner* — Khai M Nguyen

(57) ABSTRACT

The communication device which includes a TV phone pausing visual data selecting implementer, a TV phone implementer, a TV phone pausing visual data transferring implementer, and a digital camera implementer.

18 Claims, 2 Drawing Sheets

(56) References Cited

U.S. PATENT DOCUMENTS

| | | |
|---|---|---|
| 5,530,472 A | 6/1996 | Bregman et al. |
| 5,539,810 A | 7/1996 | Kennedy et al. |
| 5,550,754 A | 8/1996 | McNelley et al. |
| 5,559,554 A | 9/1996 | Uekane et al. |
| 5,566,073 A | 10/1996 | Margolin |
| 5,625,675 A | 4/1997 | Katsumaru et al. |
| 5,629,741 A | 5/1997 | Hopper |
| 5,687,331 A | 11/1997 | Volk et al. |
| 5,758,280 A | 5/1998 | Kimura |
| 5,772,586 A | 6/1998 | Heinonen et al. |
| 5,778,304 A | 7/1998 | Grube et al. |
| 5,786,846 A | 7/1998 | Hiroaki |
| 5,796,338 A | 8/1998 | Mardirossian |
| 5,825,408 A | 10/1998 | Yuyama et al. |
| 5,844,824 A | 12/1998 | Newman et al. |
| 5,902,349 A | 5/1999 | Endo et al. |
| 5,903,706 A | 5/1999 | Wakabayashi et al. |
| 5,918,180 A | 6/1999 | Dimino |
| 5,924,040 A | 7/1999 | Trompower |
| 5,936,610 A | 8/1999 | Endo |
| 5,940,139 A | 8/1999 | Smoot |
| 5,959,661 A | 9/1999 | Isono |
| 6,009,336 A | 12/1999 | Harris et al. |
| 6,034,715 A | 3/2000 | Ishida et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt et al. |
| 6,094,237 A | 7/2000 | Hashimoto |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,195,089 B1 | 2/2001 | Chaney et al. |
| 6,198,942 B1 | 3/2001 | Hayashi et al. |
| 6,202,060 B1 | 3/2001 | Tran |
| 6,202,212 B1 | 3/2001 | Sturgeon et al. |
| 6,216,013 B1 | 4/2001 | Moore et al. |
| 6,216,158 B1 | 4/2001 | Luo et al. |
| 6,222,482 B1 | 4/2001 | Gueziec |
| 6,225,944 B1 | 5/2001 | Hayes |
| 6,226,500 B1 | 5/2001 | Nonami |
| 6,241,612 B1 | 6/2001 | Heredia |
| 6,243,039 B1 | 6/2001 | Elliot |
| 6,253,075 B1 | 6/2001 | Beghtol et al. |
| 6,255,988 B1 | 7/2001 | LeMense et al. |
| 6,282,435 B1 | 8/2001 | Wagner et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,311,077 B1 | 10/2001 | Bien |
| 6,366,651 B1 | 4/2002 | Griffith et al. |
| 6,385,465 B1 | 5/2002 | Yoshioka |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,412,112 B1 | 6/2002 | Barrett et al. |
| 6,421,470 B1 | 7/2002 | Nozaki et al. |
| 6,421,602 B1 | 7/2002 | Bullock et al. |
| 6,438,380 B1 | 8/2002 | Bi et al. |
| 6,442,404 B1 | 8/2002 | Sakajiri |
| 6,445,802 B1 | 9/2002 | Dan |
| 6,487,422 B1 | 11/2002 | Lee |
| 6,507,643 B1 | 1/2003 | Groner |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,542,750 B2 | 4/2003 | Hendrey et al. |
| 6,549,215 B2 | 4/2003 | Jouppi |
| 6,549,756 B1 | 4/2003 | Engstrom |
| 6,553,309 B2 | 4/2003 | Uchida et al. |
| 6,587,547 B1 | 7/2003 | Zirngibl et al. |
| 6,615,186 B1 | 9/2003 | Kolls |
| 6,618,704 B2 | 9/2003 | Kanevsky et al. |
| 6,630,958 B2 | 10/2003 | Tanaka et al. |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,668,177 B2 | 12/2003 | Salmimaa et al. |
| 6,678,366 B1 | 1/2004 | Burger et al. |
| 6,681,120 B1 | 1/2004 | Kim |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,701,162 B1 | 3/2004 | Everett |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,533 B2 | 4/2004 | Ishii |
| 6,763,226 B1 | 7/2004 | McZeal, Jr. |
| 6,772,174 B1 | 8/2004 | Pettersson |
| 6,773,344 B1 | 8/2004 | Gabai et al. |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,332 B1 | 9/2004 | Cook |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,259 B1 | 5/2005 | Blank nee Keller et al. |
| 6,898,321 B1 | 5/2005 | Knee et al. |
| 6,901,383 B1 | 5/2005 | Ricketts et al. |
| 6,905,414 B2 | 6/2005 | Daniell et al. |
| 6,912,544 B1 | 6/2005 | Weiner |
| 6,917,817 B1 | 7/2005 | Farrow et al. |
| 6,922,212 B2 | 7/2005 | Nakakubo et al. |
| 6,937,868 B2 | 8/2005 | Himmel et al. |
| 6,947,527 B2 | 9/2005 | Clark et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,970,178 B2 | 11/2005 | Tanioka et al. |
| 6,970,703 B2 | 11/2005 | Fuchs et al. |
| 6,973,628 B2 | 12/2005 | Asami |
| 6,992,699 B1 | 1/2006 | Vance et al. |
| 6,993,362 B1 | 1/2006 | Aberg |
| 6,993,474 B2 | 1/2006 | Curry et al. |
| 6,999,757 B2 | 2/2006 | Bates et al. |
| 7,003,598 B2 | 2/2006 | Kavanagh |
| 7,007,239 B1 | 2/2006 | Hawkins et al. |
| 7,012,999 B2 | 3/2006 | Ruckart et al. |
| 7,019,770 B1 | 3/2006 | Katz |
| 7,020,136 B1 | 3/2006 | Nibbeling |
| 7,028,077 B2 | 4/2006 | Toshimitsu et al. |
| 7,030,880 B2 | 4/2006 | Tanioka et al. |
| 7,035,666 B2 | 4/2006 | Silberfenig et al. |
| 7,058,356 B2 | 6/2006 | Slotznick |
| 7,065,525 B1 | 6/2006 | Sasaki et al. |
| 7,076,052 B2 | 7/2006 | Yoshimura |
| 7,081,832 B2 | 7/2006 | Nelson et al. |

(56) References Cited

U.S. PATENT DOCUMENTS

| | | |
|---|---|---|
| 7,085,578 B2 | 8/2006 | Barclay et al. |
| 7,085,739 B1 | 8/2006 | Winter et al. |
| 7,089,298 B2 | 8/2006 | Nyman et al. |
| 7,106,846 B2 | 9/2006 | Nguyen et al. |
| 7,107,081 B1 | 9/2006 | Fujisaki |
| 7,113,981 B2 | 9/2006 | Slate |
| 7,117,152 B1 | 10/2006 | Mukherji et al. |
| 7,126,951 B1 | 10/2006 | Belcea et al. |
| 7,127,238 B2 | 10/2006 | Vandermeijden et al. |
| 7,127,271 B1 | 10/2006 | Fujisaki |
| 7,130,630 B1 | 10/2006 | Moton, Jr. et al. |
| 7,130,791 B2 | 10/2006 | Ko |
| 7,139,555 B2 | 11/2006 | Apfel |
| 7,142,810 B2 | 11/2006 | Oesterling |
| 7,142,890 B2 | 11/2006 | Irimajiri et al. |
| 7,146,179 B2 | 12/2006 | Parulski et al. |
| 7,148,911 B1 | 12/2006 | Mitsui et al. |
| 7,174,171 B2 | 2/2007 | Jones |
| 7,224,792 B2 | 5/2007 | Fusco |
| 7,224,851 B2 | 5/2007 | Kinjo |
| 7,224,987 B1 | 5/2007 | Bhela et al. |
| 7,231,231 B2 | 6/2007 | Kokko et al. |
| 7,233,781 B2 | 6/2007 | Hunter et al. |
| 7,233,795 B1 | 6/2007 | Ryden |
| 7,240,093 B1 | 7/2007 | Danieli et al. |
| 7,245,293 B2 | 7/2007 | Hoshino et al. |
| 7,251,255 B1 | 7/2007 | Young |
| 7,254,408 B2 | 8/2007 | Kim |
| 7,260,416 B2 | 8/2007 | Shippee |
| 7,266,186 B1 | 9/2007 | Henderson |
| 7,269,413 B2 | 9/2007 | Kraft |
| 7,277,711 B2 | 10/2007 | Nyu |
| 7,283,845 B2 | 10/2007 | De Bast |
| 7,321,783 B2 | 1/2008 | Kim |
| 7,324,823 B1 | 1/2008 | Rosen et al. |
| 7,346,373 B2 | 3/2008 | Kim |
| 7,346,506 B2 | 3/2008 | Lueck et al. |
| 7,372,447 B1 | 5/2008 | Jacobsen et al. |
| 7,383,067 B2 | 6/2008 | Phillips et al. |
| 7,392,469 B1 | 6/2008 | Bailin |
| 7,394,969 B2 | 7/2008 | Sun et al. |
| 7,418,346 B2 | 8/2008 | Breed et al. |
| 7,433,845 B1 | 10/2008 | Flitcroft et al. |
| 7,444,168 B2 | 10/2008 | Nakagawa et al. |
| 7,450,709 B2 | 11/2008 | Gonzalez et al. |
| 7,451,084 B2 | 11/2008 | Funakura |
| 7,532,879 B1 | 5/2009 | Fujisaki |
| 7,536,707 B2 * | 5/2009 | Matsumoto ............. H04N 5/76 348/14.01 |
| 7,551,899 B1 | 6/2009 | Nicolas et al. |
| 7,642,929 B1 | 1/2010 | Pinkus et al. |
| 7,643,037 B1 | 1/2010 | Langmacher et al. |
| 7,657,252 B2 | 2/2010 | Futami |
| 7,686,693 B2 | 3/2010 | Danieli et al. |
| 7,707,592 B2 | 4/2010 | Wesslen et al. |
| 7,707,602 B2 | 4/2010 | Cragun et al. |
| 7,725,077 B2 | 5/2010 | Jung et al. |
| 7,752,188 B2 | 7/2010 | Lagerstedt et al. |
| 7,769,364 B2 | 8/2010 | Logan et al. |
| 7,787,857 B2 | 8/2010 | Peterman |
| 7,787,887 B2 | 8/2010 | Gupta et al. |
| 7,853,295 B1 | 12/2010 | Fujisaki |
| 7,853,297 B1 | 12/2010 | Fujisaki |
| 7,865,567 B1 | 1/2011 | Hendricks et al. |
| 7,873,349 B1 | 1/2011 | Smith et al. |
| 7,890,089 B1 | 2/2011 | Fujisaki |
| 7,890,136 B1 * | 2/2011 | Fujisaki ............. H04M 1/575 455/12.1 |
| 7,899,410 B2 | 3/2011 | Rakshani et al. |
| 7,922,086 B2 | 4/2011 | Jung et al. |
| 7,941,141 B2 | 5/2011 | Shoykhet et al. |
| 7,953,439 B2 | 5/2011 | Rofougaran |
| 7,970,414 B1 | 6/2011 | Werden et al. |
| 8,090,402 B1 | 1/2012 | Fujisaki |
| 8,099,108 B2 | 1/2012 | Camp et al. |
| 8,117,266 B2 | 2/2012 | Moore |
| 8,126,400 B2 | 2/2012 | Jung et al. |
| 8,145,040 B2 | 3/2012 | Toyoshima |
| 8,175,655 B1 | 5/2012 | Fujisaki |
| 8,208,954 B1 * | 6/2012 | Fujisaki ............. H04N 7/147 455/419 |
| 8,229,504 B1 | 7/2012 | Fujisaki |
| 8,260,313 B1 | 9/2012 | Wick et al. |
| 8,311,578 B1 | 11/2012 | Fujisaki |
| 8,312,660 B1 | 11/2012 | Fujisaki |
| 8,351,915 B2 | 1/2013 | Park et al. |
| 8,364,201 B1 | 1/2013 | Fujisaki |
| 8,433,300 B1 | 4/2013 | Fujisaki |
| 8,433,364 B1 * | 4/2013 | Fujisaki ............. H04N 7/147 455/419 |
| 8,452,307 B1 | 5/2013 | Fujisaki |
| 8,472,935 B1 | 6/2013 | Fujisaki |
| 8,559,983 B1 | 10/2013 | Fujisaki |
| 8,620,384 B1 | 12/2013 | Fujisaki |
| 8,744,515 B1 | 6/2014 | Fujisaki |
| 8,747,222 B2 | 6/2014 | Yamashita |
| 8,750,921 B1 | 6/2014 | Fujisaki |
| 8,755,838 B1 | 6/2014 | Fujisaki |
| 8,774,862 B1 | 7/2014 | Fujisaki |
| 8,781,526 B1 | 7/2014 | Fujisaki |
| 8,781,527 B1 | 7/2014 | Fujisaki |
| 8,805,442 B1 | 8/2014 | Fujisaki |
| 8,825,026 B1 | 9/2014 | Fujisaki |
| 8,825,090 B1 | 9/2014 | Fujisaki |
| 9,026,182 B1 | 5/2015 | Fujisaki |
| 9,049,556 B1 | 6/2015 | Fujisaki |
| 9,060,246 B1 | 6/2015 | Fujisaki |
| 9,143,723 B1 * | 9/2015 | Fujisaki ............. H04N 7/147 |
| 9,247,383 B1 | 1/2016 | Fujisaki |
| 9,549,150 B1 * | 1/2017 | Fujisaki ............. H04N 7/147 |
| 2001/0005826 A1 | 6/2001 | Shibuya |
| 2001/0011293 A1 | 8/2001 | Murakami et al. |
| 2001/0028350 A1 | 10/2001 | Matsuoka et al. |
| 2001/0029425 A1 | 10/2001 | Myr |
| 2001/0035829 A1 | 11/2001 | Yu et al. |
| 2001/0048364 A1 | 12/2001 | Kalthoff et al. |
| 2001/0049470 A1 | 12/2001 | Mault et al. |
| 2002/0002044 A1 | 1/2002 | Naruse et al. |
| 2002/0002705 A1 | 1/2002 | Byrnes et al. |
| 2002/0006804 A1 | 1/2002 | Mukai et al. |
| 2002/0009978 A1 | 1/2002 | Dukach et al. |
| 2002/0016724 A1 | 2/2002 | Yang et al. |
| 2002/0019225 A1 | 2/2002 | Miyashita |
| 2002/0022503 A1 | 2/2002 | Lee |
| 2002/0026348 A1 | 2/2002 | Fowler et al. |
| 2002/0028690 A1 | 3/2002 | McKenna et al. |
| 2002/0031120 A1 | 3/2002 | Rakib |
| 2002/0034292 A1 | 3/2002 | Tuoriniemi et al. |
| 2002/0036231 A1 | 3/2002 | Monaghan et al. |
| 2002/0037738 A1 | 3/2002 | Wycherley et al. |
| 2002/0038219 A1 | 3/2002 | Yanay et al. |
| 2002/0039914 A1 | 4/2002 | Hama et al. |
| 2002/0041262 A1 | 4/2002 | Mukai et al. |
| 2002/0047787 A1 | 4/2002 | Mikkola et al. |
| 2002/0049630 A1 | 4/2002 | Furuta et al. |
| 2002/0052754 A1 | 5/2002 | Joyce et al. |
| 2002/0054068 A1 | 5/2002 | Ellis et al. |
| 2002/0055872 A1 | 5/2002 | LaBrie et al. |
| 2002/0057765 A1 | 5/2002 | Hyziak et al. |
| 2002/0061767 A1 | 5/2002 | Sladen et al. |
| 2002/0065037 A1 | 5/2002 | Messina et al. |
| 2002/0065604 A1 | 5/2002 | Ishikawa et al. |
| 2002/0066115 A1 | 5/2002 | Wendelrup |
| 2002/0068558 A1 | 6/2002 | Janik |
| 2002/0068585 A1 | 6/2002 | Chan et al. |
| 2002/0068599 A1 | 6/2002 | Rodriguez et al. |
| 2002/0072395 A1 | 6/2002 | Miramontes |
| 2002/0077508 A1 | 6/2002 | Liu et al. |
| 2002/0077808 A1 | 6/2002 | Liu et al. |
| 2002/0080163 A1 | 6/2002 | Morey |
| 2002/0080942 A1 | 6/2002 | Clapper |
| 2002/0085700 A1 | 7/2002 | Metcalf |
| 2002/0094806 A1 | 7/2002 | Kamimura |
| 2002/0097984 A1 | 7/2002 | Abecassis |

(56) References Cited

U.S. PATENT DOCUMENTS

| | | |
|---|---|---|
| 2002/0098857 A1 | 7/2002 | Ishii |
| 2002/0102960 A1 | 8/2002 | Lechner |
| 2002/0103872 A1 | 8/2002 | Watanabe |
| 2002/0104095 A1 | 8/2002 | Nguyen et al. |
| 2002/0110246 A1 | 8/2002 | Gosior et al. |
| 2002/0115469 A1 | 8/2002 | Rekimoto et al. |
| 2002/0120718 A1 | 8/2002 | Lee |
| 2002/0123336 A1 | 9/2002 | Kamada |
| 2002/0127997 A1 | 9/2002 | Karlstedt et al. |
| 2002/0128000 A1 | 9/2002 | do Nascimento |
| 2002/0133342 A1 | 9/2002 | McKenna |
| 2002/0137470 A1 | 9/2002 | Baron et al. |
| 2002/0137503 A1 | 9/2002 | Roderique |
| 2002/0137526 A1 | 9/2002 | Shinohara |
| 2002/0141086 A1 | 10/2002 | Lang et al. |
| 2002/0142763 A1 | 10/2002 | Kolsky |
| 2002/0147645 A1 | 10/2002 | Alao et al. |
| 2002/0151326 A1 | 10/2002 | Awada et al. |
| 2002/0151327 A1 | 10/2002 | Levitt |
| 2002/0160724 A1 | 10/2002 | Arai et al. |
| 2002/0160836 A1 | 10/2002 | Watanabe et al. |
| 2002/0164975 A1 | 11/2002 | Lu |
| 2002/0164996 A1 | 11/2002 | Dorenbosch |
| 2002/0165850 A1 | 11/2002 | Roberts et al. |
| 2002/0173344 A1 | 11/2002 | Cupps et al. |
| 2002/0177407 A1 | 11/2002 | Mitsumoto |
| 2002/0178225 A1 | 11/2002 | Madenberg et al. |
| 2002/0183045 A1 | 12/2002 | Emmerson et al. |
| 2002/0183098 A1 | 12/2002 | Lee et al. |
| 2002/0191951 A1 | 12/2002 | Sodeyama et al. |
| 2002/0193997 A1 | 12/2002 | Fitzpatrick et al. |
| 2002/0198017 A1 | 12/2002 | Babasaki et al. |
| 2002/0198813 A1 | 12/2002 | Patterson, Jr. et al. |
| 2002/0198936 A1 | 12/2002 | McIntyre et al. |
| 2003/0003967 A1 | 1/2003 | Ito |
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0022715 A1 | 1/2003 | Okubo |
| 2003/0025788 A1 | 2/2003 | Beardsley |
| 2003/0032406 A1 | 2/2003 | Minear et al. |
| 2003/0037255 A1 | 2/2003 | Sameshima et al. |
| 2003/0037265 A1 | 2/2003 | Sameshima et al. |
| 2003/0038800 A1 | 2/2003 | Kawahara |
| 2003/0038893 A1 | 2/2003 | Rajamaki et al. |
| 2003/0045311 A1 | 3/2003 | Larikka et al. |
| 2003/0045329 A1 | 3/2003 | Kinoshita |
| 2003/0052964 A1 | 3/2003 | Priestman et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0074398 A1 | 4/2003 | Matsuo |
| 2003/0083055 A1 | 5/2003 | Riordan et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0100347 A1 | 5/2003 | Okada et al. |
| 2003/0107580 A1 | 6/2003 | Egawa et al. |
| 2003/0110450 A1 | 6/2003 | Sakai |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0144024 A1 | 7/2003 | Luo |
| 2003/0148772 A1 | 8/2003 | Ben-Ari |
| 2003/0149662 A1 | 8/2003 | Shore |
| 2003/0153355 A1 | 8/2003 | Warren |
| 2003/0156208 A1 | 8/2003 | Obradovich |
| 2003/0166399 A1 | 9/2003 | Tokkonen et al. |
| 2003/0169329 A1 | 9/2003 | Parker et al. |
| 2003/0201982 A1 | 10/2003 | Iesaka |
| 2003/0202504 A1 | 10/2003 | Dhara et al. |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0004616 A1 | 1/2004 | Konya et al. |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0060061 A1 | 3/2004 | Parker |
| 2004/0067751 A1 | 4/2004 | Vandermeijden et al. |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0100419 A1 | 5/2004 | Kato et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0137893 A1 | 7/2004 | Muthuswamy et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0196265 A1 | 10/2004 | Nohr |
| 2004/0198374 A1 | 10/2004 | Bajikar |
| 2004/0203520 A1 | 10/2004 | Schirtzinger et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0223049 A1 | 11/2004 | Taniguchi et al. |
| 2004/0235520 A1 | 11/2004 | Cadiz et al. |
| 2004/0242240 A1 | 12/2004 | Lin |
| 2004/0248586 A1 | 12/2004 | Patel et al. |
| 2004/0252197 A1 | 12/2004 | Fraley et al. |
| 2004/0259537 A1 | 12/2004 | Ackley |
| 2004/0264662 A1 | 12/2004 | Silver |
| 2004/0266418 A1 | 12/2004 | Kotzin |
| 2004/0267628 A1 | 12/2004 | Stillman |
| 2005/0004749 A1 | 1/2005 | Park |
| 2005/0032527 A1 | 2/2005 | Sheha et al. |

(56) References Cited

U.S. PATENT DOCUMENTS

| | | |
|---|---|---|
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0070336 A1 | 3/2005 | Tamura |
| 2005/0075097 A1 | 4/2005 | Lehikoinen et al. |
| 2005/0090768 A1 | 4/2005 | Brattesani et al. |
| 2005/0113080 A1 | 5/2005 | Nishimura |
| 2005/0113113 A1 | 5/2005 | Reed |
| 2005/0120225 A1 | 6/2005 | Kirsch et al. |
| 2005/0136949 A1 | 6/2005 | Barnes, Jr. |
| 2005/0144560 A1 | 6/2005 | Gruen et al. |
| 2005/0151877 A1 | 7/2005 | Fisher |
| 2005/0159189 A1 | 7/2005 | Iyer |
| 2005/0163289 A1 | 7/2005 | Caspi et al. |
| 2005/0164684 A1 | 7/2005 | Chen et al. |
| 2005/0165871 A1 | 7/2005 | Barrs, II et al. |
| 2005/0166242 A1 | 7/2005 | Matsumoto et al. |
| 2005/0186954 A1 | 8/2005 | Kenney |
| 2005/0192030 A1 | 9/2005 | Asthana et al. |
| 2005/0207555 A1 | 9/2005 | Lee et al. |
| 2005/0227731 A1 | 10/2005 | Kall |
| 2005/0235312 A1 | 10/2005 | Karaoguz et al. |
| 2005/0258958 A1 | 11/2005 | Lai |
| 2005/0261945 A1 | 11/2005 | Mougin et al. |
| 2005/0272448 A1 | 12/2005 | Tran et al. |
| 2005/0272504 A1 | 12/2005 | Eguchi et al. |
| 2005/0282582 A1 | 12/2005 | Slotznick et al. |
| 2005/0289589 A1 | 12/2005 | Vermola |
| 2006/0003813 A1 | 1/2006 | Seligmann et al. |
| 2006/0031407 A1 | 2/2006 | Dispensa et al. |
| 2006/0033809 A1 | 2/2006 | Farley |
| 2006/0035628 A1 | 2/2006 | Miller et al. |
| 2006/0041923 A1 | 2/2006 | McQuaide, Jr. |
| 2006/0044460 A1 | 3/2006 | Lee |
| 2006/0046714 A1 | 3/2006 | Kalavade |
| 2006/0052100 A1 | 3/2006 | Almgren |
| 2006/0059038 A1 | 3/2006 | Iuchi et al. |
| 2006/0084413 A1 | 4/2006 | Myoung |
| 2006/0114100 A1 | 6/2006 | Ghabra et al. |
| 2006/0121986 A1 | 6/2006 | Pelkey et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140353 A1 | 6/2006 | Jung |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0167677 A1 | 7/2006 | Bitzer |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0258396 A1 | 11/2006 | Matsuoka |
| 2006/0262911 A1 | 11/2006 | Chin et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015503 A1 | 1/2007 | Choi |
| 2007/0015550 A1 | 1/2007 | Kayanuma |
| 2007/0032255 A1 | 2/2007 | Koo et al. |
| 2007/0037605 A1 | 2/2007 | Logan |
| 2007/0050832 A1 | 3/2007 | Wright et al. |
| 2007/0061845 A1 | 3/2007 | Barnes |
| 2007/0070178 A1 | 3/2007 | Maghera |
| 2007/0097879 A1 | 5/2007 | Bleckert et al. |
| 2007/0099703 A1 | 5/2007 | Terebilo |
| 2007/0109262 A1 | 5/2007 | Oshima et al. |
| 2007/0135145 A1 | 6/2007 | Lee et al. |
| 2007/0135150 A1 | 6/2007 | Ushiki et al. |
| 2007/0142047 A1 | 6/2007 | Heeschen et al. |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 | 9/2007 | Cox |
| 2007/0262848 A1 | 11/2007 | Berstis et al. |
| 2007/0293240 A1 | 12/2007 | Drennan et al. |
| 2007/0296739 A1* | 12/2007 | Lonn ............... H04M 1/72555 345/634 |
| 2008/0006762 A1 | 1/2008 | Fadell et al. |
| 2008/0014917 A1 | 1/2008 | Rhoads et al. |
| 2008/0016534 A1 | 1/2008 | Ortiz et al. |
| 2008/0039125 A1 | 2/2008 | Fan et al. |
| 2008/0058005 A1 | 3/2008 | Zicker et al. |
| 2008/0070561 A1 | 3/2008 | Keum et al. |
| 2008/0070588 A1 | 3/2008 | Morin |
| 2008/0082930 A1 | 4/2008 | Omernick et al. |
| 2008/0104544 A1 | 5/2008 | Collins et al. |
| 2008/0109840 A1 | 5/2008 | Walter et al. |
| 2008/0139222 A1 | 6/2008 | Falvo et al. |
| 2008/0140686 A1 | 6/2008 | Hong et al. |
| 2008/0146272 A1 | 6/2008 | Rao et al. |
| 2008/0151696 A1 | 6/2008 | Giroud et al. |
| 2008/0167078 A1 | 7/2008 | Eibye |
| 2008/0172173 A1 | 7/2008 | Chang et al. |
| 2008/0176545 A1 | 7/2008 | Dicke et al. |
| 2008/0242271 A1 | 10/2008 | Schmidt et al. |
| 2008/0242283 A1 | 10/2008 | Ruckart |
| 2008/0254811 A1 | 10/2008 | Stewart |
| 2008/0299989 A1 | 12/2008 | King et al. |
| 2009/0017812 A1 | 1/2009 | Chan et al. |
| 2009/0047972 A1 | 2/2009 | Neeraj |
| 2009/0111486 A1 | 4/2009 | Burstrom |
| 2009/0124243 A1 | 5/2009 | Routley et al. |
| 2009/0150807 A1 | 6/2009 | George et al. |
| 2009/0153490 A1 | 6/2009 | Nymark et al. |
| 2009/0186628 A1 | 7/2009 | Yonker et al. |
| 2009/0221330 A1 | 9/2009 | Tomimori |
| 2009/0290369 A1 | 11/2009 | Schofield et al. |
| 2009/0319947 A1 | 12/2009 | Wang et al. |
| 2010/0030557 A1 | 2/2010 | Molloy et al. |
| 2010/0062740 A1 | 3/2010 | Ellis et al. |
| 2010/0079267 A1 | 4/2010 | Lin |
| 2010/0145700 A1 | 6/2010 | Kennewick et al. |
| 2011/0212714 A1 | 9/2011 | Lobzakov et al. |
| 2012/0059545 A1 | 3/2012 | Furuno et al. |
| 2012/0064874 A1 | 3/2012 | Pierce et al. |
| 2013/0298059 A1 | 11/2013 | Raskin |
| 2014/0071951 A1 | 3/2014 | Liu et al. |
| 2014/0323166 A1 | 10/2014 | Zhang et al. |
| 2015/0018091 A1 | 1/2015 | Suzuki et al. |

FOREIGN PATENT DOCUMENTS

| | | |
|---|---|---|
| JP | H10155141 A1 | 6/1998 |
| JP | H11/195137 A1 | 7/1999 |
| JP | 2001086558 A | 3/2001 |
| JP | 2002/252691 A1 | 9/2002 |
| JP | 2003/078977 A1 | 3/2003 |
| JP | 2003/228726 A1 | 8/2003 |
| JP | 2003/263656 A1 | 9/2003 |
| JP | 2005/216149 A1 | 8/2005 |
| WO | 01/31893 A1 | 5/2001 |
| WO | 2003001457 A1 | 1/2003 |
| WO | 2003096660 A1 | 11/2003 |

OTHER PUBLICATIONS

Fehily "Windows XP: Visual QuickStart Guide" published by Peachpit Press in 2003.
Casio, "Pocket PC User's Guide" published on Feb. 3, 2000.
Audiovox, "Pocket PC Phone User Manual" published on Mar. 19, 2004.
Palm, "Using your Treo" published in Feb. 2004.
Palm, "Palm Treo 600 Support Knowledge Library, Solution ID 29492" published in Jan. 2004.
Dataviz, "Documents to Go included on Treo 600 Smartphone from palmOne" published in Nov. 2003.
Palm, "Treo 600 smartphone" published in 2003.
FCC's wireless Enhanced 911 (E911) rules, Phase I and Phase II.

(56) References Cited

OTHER PUBLICATIONS

HI Corporation's company history (http://www.hicorp.co.jp/english/corporate/history.html) Copyright notice on the web: (c) 2007-2011 HI Corporation. All Rights Reserved.

HI Corporation to Offer 3D Graphics to Motorola Mobile Phone Platform Customers (http://www.wirelessdevnet.com/news/2003/203/news7.html) Published on the web on: Jul. 21, 2003.

Development of NTT docomo Mova N504i—NEC Gi-Ho (Technology Magazine) vol. 56 No. 5/2003, p. 144 Published in: May 2003.

Winners of Tokyo Venture Technology Grand Prize in 2000-2009 (http://www.sangyo-rodo.metro.tokyo.jp/shoko/sogyo/venture/2000-2009winners.pdf) Published in: 2000-2009.

\* cited by examiner

COMMUNICATION DEVICE

CROSS REFERENCE TO RELATED APPLICATIONS

This application is a continuation of U.S. Ser. No. 14/857,862 filed 2015 Sep. 18, which is a continuation of U.S. Ser. No. 13/872,294 filed 2013 Apr. 29, which is a continuation of U.S. Ser. No. 13/472,382 filed 2012 May 15, which is a continuation of U.S. Ser. No. 12/549,417 filed 2009 Aug. 28, which is a continuation of U.S. Ser. No. 11/276,957 filed 2006 Mar. 18 which claims the benefit of U.S. Provisional Application No. 60/594,445 filed 2005 Apr. 8, which is hereby incorporated herein by reference in its entirety. Further, U.S. Ser. No. 10/711,265 filed 2004 Sep. 7 (hereinafter the "Prior Filed Application") is hereby incorporated herein by reference in its entirety.

BACKGROUND OF INVENTION

The invention relates to communication device and more particularly to the communication device which is capable to communicate with another communication device in a wireless fashion.

U.S. Pat. No. 6,397,054 is introduced as prior art of the present invention of which the summary is the following: "A method is provided for communicating emergency messages using non-voice connections. An emergency short message service is added to digital wireless standards, such as GSM-based standards. This service allows users to place an emergency call with the specific purpose of sending an emergency data message using Short Message Service (SMS). Such data messages might include the caller's geographical position, electronic mail messages, or possibly, diagnostic information. As a result, the emergency data messaging will be given the same access conditions as voice emergency calls in a cellular or satellite communications system." However, the foregoing prior art does not disclose the communication device which includes a TV phone pausing visual data selecting implementer, a TV phone implementer, a TV phone pausing visual data transferring implementer, and a digital camera implementer.

SUMMARY OF INVENTION

It is an object of the present invention to provide a device capable to implement a plurality of functions. It is another object of the present invention to provide merchandise to merchants attractive to the customers in the U.S. It is another object of the present invention to provide mobility to the users of communication device. It is another object of the present invention to provide more convenience to the customers in the U.S. It is another object of the present invention to provide more convenience to the users of communication device or any tangible thing in which the communication device is fixedly or detachably (i.e., removably) installed. It is another object of the present invention to overcome the shortcomings associated with the foregoing prior arts. It is another object of the present invention to provide a device capable to implement a plurality of functions. The present invention introduces the communication device which includes a TV phone pausing visual data selecting implementer, a TV phone implementer, a TV phone pausing visual data transferring implementer, and a digital camera implementer.

BRIEF DESCRIPTION OF DRAWINGS

The above and other aspects, features, and advantages of the invention will be better understood by reading the following more particular description of the invention, presented in conjunction with the following drawing(s), wherein.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the figure numbers are cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

Figure 1:
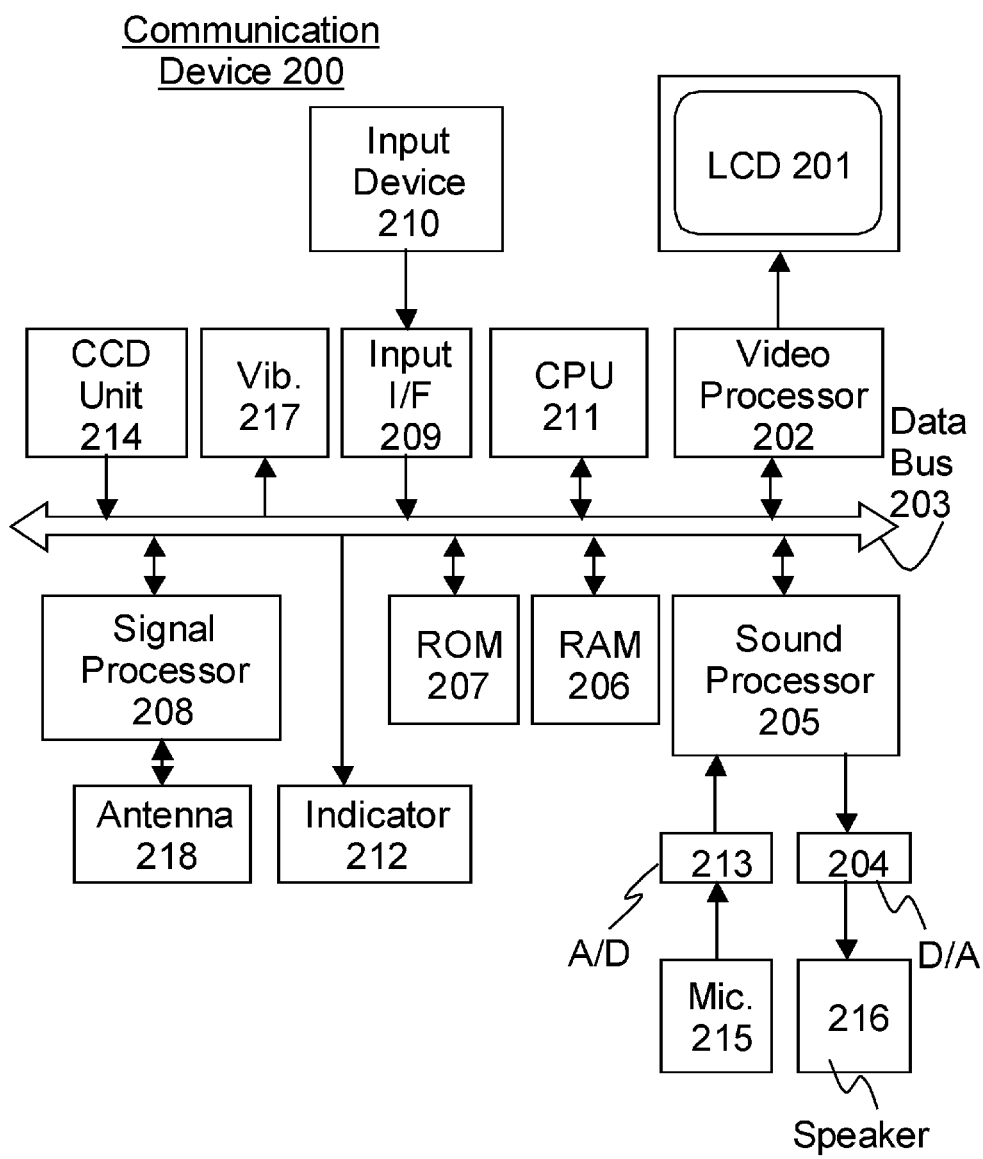
FIG. 1 is a block diagram illustrating an exemplary embodiment of the present invention.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

Figure 2:
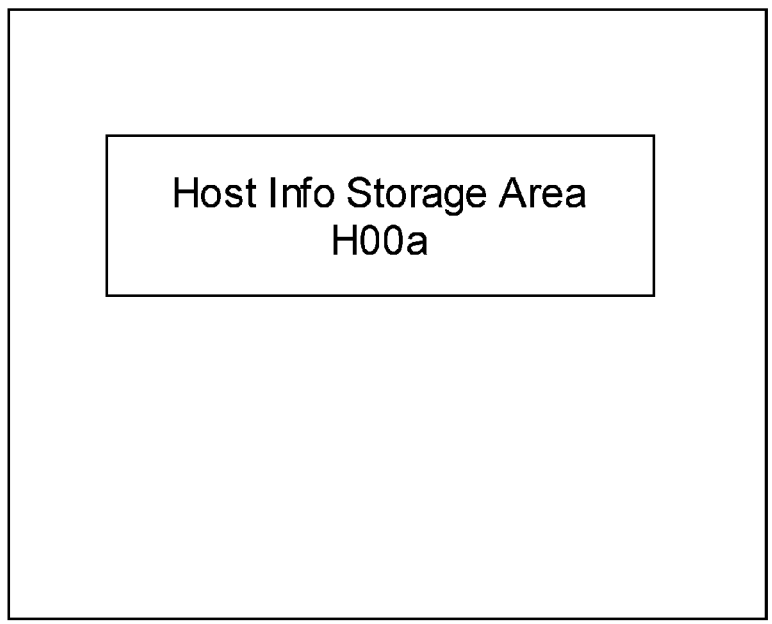
FIG. 2 is a block diagram illustrating an exemplary embodiment of the present invention.

FIG. 2 illustrates the data stored in Host H. As described in FIG. 2, Host H includes Host Information Storage Area H00a which stores various types of data to assist and/or co-operate with Communication Device 200 to implement all modes, functions, and systems described in this specification and the Prior Filed Application. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Word Processing Function>>

The following paragraphs illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

This paragraph illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described hereinafter, and the word processing function is activated (S3c) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

This paragraph illustrates the data stored in RAM 206 (FIG. 1). In this embodiment, the data to activate (as described in S3a of the previous paragraph) and to perform the communication mode is stored in Communication Data Storage Area 2061a, the data to activate (as described in S3b of the previous paragraph) and to perform the game download mode and the game play mode are stored in Game DL/Play Data Storage Area 2061b/2061c of which the details are described hereinafter, and the data to activate (as described in S3c of the previous paragraph) and to perform the word processing function is stored in Word Processing Information Storage Area 20617a.

This paragraph illustrates the data stored in Word Processing Information Storage Area 20617a. Word Processing Information Storage Area 20617a includes Word Processing Software Storage Area 20617b and Word Processing Data Storage Area 20617c. Word processing Software Storage Area 20617b stores the software programs described hereinafter, and Word Processing Data Storage Area 20617c stores a plurality of data described hereinafter.

This paragraph illustrates the software programs stored in Word Processing Software Storage Area 20617b. Word Processing Software Storage Area 20617b stores Alphanumeric Data Input Software 20617b1, Bold Formatting Software 20617b2, Italic Formatting Software 20617b3, Image Pasting Software 20617b4, Font Formatting Software 20617b5, Spell Check Software 20617b6, Underlining Software 20617b7, Page Numbering Software 20617b8, and Bullets And Numbering Software 20617b9. Alphanumeric Data Input Software 20617b1 inputs to a document a series of alphanumeric data in accordance to the input signals produced by utilizing Input Device 210 (FIG. 1) or via voice recognition system. Bold Formatting Software 20617b2 implements the bold formatting function which makes the selected alphanumeric data bold of which the sequence is described hereinafter. Italic Formatting Software 20617b3 implements the italic formatting function which makes the selected alphanumeric data italic of which the sequence is described hereinafter. Image Pasting Software 20617b4 implements the image pasting function which pastes the selected image to a document to the selected location of which the sequence is described hereinafter. Font Formatting Software 20617b5 implements the font formatting function which changes the selected alphanumeric data to the selected font of which the sequence is described hereinafter. Spell Check Software 20617b6 implements the spell check function which fixes spelling and grammatical errors of the alphanumeric data in a document of which the sequence is described hereinafter. Underlining Software 20617b7 implements the underlining function which adds the selected underlines to the selected alphanumeric data of which the sequence is described hereinafter. Page Numbering Software 20617*b*8 implements the page numbering function which adds page numbers at the selected location to each page of a document of which the sequence is described hereinafter. Bullets And Numbering Software 20617*b*9 implements the bullets and numbering function which adds the selected type of bullets and numbers to the selected paragraphs of which the sequence is described hereinafter.

This paragraph illustrates the data stored in Word Processing Data Storage Area 20617*c*. Word Processing Data Storage Area 20617*c* includes Alphanumeric Data Storage Area 20617*c*1, Bold Formatting Data Storage Area 20617*c*2, Italic Formatting Data Storage Area 20617*c*3, Image Data Storage Area 20617*c*4, Font Formatting Data Storage Area 20617*c*5, Spell Check Data Storage Area 20617*c*6, Underlining Data Storage Area 20617*c*7, Page Numbering Data Storage Area 20617*c*8, and Bullets And Numbering Data Storage Area 20617*c*9. Alphanumeric Data Storage Area 20617*c*1 stores the basic text and numeric data which are not decorated by bold and/or italic (the default font may be courier new). Bold Formatting Data Storage Area 20617*c*2 stores the text and numeric data which are decorated by bold. Italic Formatting Data Storage Area 20617*c*3 stores the text and numeric data which are decorated by italic. Image Data Storage Area 20617*c*4 stores the data representing the location of the image data pasted in a document and the image data itself. Font Formatting Data Storage Area 20617*c*5 stores a plurality of types of fonts, such as arial, century, courier new, tahoma, and times new roman, of all text and numeric data stored in Alphanumeric Data Storage Area 20617*c*1. Spell check Data Storage Area 20617*c*6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617*c*7 stores a plurality of data representing underlines of different types. Page Numbering Data Storage Area 20617*c*8 stores the data representing the location of page numbers to be displayed in a document and the page number of each page of a document. Bullets And Numbering Data Storage Area 20617*c*9 stores a plurality of data representing different types of bullets and numbering and the location which they are added.

This paragraph illustrates the sequence of the software program stored in Alphanumeric Data Input Software 20617*b*1. A plurality of alphanumeric data is input by utilizing Input Device 210 (FIG. 1) or via voice recognition system (S1). The corresponding alphanumeric data is retrieved from Alphanumeric Data Storage Area 20617*c*1 (S2), and the document including the alphanumeric data retrieved in S2 is displayed on LCD 201 (FIG. 1) (S3).

This paragraph illustrates the sequence of the software program stored in Bold Formatting Software 20617*b*2. One or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617*c*2 (S3), and replaces the alphanumeric data selected in S1 with the bold formatting data retrieved in S3 (S4). The document with the replaced bold formatting data is displayed on LCD 201 thereafter (S5).

This paragraph illustrates the sequence of the software program stored in Italic Formatting Software 20617*b*3. One or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617*c*3 (S3), and replaces the alphanumeric data selected in S1 with the italic formatting data retrieved in S3 (S4). The document with the replaced italic formatting data is displayed on LCD 201 thereafter (S5).

This paragraph illustrates the sequence of the software program stored in Image Pasting Software 20617*b*4. The image to be pasted is selected by utilizing Input Device 210 (FIG. 1) or via voice recognition system (S1). Here, the image may be of any type, such as JPEG, GIF, and TIFF. Next the location in a document where the image is to be pasted is selected by utilizing Input Device 210 or via voice recognition system (S2). The data representing the location is stored in Image Pasting Data Storage Area 20617*c*4. The image is pasted at the location selected in S2 and the image is stored in Image Pasting Data Storage Area 20617*c*4 (S3). The document with the pasted image is displayed on LCD 201 (FIG. 1) thereafter (S4).

This paragraph illustrates the sequence of the software program stored in Font Formatting Software 20617*b*5. One or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617*c*5 (S3), and replaces the alphanumeric data selected in S1 with the font formatting data retrieved in S3 (S4). The document with the replaced font formatting data is displayed on LCD 201 thereafter (S5).

This paragraph illustrates the sequence of the software program stored in Spell Check Software 20617*b*6. CPU 211 (FIG. 1) scans all alphanumeric data in a document (S1). CPU 211 then compares the alphanumeric data with the spell check data stored in Spell Check Data Storage Area 20617*c*6, i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4).

This paragraph illustrates the sequence of the software program stored in Underlining Software 20617*b*7. One or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617*c*7 (S3), and adds to the alphanumeric data selected in S1 (S4). The document with underlines added to the selected alphanumeric data is displayed on LCD 201 thereafter (S5).

This paragraph illustrates the sequence of the software program stored in Page Numbering Software 20617b8. A page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617c8, and adds the page number to each page of a document at the selected location (S3). The document with page numbers is displayed on LCD 201 thereafter (S4).

This paragraph illustrates the sequence of the software program stored in Bullets And Numbering Software 20617b9. A paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617c9, and adds the bullets and/or numbering to the selected paragraph of a document (S3). The document with the bullets and/or numbering is displayed on LCD 201 thereafter (S4).

<<Start Up Software Function>>

The following paragraphs illustrate the start up software program function which enables Communication Device 200 to automatically activate (or start up) the registered software programs when the power is on.

This paragraph illustrates the overall sequence of the present function. The user of Communication Device 200 presses the power button of Communication Device 200 (S1). Then the predetermined software programs automatically activate (or start up) without having any instructions from the user of Communication Device 200 (S2).

This paragraph illustrates the storage area included RAM 206 (FIG. 1). RAM 206 includes Start Up Information Storage Area 20621a which is described hereinafter.

This paragraph illustrates the storage areas included in Start Up Information Storage Area 20621a. Start Up Information Storage Area 20621a includes Start Up Software Storage Area 20621b and Start Up Data Storage Area 20621c. Start Up Software Storage Area 20621b stores the software programs necessary to implement the present function, such as the ones described hereinafter. Start Up Data Storage Area 20621c stores the data necessary to implement the present function, such as the ones described hereinafter.

This paragraph illustrates the software programs stored in Start Up Software Storage Area 20621b. Start Up Software Storage Area 20621b stores Power On Detecting Software 20621b1, Start Up Data Storage Area Scanning Software 20621b2, and Start Up Software Activating Software 20621b3. Power On Detecting Software 20621b1 detects whether the power of Communication Device 200 is on of which the sequence is described hereinafter, Start Up Data Storage Area Scanning Software 20621b2 identifies the software programs which are automatically activated of which the sequence is described hereinafter, and Start Up Software Activating Software 20621b3 activates the identified software programs identified by Start Up Data Storage Area Scanning Software 20621b2 of which the sequence is described hereinafter.

This paragraph illustrates the storage area included in Start Up Data Storage Area 20621c. Start Up Data Storage Area 20621c includes Start Up Software Index Storage Area 20621c1. Here, Start Up Software Index Storage Area 20621c1 stores the software program indexes, wherein a software program index is an unique information assigned to each software program as an identifier (e.g., title of a software program) of which the details are explained hereinafter.

This paragraph illustrates the data stored in Start Up Software Index Storage Area 20621c1. Start Up Software Index Storage Area 20621c1 stores the software program indexes of the software programs which are automatically activated by the present function. Here, the software programs may be any software programs explained in this specification. Three software program indexes, i.e., Start Up Software Index 20621c1a, Start Up Software Index 20621c1b, and Start Up Software Index 20621c1c, are stored in Start Up Software Index Storage Area 20621c1 in the present example. The software program indexes can be created and store in Start Up Software Index Storage Area 20621c1 manually by utilizing input device 210 (FIG. 1) or via voice recognition system.

This paragraph illustrates the sequence of Power On Detecting Software 20621b1 stored in Start Up Software Storage Area 20621b. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621b2 of which the sequence is explained hereinafter.

This paragraph illustrates the sequence of Start Up Data Storage Area Scanning Software 20621b2 stored in Start Up Software Storage Area 20621b. CPU 211 (FIG. 1) scans Start Up Software Index Storage Area 20621c1 (S1), and identifies the software programs which are automatically activated (S2). CPU 211 activates Start Up Software Activating Software 20621b3 thereafter of which the sequence is explained hereinafter (S3).

This paragraph illustrates the sequence of Start Up Software Activating Software 20621b3 stored in Start Up Software Storage Area 20621b. CPU 211 (FIG. 1) activates the software programs of which the software program indexes are identified in S2 described hereinbefore (S1).

This paragraph illustrates another embodiment wherein the three software programs stored in Start Up Software Storage Area 20621b (i.e., Power On Detecting Software 20621b1, Start Up Data Storage Area Scanning Software 20621b2, Start Up Software Activating Software 20621b3) is integrated into one software program stored therein. CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621c1 (S3), and identifies the software programs which are automatically activated (S4). CPU 211 activates the software programs thereafter of which the software program indexes are identified in S4 (S5).

As another embodiment, the software programs per se (not the software program indexes described hereinbefore may be stored in a specific storage area which are activated by the present function.

As another embodiment, the present function may be implemented at the time the user of Communication Device 200 logs on instead of at the time the Communication Device 200 is powered as described in S2 described hereinbefore.

<<Stereo Audio Data Output Function>>

The following paragraphs illustrate the stereo audio data output function which enables Communication Device 200 to output audio data from Speakers 216L and 216R in a stereo fashion.

This paragraph illustrates the storage area included in Host Data Storage Area H00c of Host H. In this embodiment, Host Data Storage Area H00c includes Stereo Audio Information Storage Area H22a. Stereo Audio Information Storage Area H22a stores the software programs and data necessary to implement the present function as described in details hereinafter.

This paragraph illustrates the storage areas included in Stereo Audio Information Storage Area H22a. In this embodiment, Stereo Audio Information Storage Area H22a includes Stereo Audio Software Storage Area H22b and Stereo Audio Data Storage Area H22c. Stereo Audio Software Storage Area H22b stores the software programs necessary to implement the present function, such as the one described hereinafter. Stereo Audio Data Storage Area H22c stores the data necessary to implement the present function, such as the ones described hereinafter.

This paragraph illustrates the stereo audio data stored in Stereo Audio Data Storage Area H22c. A plurality of stereo audio data are stored in Stereo Audio Data Storage Area H22c. In this embodiment, three stereo audio data, i.e., Stereo Audio Data H22c1, Stereo Audio Data H22c2, and Stereo Audio Data H22c3 are stored therein.

This paragraph illustrates the components of the stereo audio data stored in Stereo Audio Data Storage Area H22c. This paragraph describes the components of Stereo Audio Data H22c1 as an example. In this embodiment, Stereo Audio Data H22c1 includes Left Speaker Audio Data H22c1L, Right Speaker Audio Data H22c1R, and Stereo Audio Data Output Timing Data H22c1T. Left Speaker Audio Data H22c1L is an audio data which is designed to be output from Speaker 216L. Right Speaker Audio Data H22c1R is an audio data which is designed to be output from Speaker 216R. Stereo Audio Data Output Timing Data H22c1T is a timing data which is utilized to synchronize the output of both Left Speaker Audio Data H22c1L and Right Speaker Audio Data H22c1R from Speaker 216R and Speaker 216L respectively.

This paragraph illustrates the sequence of the software program stored in Stereo Audio Software Storage Area H22b. In this embodiment, the software program stored in Stereo Audio Software Storage Area H22b extracts one of the stereo audio data stored in Stereo Audio Data Storage Area H22c and creates Transferred Stereo Audio Data TSAD for purposes of transferring the extracted stereo audio data to Communication Device 200 (S1).

This paragraph illustrates the components of Transferred Stereo Audio Data TSAD created by the software program stored in Stereo Audio Software Storage Area H22b. In this embodiment, Transferred Stereo Audio Data TSAD is composed of Header TSAD1, Com Device ID TSAD2, Host ID TSAD3, Transferred Stereo Audio Data TSAD4, and Footer TSAD5. Com Device ID TSAD2 indicates the identification of Communication Device 200, Host ID TSAD3 indicates the identification of Host H, and Transferred Stereo Audio Data TSAD4 is the stereo audio data extracted in the manner described hereinbefore. Header TSAD1 and Footer TSAD5 indicate the beginning and the end of Transferred Stereo Audio Data TSAD.

This paragraph illustrates the storage area included in RAM 206 (FIG. 1) of Communication Device 200. In this embodiment, RAM 206 includes Stereo Audio Information Storage Area 20622a. Stereo Audio Information Storage Area 20622a stores the software programs and data necessary to implement the present function as described in details hereinafter.

This paragraph illustrates the storage areas included in Stereo Audio Information Storage Area 20622a. In this embodiment, Stereo Audio Information Storage Area 20622a includes Stereo Audio Software Storage Area 20622b and Stereo Audio Data Storage Area 20622c. Stereo Audio Software Storage Area 20622b stores the software programs necessary to implement the present function, such as the ones described hereinafter. Stereo Audio Data Storage Area 20622c stores the data necessary to implement the present function, such as the ones described hereinafter.

This paragraph illustrates the stereo audio data stored in Stereo Audio Data Storage Area 20622c. A plurality of stereo audio data are stored in Stereo Audio Data Storage Area 20622c. In this embodiment, three stereo audio data, i.e., Stereo Audio Data 20622c1, Stereo Audio Data 20622c2, and Stereo Audio Data 20622c3 are stored therein.

This paragraph illustrates the components of the stereo audio data stored in Stereo Audio Data Storage Area 20622c. This paragraph describes the components of Stereo Audio Data 20622c1 as an example. In this embodiment, Stereo Audio Data 20622c1 includes Left Speaker Audio Data 20622c1L, Right Speaker Audio Data 20622c1R, and Stereo Audio Data Output Timing Data 20622c1T. Left Speaker Audio Data 20622c1L is an audio data which is designed to be output from Speaker 216L. Right Speaker Audio Data 20622c1R is an audio data which is designed to be output from Speaker 216R. Stereo Audio Data Output Timing Data 20622c1T is a timing data which is utilized to synchronize the output of both Left Speaker Audio Data 20622c1L and Right Speaker Audio Data 20622c1R from Speaker 216R and Speaker 216L respectively.

The downloaded stereo audio data are stored in specific area(s) of Stereo Audio Data Storage Area 20622c.

This paragraph illustrates the sequence of selecting and preparing to output the stereo audio data from Speakers 216L and 216R in a stereo fashion. In this embodiment, a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622c1 is selected in S2, CPU 211 (FIG. 1) retrieves Left Speaker Audio Data 20622c1L (S3), Right Speaker Audio Data 20622c1R (S4), and Stereo Audio Data Output Timing Data 20622c1T from Stereo Audio Data Storage Area 20622c (S5).

This paragraph illustrates the sequence of outputting the stereo audio data from Speakers 216L and 216R in a stereo fashion. In this embodiment, the user of Communication Device 200 inputs a specific signal to output the stereo audio data by utilizing Input Device 210 (FIG. 1) or via voice recognition system (S1). Assuming Audio Data 20622c1 is selected in S2 described hereinbefore, CPU 211 outputs Left Speaker Audio Data 20622c1L and Right Speaker Audio Data 20622c1R from Speakers 216L and 216R respectively in a stereo fashion in accordance with Stereo Audio Data Output Timing Data 20622c1T (S2).

<<SOS Calling Function>>

The following paragraphs illustrate the SOS calling function which enables Communication Device 200 to notify the police department the current location of Communication Device 200 and the personal information of the user of Communication Device 200 when a 911 call is dialed from Communication Device 200.

This paragraph illustrates the storage area included in Host Information Storage Area H00a. Host Information Storage Area H00a includes SOS Calling Information Storage Area H29a of which the data stored therein are described hereinafter.

This paragraph illustrates the storage areas included in SOS Calling Information Storage Area H29a. SOS Calling Information Storage Area H29a includes SOS Calling Data Storage Area H29b and SOS Calling Software Storage Area H29c. SOS Calling Data Storage Area H29b stores the data necessary to implement the present function, such as the ones described hereinafter. SOS Calling Software Storage Area H29c stores the software programs necessary to implement the present function, such as the ones described hereinafter.

This paragraph illustrates the storage area included in SOS Calling Data Storage Area H29b. SOS Calling Data Storage Area H29b includes Police Department Location Data Storage Area H29b1 of which the data stored therein are described hereinafter.

This paragraph illustrates the data stored in Police Department Location Data Storage Area H29b1. Police Department Location Data Storage Area H29b1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the present example, H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

The data and/or the software programs necessary to implement the present function on the side of Communication Device 200 as described hereinafter may be downloaded from Host H.

This paragraph illustrates the storage area included in RAM 206 (FIG. 1) of Communication Device 200. RAM 206 includes SOS Calling Information Storage Area 20629a of which the details are described hereinafter.

This paragraph illustrates the storage areas included in SOS Calling Information Storage Area 20629a. SOS Calling Information Storage Area 20629a includes SOS Calling Data Storage Area 20629b and SOS Calling Software Storage Area 20629c. SOS Calling Data Storage Area 20629b includes data necessary to implement the present function, such as the ones described hereinafter. SOS Calling Software Storage Area 20629c stores the software programs necessary to implement the present function, such as the one described hereinafter.

This paragraph illustrates storage areas included in SOS Calling Data Storage Area 20629b. SOS Calling Data Storage Area 20629b includes GPS Data Storage Area 20629b1 and User Data Storage Area 20629b2. GPS Data Storage Area 20629b1 stores the data regarding the current geographical location produced by the method so-called GPS as described hereinbefore. User Data Storage Area 20629b2 stores the data regarding the personal information of the user of Communication Device 200 as described hereinafter.

This paragraph illustrates the data stored in User Data Storage Area 20629b2. User Data Storage Area 20629b2 includes User Data 20629UD which includes data regarding the personal information of the user of Communication Device 200. In the present example, User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200.

This paragraph illustrates the software program stored in SOS Calling Software Storage Area 20629c. When the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629b1 (S3). CPU 211 then retrieves User Data 20629UD from User Data Storage Area 20629b2 and the GPS data from GPS Data Storage Area 20629b1 (S4), and composes SOS Data 20629SOS therefrom (S5), which is sent thereafter to Host H (S6).

This paragraph illustrates the elements of SOS Data 20629SOS. SOS Data 20629SOS comprises Connection Request 20629CR, GPS Data 20629GD, and User Data 20629UD. Connection Request 20629CR represents a request to Host H to forward the 911 call to a police department. GPS Data 20629GD is a data retrieved from GPS Data Storage Area 20629b1 as described in S4 described hereinbefore. User Data 20629UD is a data retrieved from User Data Storage Area 20629b2 as described in S4 described hereinbefore.

This paragraph illustrates the software program stored in SOS Calling Software Storage Area H29c of Host H. Host H periodically checks the incoming call (S1). If the incoming call is SOS Data 20629SOS (S2), Host H initiates the SOS calling process as described hereinafter (S3).

This paragraph illustrates the software program stored in SOS Calling Software Storage Area H29c of Host H. Host H retrieves GPS Data 20629GD from SOS Data 20629SOS (S1), and selects the closest police department by comparing GPS Data 20629GD and the data stored in column Location Data of Police Department Location Data Storage Area H29b1 of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4).

As another embodiment, User Data 20629UD stored in User Data Storage Area 20629b2 may be stored in SOS Calling Data Storage Area H29b of Host H. In this embodiment, SOS Data 20629SOS primarily comprises Connection Request 20629CR and GPS Data 20629GD, and User Data 20629UD is retrieved from SOS Calling Data Storage Area H29b of Host H, which is sent to the police department in S4 described hereinbefore.

<<Audiovisual Playback Function>>

The following paragraphs illustrate the audiovisual playback function which enables Communication Device 200 to playback audiovisual data, such as movies, soap operas, situation comedies, news, and any type of TV programs.

This paragraph illustrates the information stored in RAM 206 (FIG. 1). RAM 206 includes Audiovisual Playback Information Storage Area 20632a of which the information stored therein are described hereinafter.

The data and/or the software programs necessary to implement the present function may be downloaded to Communication Device 200 from Host H.

This paragraph illustrates the data and software programs stored in Audiovisual Playback Information Storage Area 20632a. Audiovisual Playback Information Storage Area 20632a includes Audiovisual Playback Data Storage Area 20632b and Audiovisual Playback Software Storage Area 20632c. Audiovisual Playback Data Storage Area 20632b stores the data necessary to implement the present function, such as the ones described hereinafter. Audiovisual Playback Software Storage Area 20632c stores the software programs necessary to implement the present function, such as the ones described hereinafter.

This paragraph illustrates the data stored in Audiovisual Playback Data Storage Area 20632b. Audiovisual Playback Data Storage Area 20632b includes Audiovisual Data Storage Area 20632b1 and Message Data Storage Area 20632b2. Audiovisual Data Storage Area 20632b1 stores a plurality of audiovisual data described hereinafter. Message Data Storage Area 20632b2 stores a plurality of message data described hereinafter.

This paragraph illustrates the audiovisual data stored in Audiovisual Data Storage Area 20632b1. Audiovisual Data Storage Area 20632b1 stores a plurality of audiovisual data wherein the audiovisual data stored therein in the present example are: Audiovisual Data 20632b1a, Audiovisual Data 20632b1b, Audiovisual Data 20632b1c, and Audiovisual Data 20632b1d, all of which are primarily composed of video data and audio data. Audiovisual Data 20632b1a is a movie, Audiovisual Data 20632b1b is a soap opera, Audiovisual Data 20632b1c is a situation comedy, Audiovisual Data 20632b1d is TV news in the present embodiment. As another embodiment, Audiovisual Data 20632b1d may be an audiovisual data taken via CCD Unit 214 (FIG. 1) and Microphone 215 (FIG. 1).

This paragraph illustrates the data stored in Message Data Storage Area 20632b2. Message Data Storage Area 20632b2 includes Start Message Text Data 20632b2a, Stop Message Text Data 20632b2b, Pause Message Text Data 20632b2c, Resume Message Text Data 20632b2c1, Slow Replay Message Text Data 20632b2d, Forward Message Text Data 20632b2e, Rewind Message Text Data 20632b2f, Next Message Text Data 20632b2g, and Previous Message Text Data 20632b2h. Start Message Text Data 20632b2a is a text data which is displayed on LCD 201 (FIG. 1) and which indicates that the playback of an audiovisual data is initiated. Stop Message Text Data 20632b2b is a text data which is displayed on LCD 201 and which indicates that the playback process of an audiovisual data is stopped. Pause Message Text Data 20632b2c is a text data which is displayed on LCD 201 and which indicates that the playback process of an audiovisual data is paused. Resume Message Text Data 20632b2c1 is a text data which is displayed on LCD 201 and which indicates that the playback process of an audiovisual data is resumed from the point it is paused. Slow Replay Message Text Data 20632b2d is a text data which is displayed on LCD 201 and which indicates that the playback process of an audiovisual data is implemented in a slow motion. Fast-Forward Message Text Data 20632b2e is a text data which is displayed on LCD 201 and which indicates that an audiovisual data is fast-forwarded. Fast-Rewind Message Text Data 20632b2f is a text data which is displayed on LCD 201 and which indicates that an audiovisual data is fast-rewinded. Next Message Text Data 20632b2g is a text data which is displayed on LCD 201 and which indicates that the playback process of the next audiovisual data stored in Audiovisual Data Storage Area 20632b1 is initiated. Previous Message Text Data 20632b2h is a text data which is displayed on LCD 201 and which indicates that the playback process of the previous audiovisual data stored in Audiovisual Data Storage Area 20632b1 is initiated.

This paragraph illustrates the software programs stored in Audiovisual Playback Software Storage Area 20632c. Audiovisual Playback Software Storage Area 20632c includes Audiovisual Start Software 20632c1, Audiovisual Stop Software 20632c2, Audiovisual Pause Software 20632c3, Audiovisual Resume Software 20632c3a, Audiovisual Slow Replay Software 20632c4, Audiovisual Fast-Forward Software 20632c5, Audiovisual Fast-Rewind Software 20632c6, Audiovisual Next Software 20632c7, and Audiovisual Previous Software 20632c8. Audiovisual Start Software 20632c1 is a software program which initiates the playback process of an audiovisual data. Audiovisual Stop Software 20632c2 is a software program which stops the playback process of an audiovisual data. Audiovisual Pause Software 20632c3 is a software program which pauses the playback process of an audiovisual data. Audiovisual Resume Software 20632c3a is a software program which resumes the playback process of the audiovisual data from the point it is paused by Audiovisual Pause Software 20632c3. Audiovisual Slow Replay Software 20632c4 is a software program which implements the playback process of an audiovisual data in a slow motion. Audiovisual Fast-Forward Software 20632c5 is a software program which fast-forwards an audiovisual data. Audiovisual Fast-Rewind Software 20632c6 is a software program which fast-rewinds an audiovisual data. Audiovisual Next Software 20632c7 is a software program which initiates the playback process of the next audiovisual data stored in Audiovisual Data Storage Area 20632b1. Audiovisual Previous Software 20632c8 is a software program which initiates the playback process of the previous audiovisual data stored in Audiovisual Data Storage Area 20632b1.

This paragraph illustrates the messages displayed on LCD 201 (FIG. 1). Eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20632b2a, 'Stop' is Stop Message Text Data 20632b2b, 'Pause' is Pause Message Text Data 20632b2c, 'Resume' is Resume Message Text Data 20632b2c1, 'Slow Reply' is Slow Replay Message Text Data 20632b2d, 'Fast-Forward' is Fast-Forward Message Text Data 20632b2e, 'Fast-Rewind' is Fast-Rewind Message Text Data 20632b2f, 'Next' is Next Message Text Data 20632b2g, 'Previous' is Previous Message Text Data 20632b2h described hereinbefore.

This paragraph illustrates Audiovisual Selecting Software 20632c9 stored in Audiovisual Playback Software Storage Area 20632c in preparation of executing the software programs described hereinafter. CPU 211 (FIG. 1) retrieves the identifications of the audiovisual data stored in Audiovisual Data Storage Area 20632b1 (S1). CPU 211 then displays a list of the identifications on LCD 201 (FIG. 1) (S2). A particular audiovisual data is selected by utilizing Input Device 210 (FIG. 1) or via voice recognition system (S3).

The following paragraphs illustrate the software programs stored in Audiovisual Playback Software Storage Area 20632c. Nine types of input signals can be input by utilizing Input Device 210 (FIG. 1) or via voice recognition system, i.e., the audiovisual playback signal, the audiovisual stop signal, the audiovisual pause signal, the audiovisual resume signal, the audiovisual slow replay signal, the audiovisual fast-forward signal, the audiovisual fast-rewind signal, the audiovisual next signal, and the audiovisual previous signal. The audiovisual playback signal indicates to initiate the playback process of the audiovisual data selected in S3 described hereinbefore. The audiovisual stop signal indicates to stop the playback process of the audiovisual data selected in S3 described hereinbefore. The audiovisual pause signal indicates to pause the playback process of the audiovisual data selected in S3 described hereinbefore. The audiovisual resume signal indicates to resume the playback process of the audiovisual data selected in S3 described hereinbefore from the point the audio data is paused. The audiovisual slow replay signal indicates to implement the playback process of the audiovisual data selected in S3 described hereinbefore in a slow motion. The audiovisual fast-forward signal indicates to fast-forward the audiovisual data selected in S3 described hereinbefore. The audiovisual fast-rewind signal indicates to fast-rewind the audiovisual data selected in S3 described hereinbefore. The audiovisual next signal indicates to initiate the playback process of the next audiovisual data of the audiovisual data selected in S3 described hereinbefore both of which are stored in Audiovisual Data Storage Area 20632b1. The audiovisual previous signal indicates to initiate the playback process of the previous audiovisual data of the audiovisual data selected in S3 described hereinbefore both of which are stored in Audiovisual Data Storage Area 20632b1.

This paragraph illustrates Audiovisual Start Software 20632c1 stored in Audiovisual Playback Software Storage Area 20632c which initiates the playback process of the audiovisual data selected in S3 described hereinbefore. The audiovisual playback signal is input by utilizing Input Device 210 (FIG. 1) or via voice recognition system (S1). CPU 211 (FIG. 1) then initiates the playback process (i.e., outputs the audio data from Speaker 216 (FIG. 1) and display the video data on LCD 201 (FIG. 1)) of the audiovisual data selected in S3 described hereinbefore (S2), and retrieves Start Message Text Data 20632b2a from Message Data Storage Area 20632b2 and displays the data on LCD 201 (FIG. 1) for a specified period of time (S3).

This paragraph illustrates Audiovisual Stop Software 20632c2 stored in Audiovisual Playback Software Storage Area 20632c which stops the playback process of the audiovisual data selected in S3 described hereinbefore. The audiovisual stop signal is input by utilizing Input Device 210 (FIG. 1) or via voice recognition system (S1). CPU 211 (FIG. 1) then stops the playback process of the audiovisual data selected in S3 described hereinbefore (S2), and retrieves Stop Message Text Data 20632b2b from Message Data Storage Area 20632b2 and displays the data on LCD 201 (FIG. 1) for a specified period of time (S3).

This paragraph illustrates Audiovisual Pause Software 20632c3 stored in Audiovisual Playback Software Storage Area 20632c which pauses the playback process of the audiovisual data selected in S3 described hereinbefore. The audiovisual pause signal is input by utilizing Input Device 210 (FIG. 1) or via voice recognition system (S1). CPU 211 (FIG. 1) then pauses the playback process of the audiovisual data selected in S3 described hereinbefore (S2), and retrieves Pause Message Text Data 20632b2c from Message Data Storage Area 20632b2 and displays the data on LCD 201 (FIG. 1) for a specified period of time (S3) When the playback process is paused in S2, the audio data included in the audiovisual data is refrained from being output from Speaker 216 (FIG. 1) and a still image composing the video data included in the audiovisual data is displayed on LCD 201 (FIG. 1).

This paragraph illustrates Audiovisual Resume Software 20632c3a stored in Audiovisual Playback Software Storage Area 20632c which resumes the playback process of the audiovisual data selected in S3 described hereinbefore from the point the audiovisual data is paused in S2 described hereinbefore. The audiovisual resume signal is input by utilizing Input Device 210 (FIG. 1) or via voice recognition system (S1). CPU 211 (FIG. 1) then resumes the playback process of the audiovisual data selected in S3 described hereinbefore (S2) from the point it is paused in S2 described hereinbefore, and retrieves Resume Message Text Data 20632b2c1 from Message Data Storage Area 20632b2 and displays the data on LCD 201 (FIG. 1) for a specified period of time (S3) When the playback process is resumed in S2, the audio data included in the audiovisual data is resumed to be output from Speaker 216 (FIG. 1) and the video data included in the audiovisual data is resumed to be displayed on LCD 201 (FIG. 1).

This paragraph illustrates Audiovisual Slow Replay Software 20632c4 stored in Audiovisual Playback Software Storage Area 20632c which implements the playback process of the audiovisual data selected in S3 described hereinbefore in a slow motion. The audiovisual slow replay signal is input by utilizing Input Device 210 (FIG. 1) or via voice recognition system (S1). CPU 211 (FIG. 1) then initiates the playback process of the audiovisual data selected in S3 described hereinbefore in a slow motion (S2), and retrieves Slow Replay Message Text Data 20632b2d from Message Data Storage Area 20632b2 and displays the data on LCD 201 (FIG. 1) for a specified period of time (S3).

This paragraph illustrates Audiovisual Fast-Forward Software 20632c5 stored in Audiovisual Playback Software Storage Area 20632c which fast-forwards the audiovisual data selected in S3 described hereinbefore. The audiovisual fast-forward signal is input by utilizing Input Device 210 (FIG. 1) or via voice recognition system (S1). CPU 211 (FIG. 1) then fast-forwards the audiovisual data selected in S3 described hereinbefore (S2), and retrieves Fast-Forward Message Text Data 20632b2e from Message Data Storage Area 20632b2 and displays the data on LCD 201 (FIG. 1) for a specified period of time (S3).

This paragraph illustrates Audiovisual Fast-Rewind Software 20632c6 stored in Audiovisual Playback Software Storage Area 20632c which fast-rewinds the audiovisual data selected in S3 described hereinbefore. The audiovisual fast-rewind signal is input by utilizing Input Device 210 (FIG. 1) or via voice recognition system (S1). CPU 211 (FIG. 1) then fast-rewinds the audiovisual data selected in S3 described hereinbefore (S2), and retrieves Fast-Rewind Message Text Data 20632b2f from Message Data Storage Area 20632b2 and displays the data on LCD 201 (FIG. 1) for a specified period of time (S3).

This paragraph illustrates Audiovisual Next Software 20632c7 stored in Audiovisual Playback Software Storage Area 20632c which initiates the playback process of the next audiovisual data stored in Audiovisual Data Storage Area 20632b1. The audiovisual next signal is input by utilizing Input Device 210 (FIG. 1) or via voice recognition system (S1). CPU 211 (FIG. 1) then initiates the playback process of the next audiovisual data of the audiovisual data selected in S3 described hereinbefore both of which are stored in Audiovisual Data Storage Area 20632*b*1 (S2), and retrieves Next Message Text Data 20632*b*2*g* from Message Data Storage Area 20632*b*2 and displays the data on LCD 201 (FIG. 1) for a specified period of time (S3).

This paragraph illustrates Audiovisual Previous Software 20632*c*8 is a software program which initiates the playback process of the previous audiovisual data stored in Audiovisual Data Storage Area 20632*b*1. The audiovisual previous signal is input by utilizing Input Device 210 (FIG. 1) or via voice recognition system (S1). CPU 211 (FIG. 1) then initiates the playback process of the previous audiovisual data of the audiovisual data selected in S3 described hereinbefore both of which are stored in Audiovisual Data Storage Area 20632*b*1 (S2), and retrieves Previous Message Text Data 20632*b*2*h* from Message Data Storage Area 20632*b*2 and displays the data on LCD 201 (FIG. 1) for a specified period of time (S3).

As another embodiment, the audiovisual data stored in Audiovisual Data Storage Area 20632*b*1 may be stored in Host H and retrieved therefrom when the software programs described hereinbefore are executed. In this embodiment, the audio data is temporarily stored in RAM 206 (FIG. 1) and is erased from the portion which is playbacked.

<<Audio Playback Function>>

The following paragraphs illustrate the audio playback function which enables Communication Device 200 to playback audio data, such as jazz music, rock music, classic music, pops music, and any other types of audio data.

This paragraph illustrates the information stored in RAM 206 (FIG. 1). In this embodiment, RAM 206 includes Audio Playback Information Storage Area 20633*a* of which the information stored therein are described hereinafter.

The data and/or the software programs necessary to implement the present function may be downloaded to Communication Device 200 from Host H.

This paragraph illustrates the data and software programs stored in Audio Playback Information Storage Area 20633*a*. In this embodiment, Audio Playback Information Storage Area 20633*a* includes Audio Playback Data Storage Area 20633*b* and Audio Playback Software Storage Area 20633*c*. Audio Playback Data Storage Area 20633*b* stores the data necessary to implement the present function, such as the ones described hereinafter. Audio Playback Software Storage Area 20633*c* stores the software programs necessary to implement the present function, such as the ones described hereinafter.

This paragraph illustrates the data stored in Audio Playback Data Storage Area 20633*b*. In this embodiment, Audio Playback Data Storage Area 20633*b* includes Audio Data Storage Area 20633*b*1 and Message Data Storage Area 20633*b*2. Audio Data Storage Area 20633*b*1 stores a plurality of audio data described hereinafter. Message Data Storage Area 20633*b*2 stores a plurality of message data described hereinafter.

This paragraph illustrates the audio data stored in Audio Data Storage Area 20633*b*1. In this embodiment, Audio Data Storage Area 20633*b*1 stores a plurality of audio data wherein the audio data stored therein in the present example are: Audio Data 20633*b*1*a*, Audio Data 20633*b*1*b*, Audio Data 20633*b*1*c*, and Audio Data 20633*b*1*d*, all of which are primarily composed of video data and audio data. Audio Data 20633*b*1*a* is a jazz music, Audio Data 20633*b*1*b* is a rock music, Audio Data 20633*b*1*c* is a classic music, Audio Data 20633*b*1*d* is a pops music in the present embodiment.

As another embodiment, Audio Data 20633*b*1*d* may be an audio data taken via CCD Unit 214 (FIG. 1) and Microphone 215 (FIG. 1).

This paragraph illustrates the data stored in Message Data Storage Area 20633*b*2. In this embodiment, Message Data Storage Area 20633*b*2 includes Start Message Text Data 20633*b*2*a*, Stop Message Text Data 20633*b*2*b*, Pause Message Text Data 20633*b*2*c*, Resume Message Text Data 20633*b*2*c*1, Slow Replay Message Text Data 20633*b*2*d*, Forward Message Text Data 20633*b*2*e*, Rewind Message Text Data 20633*b*2*f*, Next Message Text Data 20633*b*2*g*, and Previous Message Text Data 20633*b*2*h*. Start Message Text Data 20633*b*2*a* is a text data which is displayed on LCD 201 (FIG. 1) and which indicates that the playback of an audio data is initiated. Stop Message Text Data 20633*b*2*b* is a text data which is displayed on LCD 201 and which indicates that the playback process of an audio data is stopped. Pause Message Text Data 20633*b*2*c* is a text data which is displayed on LCD 201 and which indicates that the playback process of an audio data is paused. Resume Message Text Data 20633*b*2*c*1 is a text data which is displayed on LCD 201 and which indicates that the playback process of an audio data is resumed from the point it is paused. Slow Replay Message Text Data 20633*b*2*d* is a text data which is displayed on LCD 201 and which indicates that the playback process of an audio data is implemented in a slow motion. Fast-Forward Message Text Data 20633*b*2*e* is a text data which is displayed on LCD 201 and which indicates that an audio data is fast-forwarded. Fast-Rewind Message Text Data 20633*b*2*f* is a text data which is displayed on LCD 201 and which indicates that an audio data is fast-rewinded. Next Message Text Data 20633*b*2*g* is a text data which is displayed on LCD 201 and which indicates that the playback process of the next audio data stored in Audio Data Storage Area 20633*b*1 is initiated. Previous Message Text Data 20633*b*2*h* is a text data which is displayed on LCD 201 and which indicates that the playback process of the previous audio data stored in Audio Data Storage Area 20633*b*1 is initiated.

This paragraph illustrates the software programs stored in Audio Playback Software Storage Area 20633*c*. In this embodiment, Audio Playback Software Storage Area 20633*c* includes Audio Start Software 20633*c*1, Audio Stop Software 20633*c*2, Audio Pause Software 20633*c*3, Audio Resume Software 20633*c*3*a*, Audio Slow Replay Software 20633*c*4, Audio Fast-Forward Software 20633*c*5, Audio Fast-Rewind Software 20633*c*6, Audio Next Software 20633*c*7, and Audio Previous Software 20633*c*8. Audio Start Software 20633*c*1 is a software program which initiates the playback process of an audio data. Audio Stop Software 20633*c*2 is a software program which stops the playback process of an audio data. Audio Pause Software 20633*c*3 is a software program which pauses the playback process of an audio data. Audio Resume Software 20633*c*3*a* is a software program which resumes the playback process of the audio data from the point it is paused by Audio Pause Software 20633*c*3. Audio Slow Replay Software 20633*c*4 is a software program which implements the playback process of an audio data in a slow motion. Audio Fast-Forward Software 20633*c*5 is a software program which fast-forwards an audio data. Audio Fast-Rewind Software 20633*c*6 is a software program which fast-rewinds an audio data. Audio Next Software 20633*c*7 is a software program which initiates the playback process of the next audio data stored in Audio Data Storage Area 20633*b*1. Audio Previous Software 20633c8 is a software program which initiates the playback process of the previous audio data stored in Audio Data Storage Area 20633b1.

This paragraph illustrates the messages displayed on LCD 201 (FIG. 1). In this embodiment, eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20633b2a, 'Stop' is Stop Message Text Data 20633b2b, 'Pause' is Pause Message Text Data 20633b2c, 'Resume' is Resume Message Text Data 20633b2c1, 'Slow Reply' is Slow Replay Message Text Data 20633b2d, 'Fast-Forward' is Fast-Forward Message Text Data 20633b2e, 'Fast-Rewind' is Fast-Rewind Message Text Data 20633b2f, 'Next' is Next Message Text Data 20633b2g, 'Previous' is Previous Message Text Data 20633b2h described hereinbefore.

This paragraph illustrates Audio Selecting Software 20633c9 stored in Audio Playback Software Storage Area 20633c in preparation of executing the software programs described hereinafter. In this embodiment, CPU 211 (FIG. 1) retrieves the identifications of the audio data stored in Audio Data Storage Area 20633b1 (S1). CPU 211 then displays a list of the identifications on LCD 201 (FIG. 1) (S2). A particular audio data is selected by utilizing Input Device 210 (FIG. 1) or via voice recognition system (S3).

This paragraph and the following paragraphs illustrate the software programs stored in Audio Playback Software Storage Area 20633c. In this embodiment, eight types of input signals can be input by utilizing Input Device 210 (FIG. 1) or via voice recognition system, i.e., the audio playback signal, the audio stop signal, the audio pause signal, the audio resume signal, the audio slow replay signal, the audio fast-forward signal, the audio fast-rewind signal, the audio next signal, and the audio previous signal. The audio playback signal indicates to initiate the playback process of the audio data selected in S3 described hereinbefore. The audio stop signal indicates to stop the playback process of the audio data selected in S3 described hereinbefore. The audio pause signal indicates to pause the playback process of the audio data selected in S3 described hereinbefore. The audio resume signal indicates to resume the playback process of the audio data selected in S3 described hereinbefore from the point the audio data is paused. The audio slow replay signal indicates to implement the playback process of the audio data selected in S3 described hereinbefore in a slow motion. The audio fast-forward signal indicates to fast-forward the audio data selected in S3 described hereinbefore. The audio fast-rewind signal indicates to fast-rewind the audio data selected in S3 described hereinbefore. The audio next signal indicates to initiate the playback process of the next audio data of the audio data selected in S3 described hereinbefore both of which are stored in Audio Data Storage Area 20633b1. The audio previous signal indicates to initiate the playback process of the previous audio data of the audio data selected in S3 described hereinbefore both of which are stored in Audio Data Storage Area 20633b1.

This paragraph illustrates Audio Start Software 20633c1 stored in Audio Playback Software Storage Area 20633c which initiates the playback process of the audio data selected in S3 described hereinbefore. In this embodiment, the audio playback signal is input by utilizing Input Device 210 (FIG. 1) or via voice recognition system (S1). CPU 211 (FIG. 1) then initiates the playback process (i.e., outputs the audio data from Speaker 216 (FIG. 1)) of the audio data selected in S3 described hereinbefore (S2), and retrieves Start Message Text Data 20633b2a from Message Data Storage Area 20633b2 and displays the data on LCD 201 (FIG. 1) for a specified period of time (S3).

This paragraph illustrates Audio Stop Software 20633c2 stored in Audio Playback Software Storage Area 20633c which stops the playback process of the audio data selected in S3 described hereinbefore. In this embodiment, the audio stop signal is input by utilizing Input Device 210 (FIG. 1) or via voice recognition system (S1). CPU 211 (FIG. 1) then stops the playback process of the audio data selected in S3 described hereinbefore (S2), and retrieves Stop Message Text Data 20633b2b from Message Data Storage Area 20633b2 and displays the data on LCD 201 (FIG. 1) for a specified period of time (S3).

This paragraph illustrates Audio Pause Software 20633c3 stored in Audio Playback Software Storage Area 20633c which pauses the playback process of the audio data selected in S3 described hereinbefore. In this embodiment, the audio pause signal is input by utilizing Input Device 210 (FIG. 1) or via voice recognition system (S1). CPU 211 (FIG. 1) then pauses the playback process of the audio data selected in S3 described hereinbefore (S2), and retrieves Pause Message Text Data 20633b2c from Message Data Storage Area 20633b2 and displays the data on LCD 201 (FIG. 1) for a specified period of time (S3) When the playback process is paused in S2, the audio data included in the audio data is refrained from being output from Speaker 216 (FIG. 1).

This paragraph illustrates Audio Resume Software 20633c3a stored in Audio Playback Software Storage Area 20633c which resumes the playback process of the audio data selected in S3 described hereinbefore from the point the audiovisual data is paused in S2 described hereinbefore. In this embodiment, the audio resume signal is input by utilizing Input Device 210 (FIG. 1) or via voice recognition system (S1). CPU 211 (FIG. 1) then resumes the playback process of the audio data selected in S3 described hereinbefore from the point the audiovisual data is paused in S2 described hereinbefore (S2), and retrieves Resume Message Text Data 20633b2c1 from Message Data Storage Area 20633b2 and displays the data on LCD 201 (FIG. 1) for a specified period of time (S3).

This paragraph illustrates Audio Slow Replay Software 20633c4 stored in Audio Playback Software Storage Area 20633c which implements the playback process of the audio data selected in S3 described hereinbefore in a slow motion. In this embodiment, the audio slow replay signal is input by utilizing Input Device 210 (FIG. 1) or via voice recognition system (S1). CPU 211 (FIG. 1) then initiates the playback process of the audio data selected in S3 described hereinbefore in a slow motion (S2), and retrieves Slow Replay Message Text Data 20633b2d from Message Data Storage Area 20633b2 and displays the data on LCD 201 (FIG. 1) for a specified period of time (S3).

This paragraph illustrates Audio Fast-Forward Software 20633c5 stored in Audio Playback Software Storage Area 20633c which fast-forwards the audio data selected in S3 described hereinbefore. In this embodiment, the audio fast-forward signal is input by utilizing Input Device 210 (FIG. 1) or via voice recognition system (S1). CPU 211 (FIG. 1) then fast-forwards the audio data selected in S3 described hereinbefore (S2), and retrieves Fast-Forward Message Text Data 20633b2e from Message Data Storage Area 20633b2 and displays the data on LCD 201 (FIG. 1) for a specified period of time (S3).

This paragraph illustrates Audio Fast-Rewind Software 20633c6 stored in Audio Playback Software Storage Area 20633c which fast-rewinds the audio data selected in S3 described hereinbefore. In this embodiment, the audio fast-rewind signal is input by utilizing Input Device 210 (FIG. 1) or via voice recognition system (S1). CPU 211 (FIG. 1) then fast-rewinds the audio data selected in S3 described hereinbefore (S2), and retrieves Fast-Rewind Message Text Data 20633b2f from Message Data Storage Area 20633b2 and displays the data on LCD 201 (FIG. 1) for a specified period of time (S3).

This paragraph illustrates Audio Next Software 20633c7 stored in Audio Playback Software Storage Area 20633c which initiates the playback process of the next audio data stored in Audio Data Storage Area 20633b1. In this embodiment, the audio next signal is input by utilizing Input Device 210 (FIG. 1) or via voice recognition system (S1). CPU 211 (FIG. 1) then initiates the playback process of the next audio data of the audio data selected in S3 described hereinbefore both of which are stored in Audio Data Storage Area 20633b1 (S2), and retrieves Next Message Text Data 20633b2g from Message Data Storage Area 20633b2 and displays the data on LCD 201 (FIG. 1) for a specified period of time (S3).

This paragraph illustrates Audio Previous Software 20633c8 is a software program which initiates the playback process of the previous audio data stored in Audio Data Storage Area 20633b1. In this embodiment, the audio previous signal is input by utilizing Input Device 210 (FIG. 1) or via voice recognition system (S1). CPU 211 (FIG. 1) then initiates the playback process of the previous audio data of the audio data selected in S3 described hereinbefore both of which are stored in Audio Data Storage Area 20633b1 (S2), and retrieves Previous Message Text Data 20633b2h from Message Data Storage Area 20633b2 and displays the data on LCD 201 (FIG. 1) for a specified period of time (S3).

As another embodiment, the audio data stored in Audio Data Storage Area 20633b1 may be stored in Host H and retrieved therefrom when the software programs described hereinbefore are executed. In this embodiment, the audio data is temporarily stored in RAM 206 (FIG. 1) and is erased from the portion which is playbacked.

<<Digital Camera Function>>

The following paragraphs illustrate the digital camera function which enables Communication Device 200 to take digital photos by utilizing CCD Unit 214 (FIG. 1).

This paragraph illustrates the storage area included in RAM 206 (FIG. 1). In this embodiment, RAM 206 includes Digital Camera Information Storage Area 20646a of which the data and the software programs stored therein are described hereinafter.

The data and software programs stored in Digital Camera Information Storage Area 20646a may be downloaded from Host H.

This paragraph illustrates the storage areas included in Digital Camera Information Storage Area 20646a. In this embodiment, Digital Camera Information Storage Area 20646a includes Digital Camera Data Storage Area 20646b and Digital Camera Software Storage Area 20646c. Digital Camera Data Storage Area 20646b stores the data necessary to implement the present function, such as the ones described hereinafter. Digital Camera Software Storage Area 20646c stores the software programs necessary to implement the present function, such as the ones described hereinafter.

This paragraph illustrates the storage areas included in Digital Camera Data Storage Area 20646b. In this embodiment, Digital Camera Data Storage Area 20646b includes Photo Data Storage Area 20646b1 and Digital Camera Function Data Storage Area 20646b2. Photo Data Storage Area 20646b1 stores the data described hereinafter. Digital Camera Function Data Storage Area 20646b2 stores the data stored hereinafter.

This paragraph illustrates the data stored in Photo Data Storage Area 20646b1. In this embodiment, Photo Data Storage Area 20646b1 comprises two columns, i.e., 'Photo ID' and 'Photo Data'. Column 'Photo ID' stores the identifications of the photo data, and column 'Photo Data' stores a plurality of photo data taken by implementing the present function. In this embodiment, Photo Data Storage Area 20646b1 stores the following data: 'Photo ID' Photo #1 of which the 'Photo Data' is 46PD1; 'Photo ID' Photo #2 of which the 'Photo Data' is 46PD2; 'Photo ID' Photo #3 of which the 'Photo Data' is 46PD3; 'Photo ID' Photo #4 of which the 'Photo Data' is 46PD4; and 'Photo ID' Photo #5 of which the 'Photo Data' is 46PD5.

This paragraph illustrates the storage areas included in Digital Camera Function Data Storage Area 20646b2. In this embodiment, Digital Camera Function Data Storage Area 20646b2 includes Quality Data Storage Area 20646b2a, Multiple Photo Shooting Number Data Storage Area 20646b2b, and Strobe Data Storage Area 20646b2c. Quality Data Storage Area 20646b2a stores the data selected in S2 described hereinafter. Multiple Photo Shooting Number Data Storage Area 20646b2b stores the data selected in S2 described hereinafter. Strobe Data Storage Area 20646b2c stores the data selected in S2 described hereinafter.

This paragraph illustrates the software programs stored in Digital Camera Software Storage Area 20646c. In this embodiment, Digital Camera Software Storage Area 20646c stores Quality Selecting Software 20646c1, Multiple Photo Shooting Software 20646c2, Trimming Software 20646c3, Digital Zooming Software 20646c4, Strobe Software 20646c5, Digital Camera Function Selecting Software 20646c6, Multiple Photo Shooting Number Selecting Software 20646c7, Strobe On/Off Selecting Software 20646c8, Photo Data Shooting Software 20646c9, and Multiple Photo Shooting Software 20646c10. Quality Selecting Software 20646c1 is the software program described hereinafter. Multiple Photo Shooting Software 20646c2 is the software program described hereinafter. Trimming Software 20646c3 is the software program described hereinafter. Digital Zooming Software 20646c4 is the software program described hereinafter. Strobe Software 20646c5 is the software program described hereinafter. Digital Camera Function Selecting Software 20646c6 is the software program described hereinafter. Multiple Photo Shooting Number Selecting Software 20646c7 is the software program described hereinafter. Strobe On/Off Selecting Software 20646c8 is the software program described hereinafter. Photo Data Shooting Software 20646c9 is the software program described hereinafter.

This paragraph illustrates Digital Camera Function Selecting Software 20646c6 stored in Digital Camera Software Storage Area 20646c which administers the overall flow of displaying the functions and selecting the option for each function. In this embodiment, a list of functions is displayed on LCD 201 (FIG. 1) (S1). The items displayed on LCD 201 are 'Quality', 'Multiple Photo', and 'Strobe'. A function is selected by utilizing Input Device 210 (FIG. 1) or via voice recognition system (S2), and the relevant software program is activated thereafter (S3). In the present embodiment, Quality Selecting Software 20646c1 described hereinafter is activated when 'Quality' displayed on LCD 201 is selected in S2. Multiple Photo Shooting Number Selecting Software 20646c7 described hereinafter is activated when 'Multiple Photo' is selected in S2. Strobe On/Off Selecting Software 20646*c*8 described hereinafter is activated when 'Strobe' is selected in S2.

This paragraph illustrates Quality Selecting Software 20646*c*1 stored in Digital Camera Software Storage Area 20646*c* which selects the quality of the photo data taken by implementing the present function. In this embodiment, a list of options is displayed on LCD 201 (FIG. 1) (S1). The options displayed on LCD 201 are 'High', 'STD', and 'Low' in the present embodiment. One of the options is selected by utilizing Input Device 210 (FIG. 1) or via voice recognition system (S2). The resolution of the photo data taken is high if 'High' is selected; the resolution of the photo taken is standard if 'STD' is selected; and the resolution of the photo taken is low if 'Low' is selected. The selected option is stored as the quality data in Quality Data Storage Area 20646*b*2*a* (S3).

This paragraph illustrates Multiple Photo Shooting Number Selecting Software 20646*c*7 stored in Digital Camera Software Storage Area 20646*c* which selects the number of photos taken by a single photo shooting signal. In this embodiment, a list of options is displayed on LCD 201 (FIG. 1) (S1). The options displayed on LCD 201 are figures from '1' through '10'. Only one photo is taken by a photo shooting signal if '1' is selected; two photos are taken by a photo shooting signal if '2' is selected; three photos are taken by a photo shooting signal if '3' is selected; four photos are taken by a photo shooting signal if '4' is selected; five photos are taken by a photo shooting signal if '5' is selected; six photos are taken by a photo shooting signal if '6' is selected; seven photos are taken by a photo shooting signal if '7' is selected; eight photos are taken by a photo shooting signal if '8' is selected; nine photos are taken by a photo shooting signal if '9' is selected; and ten photos are taken by a photo shooting signal if '10' is selected. A digit from '1' through '10' is selected by utilizing Input Device 210 (FIG. 1) or via voice recognition system (S2). The selected digital is stored as the multiple photo shooting number data in Multiple Photo Shooting Number Data Storage Area 20646*b*2*b* (S3).

This paragraph illustrates Strobe On/Off Selecting Software 20646*c*8 stored in Digital Camera Software Storage Area 20646*c* which selects Flash Light Unit 220 (not shown) to be activated or not when a photo is taken. In this embodiment, a list of options is displayed on LCD 201 (FIG. 1) (S1). The options displayed on LCD 201 are 'On' and 'Off'. Flash Light Unit 220 is activated at the time photo is taken if 'On' is selected; and Flash Light Unit 220 is not activated at the time photo is taken if 'Off' is selected. One of the two options is selected by utilizing Input Device 210 (FIG. 1) or via voice recognition system (S2). The selected option is stored as the strobe data in Strobe Data Storage Area 20646*b*2*c* (S3).

This paragraph illustrates Photo Data Shooting Software 20646*c*9 stored in Digital Camera Software Storage Area 20646*c* which takes photo(s) in accordance with the options selected hereinbefore. In this embodiment, a photo shooting signal is input by utilizing Input Device 210 (FIG. 1) or via voice recognition system (S1). Here, the photo shooting signal indicates CPU 211 (FIG. 1) to input photo data to CCD Unit 214 (FIG. 1) and store the data in Photo Data Storage Area 20646*b*1. CPU 211 then retrieves the quality data from Quality Data Storage Area 20646*b*2*a* (S2). The photo data is input via CCD Unit 214 (S3), and the data is stored in Photo Data Storage Area 20646*b*1 with new photo ID in accordance with the quality data retrieved in S2 (S4).

This paragraph illustrates Multiple Photo Shooting Software 20646*c*2 stored in Digital Camera Software Storage Area 20646*c* which takes photo(s) in accordance with the options selected hereinbefore. In this embodiment, a photo shooting signal is input by utilizing Input Device 210 (FIG. 1) or via voice recognition system (S1). CPU 211 (FIG. 1) retrieves the multiple photo shooting number data from Multiple Photo Shooting Number Data Storage Area 20646*b*2*b* (S2). CPU 211 then takes photos in accordance with the multiple photo shooting number data retrieved in S2 (S3). Namely, only one photo is taken by a photo shooting signal if the multiple photo shooting number data retrieved in S2 is '1'; two photos are taken by a photo shooting signal if the multiple photo shooting number data retrieved in S2 is '2'; three photos are taken by a photo shooting signal if the multiple photo shooting number data retrieved in S2 is '3'; four photos are taken by a photo shooting signal if the multiple photo shooting number data retrieved in S2 is '4'; five photos are taken by a photo shooting signal if the multiple photo shooting number data retrieved in S2 is '5'; six photos are taken by a photo shooting signal if the multiple photo shooting number data retrieved in S2 is '6'; seven photos are taken by a photo shooting signal if the multiple photo shooting number data retrieved in S2 is '7'; eight photos are taken by a photo shooting signal if the multiple photo shooting number data retrieved in S2 is '8'; nine photos are taken by a photo shooting signal if the multiple photo shooting number data retrieved in S2 is '9'; and ten photos are taken by a photo shooting signal if the multiple photo shooting number data retrieved in S2 is '10'.

This paragraph illustrates Strobe Software 20646*c*5 stored in Digital Camera Software Storage Area 20646*c* which takes photo(s) in accordance with the options selected hereinbefore. In this embodiment, a photo shooting signal is input by utilizing Input Device 210 (FIG. 1) or via voice recognition system (S1). CPU 211 (FIG. 1) retrieves the strobe data from Strobe Data Storage Area 20646*b*2*c* (S2). If the strobe data is 'On' (S3), CPU 211 activates Flash Light Unit 220 (not shown) each time a photo is taken (S4). In other words, Strobe Software 20646*c*5 is harmonized with Multiple Photo Shooting Software 20646*c*2 described hereinbefore. Namely, Flash Light Unit 220 is activated for one time if one photo is taken by a single photo shooting signal. Flash Light Unit 220 is activated for two times if two photos are taken by a single photo shooting signal. Flash Light Unit 220 is activated for three times if three photos are taken by a single photo shooting signal. Flash Light Unit 220 is activated for four times if four photos are taken by a single photo shooting signal. Flash Light Unit 220 is activated for five times if five photos are taken by a single photo shooting signal. Flash Light Unit 220 is activated for six times if six photos are taken by a single photo shooting signal. Flash Light Unit 220 is activated for seven times if seven photos are taken by a single photo shooting signal. Flash Light Unit 220 is activated for eight times if eight photos are taken by a single photo shooting signal. Flash Light Unit 220 is activated for nine times if nine photos are taken by a single photo shooting signal. Flash Light Unit 220 is activated for ten times if ten photos are taken by a single photo shooting signal.

This paragraph illustrates one embodiment of the zooming function which zooms the photo data stored in Photo Data Storage Area 20646*b*1. In this embodiment, a certain photo selected by the user of Communication Device 200 is displayed on LCD 201 (FIG. 1). Assuming that the user intends to zoom Object 20646Obj, the object displayed on LCD 201, to a larger size. The user selects Area 46ARa which includes Object 20646Obj by utilizing Input Device 210 (FIG. 1) or via voice recognition system, and the selected area is zoomed to fit the size of LCD 201. The zoomed photo is replaced with the original photo.

This paragraph illustrates the operation performed in RAM 206 (FIG. 1) to implement the zooming function described hereinbefore. A certain photo data selected by the user of Communication Device 200 is stored in Area 20646ARa of RAM 206. Here, the size of the photo data is as same as that of Area 20646ARa. In this embodiment, Display Area 20646DA is the area which is displayed on LCD 201 (FIG. 1). Area 46ARa is the area which is selected by the user of Communication Device 200. Object 20646Obj is the object included in the photo data. Area 46ARa which includes Object 20646Obj is selected by utilizing Input Device 210 (FIG. 1) or via voice recognition system, and the photo data stored in Area 20646ARa is zoomed to the size in which the size of Area 46ARa equals to that of Display Area 20646DA. The zoomed photo data is replaced with the original photo data and stored in Photo Data Storage Area 20646b1. The portion of the photo data which does not fit Area 20646ARa is cropped.

This paragraph illustrates Digital Zooming Software 20646c4 stored in Digital Camera Software Storage Area 20646c which implements the operation described hereinbefore. In this embodiment, CPU 211 (FIG. 1) displays a list of the photo IDs representing the photo data stored in Photo Data Storage Area 20646b1 as well as the thumbnails (S1). A certain photo data is selected by utilizing Input Device 210 (FIG. 1) or via voice recognition system (S2), and the selected photo data is displayed on LCD 201 (FIG. 1) as described hereinbefore (S3). Area 46ARa described hereinbefore is selected by utilizing Input Device 210 or via voice recognition system (S4). When a zooming signal is input by utilizing Input Device 210 or via voice recognition system (S5), CPU 211 (FIG. 1) implements the process described hereinbefore and replaces the original photo data with the zoomed photo data, which is stored in Photo Data Storage Area 20646b1 (S6).

This paragraph illustrates one embodiment of the trimming function which trims the photo data stored in Photo Data Storage Area 20646b1 and thereby moves the selected object to the center of the photo data. In this embodiment, a certain photo selected by the user of Communication Device 200 is displayed on LCD 201 (FIG. 1). Point 20646PTa adjacent to Object 20646Obj is selected by utilizing Input Device 210 (FIG. 1) or via voice recognition system, and the photo is centered at Point 20646PTa. The trimmed photo is replaced with the original photo.

This paragraph illustrates the operation performed in RAM 206 (FIG. 1) to implement the trimming function described hereinbefore. In this embodiment, Display Area 20646DA is the portion of the photo data which is displayed on LCD 201 (FIG. 1). Object 20646Obj is the object included in the photo data. Point 20646PTa is the point selected by the user of Communication Device 200 adjacent to Object 20646Obj which is centered by the present function. In this embodiment, a certain photo data selected by the user of Communication Device 200 is stored in Area 20646ARb of RAM 206. Here, the size of the photo data is as same as that of Area 20646ARb. Point 20646PTa is selected by utilizing Input Device 210 (FIG. 1) or via voice recognition system, and the photo data is centered at Point 20646PTa by sliding the entire photo data to the right. The trimmed photo data is replaced with the original photo data and stored in Photo Data Storage Area 20646b1. The portion of the photo data which does not fit Area 20646ARa is cropped.

This paragraph illustrates Trimming Software 20646c3 stored in Digital Camera Software Storage Area 20646c which implements the operation described hereinbefore. In this embodiment, CPU 211 (FIG. 1) displays a list of the photo IDs representing the photo data stored in Photo Data Storage Area 20646b1 as well as the thumbnails (S1). A certain photo data is selected by utilizing Input Device 210 (FIG. 1) or via voice recognition system (S2), and the selected photo data is displayed on LCD 201 (FIG. 1) as described hereinbefore (S3). Point 20646PTa described hereinbefore is selected by utilizing Input Device 210 or via voice recognition system (S4). When a trimming signal is input by utilizing Input Device 210 or via voice recognition system (S5), CPU 211 (FIG. 1) centers the photo data at Point 20646PTa and replaces the original photo data with the trimmed photo data, which is stored in Photo Data Storage Area 20646b1 (S6).

<<Current Location Non-notifying Function>>

The following paragraphs illustrate the current location non-notifying function wherein the current geographic location of the user of Communication Device 200 is not disclosed to another device when the user is currently located in a private area (e.g., rest room). The present function may be implemented in combination with the functions described in this specification which discloses the current geographic location of the user to another device.

This paragraph illustrates the storage area included in Host H (FIG. 2). In the present embodiment, Host H includes Current Location Non-notifying Information Storage Area H160a of which the data and the software programs stored therein are described hereinafter.

This paragraph illustrates the storage areas included in Current Location Non-notifying Information Storage Area H160a. In the present embodiment, Current Location Non-notifying Information Storage Area H160a includes Current Location Non-notifying Data Storage Area H160b and Current Location Non-notifying Software Storage Area H160c. Current Location Non-notifying Data Storage Area H160b stores the data necessary to implement the present function on the side of Host H (FIG. 2), such as the ones described hereinafter. Current Location Non-notifying Software Storage Area H160c stores the software programs necessary to implement the present function on the side of Host H, such as the ones described hereinafter.

This paragraph illustrates the storage areas included in Current Location Non-notifying Data Storage Area H160b. In the present embodiment, Current Location Non-notifying Data Storage Area H160b includes Private Area Location Data Storage Area H160b1, Private Area Indicating Data Storage Area H160b2, Current Geographic Location Data Storage Area H160b3, Map Data Storage Area H160b4, and Work Area H160b5. Private Area Location Data Storage Area H160b1 stores the private area location data which indicates the geographic location of the private area. Here, the private area is the area where the user does not desire to disclose that he/she is currently located therein (e.g., rest room). Private Area Indicating Data Storage Area H160b2 stores the private area indicating data which is a message indicating that the current location of the user of Communication Device 200 can not be disclosed because he/she is currently in a private area. As another embodiment, the private area indicating data may a message indicating that the current geographic location of Communication Device 200 is not found or unavailable. Current Geographic Location Data Storage Area H160b3 stores the current geographic location data which indicates the current geographic location of Communication Device 200. Map Data Storage Area H160b4 stores the data representing a detailed geographic map. The data also includes the layout (i.e., the locations of each rooms included therein) of the artificial structures (e.g., buildings) included in the foregoing detailed geographic map. Work Area H160b5 is utilized as a work area to perform calculation and temporarily store data.

This paragraph illustrates the software programs stored in Current Location Non-notifying Software Storage Area H160c. In the present embodiment, Current Location Non-notifying Software Storage Area H160c stores Private Area Setting Software H160c1, Current Geographic Location Identifying Software H160c2, and Private Area Indicating Data Displaying Software H160c3. Private Area Setting Software H160c1 is the software program described hereinafter. Current Geographic Location Identifying Software H160c2 is the software program described hereinafter. Private Area Indicating Data Displaying Software H160c3 is the software program described hereinafter.

This paragraph illustrates the storage area included in RAM 206 (FIG. 1) of Communication Device 200. In the present embodiment, RAM 206 includes Current Location Non-notifying Information Storage Area 206160a of which the data and the software programs stored therein are described hereinafter.

The data and/or the software programs necessary to implement the present function may be downloaded from Host H (FIG. 2) to Communication Device 200.

This paragraph illustrates the storage areas included in Current Location Non-notifying Information Storage Area 206160a. In the present embodiment, Current Location Non-notifying Information Storage Area 206160a includes Current Location Non-notifying Data Storage Area 206160b and Current Location Non-notifying Software Storage Area 206160c. Current Location Non-notifying Data Storage Area 206160b stores the data necessary to implement the present function on the side of Communication Device 200, such as the ones described hereinafter. Current Location Non-notifying Software Storage Area 206160c stores the software programs necessary to implement the present function on the side of Communication Device 200, such as the ones described hereinafter.

This paragraph illustrates the storage areas included in Current Location Non-notifying Data Storage Area 206160b. In the present embodiment, Current Location Non-notifying Data Storage Area 206160b includes Private Area Location Data Storage Area 206160b1, Private Area Indicating Data Storage Area 206160b2, Current Geographic Location Data Storage Area 206160b3, Map Data Storage Area 206160b4, and Work Area 206160b5. Private Area Location Data Storage Area 206160b1 stores the private area location data which indicates the geographic location of the private area. Here, the private area is the area where the user does not desire to disclose that he/she is currently located therein (e.g., rest room). Private Area Indicating Data Storage Area 206160b2 stores the private area indicating data which is a message indicating that the current location of the user of Communication Device 200 can not be disclosed because he/she is currently in a private area. As another embodiment, the private area indicating data may a message indicating that the current geographic location of Communication Device 200 is not found or unavailable. Current Geographic Location Data Storage Area 206160b3 stores the current geographic location data which indicates the current geographic location of Communication Device 200. Map Data Storage Area 206160b4 stores the data representing a detailed geographic map. The data also includes the layout (i.e., the locations of each rooms included therein) of the artificial structures (e.g., buildings) included in the foregoing detailed geographic map. Work Area 206160b5 is utilized as a work area to perform calculation and temporarily store data.

This paragraph illustrates the software programs stored in Current Location Non-notifying Software Storage Area 206160c. In the present embodiment, Current Location Non-notifying Software Storage Area 206160c stores Private Area Setting Software 206160c1, Current Geographic Location Identifying Software 206160c2, and Private Area Indicating Data Displaying Software 206160c3. Private Area Setting Software 206160c1 is the software program described hereinafter. Current Geographic Location Identifying Software 206160c2 is the software program described hereinafter. Private Area Indicating Data Displaying Software 206160c3 is the software program described hereinafter.

This paragraph illustrate Private Area Setting Software H160c1 of Host H (FIG. 2) and Private Area Setting Software 206160c1 of Communication Device 200, which identify the private area from a map displayed on LCD 201 (FIG. 1). In the present embodiment, Host H retrieves the map data from Map Data Storage Area H160b4 and sends the data to Communication Device 200 (S1). CPU 211 (FIG. 1) receives the map data from Host H in a wireless fashion and stores the data in Work Area 206160b5 (S2). CPU 211 (FIG. 1) retrieves the map data from Work Area 206160b5 and displays the data on LCD 201 (FIG. 1) (S3). The user selects by utilizing Input Device 210 (FIG. 1) or via voice recognition system an artificial structure (e.g., building) in the map displayed on LCD 201 (FIG. 1) (S4). CPU 211 (FIG. 1) displays the layout (i.e., the locations of each room) of the artificial structure selected in the previous step (S5). The user selects a room (e.g., rest room) by utilizing Input Device 210 (FIG. 1) or via voice recognition system (S6). CPU 211 (FIG. 1) sends the identification of the room selected in the previous step to Host H in a wireless fashion (S7). Host H receives the identification of the room sent in the previous step and identifies the geographic location thereof (S8). Host H stores the geographic location identified in the previous step as the private area location data in Private Area Location Data Storage Area H160b1 (S9).

This paragraph illustrates Private Area Setting Software H160c1 of Host H (FIG. 2) and Private Area Setting Software 206160c1 of Communication Device 200, which set the geographic location at which the user of Communication Device 200 is currently located as the private area. Assuming that the user of Communication Device 200 is currently located in a rest room. In the present embodiment, the user of Communication Device 200 inputs a current location private area signal by utilizing Input Device 210 (FIG. 1) or via voice recognition system (S1). Here, the current location private area signal indicates that the geographic location where the user of Communication Device 200 is currently located is a private area. CPU 211 (FIG. 1) sends the current location private area signal to Host H in a wireless fashion (S2). Host H receives the current location private area signal and identifies the current geographic location of Communication Device 200 (S3). Host H stores the data indicating the current geographic location identified in the previous step as the private area location data in Private Area Location Data Storage Area H160b1 (S4).

This paragraph illustrates Current Geographic Location Identifying Software H160c2 of Communication Device 200, which identifies the current geographic location of Communication Device 200. In the present embodiment, CPU 211 (FIG. 1) identifies the current geographic location of Communication Device 200 (S1). CPU 211 (FIG. 1) stores the data indicating the current geographic location identified in the previous step as the current geographic location data in Current Geographic Location Data Storage Area H160b3 (S2). The foregoing sequence is performed periodically.

This paragraph illustrates Private Area Indicating Data Displaying Software H160c3 of Host H (FIG. 2), which displays the private area indicating data when Communication Device 200 is located in a private area (e.g., rest room). In the present embodiment, Host H retrieves the current geographic location data from Current Geographic Location Data Storage Area H160b3 (S1). Host H retrieves the private area location data from Private Area Location Data Storage Area H160b1 (S2). If the current geographic location data retrieved in S1 is within the private area location data retrieved in the previous step, Host H proceeds to the next step (S3). Host H retrieves the private area indicating data from Private Area Indicating Data Storage Area H160b2 (S4). Host H sends the private area indicating data retrieved in the previous step to another device instead of the data indicating the current geographic location of Communication Device 200 (S5). The foregoing sequence is performed periodically.

The following paragraphs illustrate another embodiment wherein Communication Device 200 plays the major role in implementing the present function.

This paragraph illustrate Private Area Setting Software 206160c1 of Communication Device 200, which identifies the private area from the map displayed on LCD 201 (FIG. 1). In the present embodiment, CPU 211 (FIG. 1) retrieves the map data from Map Data Storage Area 206160b4 and displays the data on LCD 201 (FIG. 1) (S1). The user selects by utilizing Input Device 210 (FIG. 1) or via voice recognition system an artificial structure (e.g., building) in the map displayed on LCD 201 (FIG. 1) (S2). CPU 211 (FIG. 1) displays the layout (i.e., the locations of each room) of the artificial structure selected in the previous step (S3). The user selects a room (e.g., rest room) by utilizing Input Device 210 (FIG. 1) or via voice recognition system (S4). CPU 211 (FIG. 1) identifies the geographic location of the room selected in the previous step (S5). CPU 211 (FIG. 1) stores the geographic location identified in the previous step as the private area location data in Private Area Location Data Storage Area 206160b1 (S6).

This paragraph illustrates Private Area Setting Software 206160c1 of Communication Device 200, which sets the geographic location at which the user of Communication Device 200 is currently located as the private area. Assuming that the user of Communication Device 200 is currently located in a rest room. In the present embodiment, the user of Communication Device 200 inputs a current location private area signal by utilizing Input Device 210 (FIG. 1) or via voice recognition system (S1). Here, the current location private area signal indicates that the geographic location where the user of Communication Device 200 is currently located is a private area. CPU 211 (FIG. 1) identifies the current geographic location of Communication Device 200 (S2). CPU 211 (FIG. 1) stores the data indicating the current geographic location identified in the previous step as the private area location data in Private Area Location Data Storage Area 206160b1 (S3).

This paragraph illustrates Current Geographic Location Identifying Software 206160c2 of Communication Device 200, which identifies the current geographic location of Communication Device 200. In the present embodiment, CPU 211 (FIG. 1) identifies the current geographic location of Communication Device 200 (S1). CPU 211 (FIG. 1) stores the data indicating the current geographic location identified in the previous step as the current geographic location data in Current Geographic Location Data Storage Area 206160b3 (S2). The foregoing sequence is performed periodically.

This paragraph illustrates Private Area Indicating Data Displaying Software 206160c3 of Communication Device 200, which displays the private area indicating data when Communication Device 200 is located in a private area (e.g., rest room). In the present embodiment, CPU 211 (FIG. 1) retrieves the current geographic location data from Current Geographic Location Data Storage Area 206160b3 (S1). CPU 211 (FIG. 1) retrieves the private area location data from Private Area Location Data Storage Area 206160b1 (S2). If the current geographic location data retrieved in S1 is within the private area location data retrieved in the previous step, CPU 211 (FIG. 1) proceeds to the next step (S3). CPU 211 (FIG. 1) retrieves the private area indicating data from Private Area Indicating Data Storage Area 206160b2 (S4). CPU 211 (FIG. 1) sends the private area indicating data retrieved in the previous step to another device instead of the data indicating the current geographic location of Communication Device 200 in a wireless fashion (S5). The foregoing sequence is performed periodically.

<<TV Program Information Displaying Function>>

The following paragraphs the TV program info displaying function, wherein the TV program related data (e.g., TV program title, starting time, ending time, category, summary, and/or channel number) is displayed on LCD 201 (FIG. 1) with the TV program by implementing the present function.

This paragraph illustrates the storage area included in Host H (FIG. 2). In the present embodiment, Host H includes TV Program Information Displaying Information Storage Area H179a of which the data and the software programs stored therein are described hereinafter.

This paragraph illustrates the storage areas included in TV Program Information Displaying Information Storage Area H179a. In the present embodiment, TV Program Information Displaying Information Storage Area H179a includes TV Program Information Displaying Data Storage Area H179b and TV Program Information Displaying Software Storage Area H179c. TV Program Information Displaying Data Storage Area H179b stores the data necessary to implement the present function on the side of Host H (FIG. 2), such as the ones described hereinafter. TV Program Information Displaying Software Storage Area H179c stores the software programs necessary to implement the present function on the side of Host H, such as the ones described hereinafter.

This paragraph illustrates the storage areas included in TV Program Information Displaying Data Storage Area H179b. In the present embodiment, TV Program Information Displaying Data Storage Area H179b includes TV Program Audiovisual Data Storage Area H179b1, TV Program Related Data Storage Area H179b2, and Work Area H179b3. TV Program Audiovisual Data Storage Area H179b1 stores the data described hereinafter. TV Program Related Data Storage Area H179b2 stores the data described hereinafter. Work Area H179b3 is utilized as a work area to perform calculation and temporarily store data.

This paragraph illustrates the data stored in TV Program Audiovisual Data Storage Area H179b1. In the present embodiment, TV Program Audiovisual Data Storage Area H179b1 comprises two columns, i.e., 'TV Program Audiovisual ID' and 'TV Program Audiovisual Data'. Column 'TV Program Audiovisual ID' stores the TV program audiovisual IDs, and each TV program audiovisual ID is an identification of the corresponding TV program audiovisual data stored in column 'TV Program Audiovisual Data'. Column 'TV Program Audiovisual Data' stores the TV program audiovisual data, and each TV program audiovisual data is the audiovisual data of a TV program (e.g., cartoon, comedy, drama, news, science fiction, soap opera, and talk show) designed to be distributed to Communication Device 200 and displayed on LCD 201 (FIG. 1) and output from Speaker 216 (FIG. 1). In the present embodiment, TV Program Audiovisual Data Storage Area H179b1 stores the following data: 'TV Program Audiovisual#1' and the corresponding 'TV Program Audiovisual Data#1'; 'TV Program Audiovisual#2' and the corresponding 'TV Program Audiovisual Data#2'; 'TV Program Audiovisual#3' and the corresponding 'TV Program Audiovisual Data#3'; and 'TV Program Audiovisual#4' and the corresponding 'TV Program Audiovisual Data#4'.

This paragraph illustrates the data stored in TV Program Related Data Storage Area H179b2. In the present embodiment, TV Program Related Data Storage Area H179b2 comprises two columns, i.e., 'TV Program Audiovisual ID' and 'TV Program Related Data'. Column 'TV Program Audiovisual ID' stores the TV program audiovisual IDs, and each TV program audiovisual ID is an identification of the corresponding TV program related data stored in column 'TV Program Related Data'. The TV program audiovisual IDs stored in the present storage area are identical to the ones described in the previous paragraph. Column 'TV Program Related Data' stores the TV program related data, and each TV program related data includes the following data: the TV program title data, the TV program starting time data, the TV program ending time data, the TV program category data, the TV program summary data, the cast data, the producer data, the original airdate data, the TV channel number data, and/or the broadcast station data. The TV program title data indicates the title of the TV program. The TV program starting time data indicates the starting time of the TV program represented by the TV program title data. The TV program ending time data indicates the ending time of the TV program represented by the TV program title data. The TV program category data indicates the category to which the TV program represented by the TV program title data pertains (e.g., cartoon, comedy, drama, news, science fiction, soap opera, and talk show). The TV program summary data indicates the summary (or the outline) of the TV program represented by the TV program title data. The cast data indicates the name of each performer, cast, actor, and/or actress participating in the TV program represented by the TV program title data. The cast data also includes the profile of the foregoing performer, cast, actor, and/or actress. The cast data may include the image data (i.e., photo data) of the foregoing performer, cast, actor, and/or actress. The producer data indicates the name of the producer who produced the TV program represented by the TV program title data. The producer data also includes the profile of the foregoing producer. The producer data may include the image data (i.e., photo data) of the foregoing producer. The original airdate data indicates the date at which the TV program represented by the TV program title data is (was) originally on-aired. The TV channel number data indicates the TV channel number (i.e., channel 1) at which the TV program represented by the TV program title data is on-aired. The broadcast station data indicates the name of the broadcast station (e.g., ABC) represented by the TV channel number data. In the present embodiment, TV Program Related Data Storage Area H179b2 stores the following data: 'TV Program Audiovisual#1' and the corresponding 'TV Program Related Data#1'; 'TV Program Audiovisual#2' and the corresponding 'TV Program Related Data#2'; 'TV Program Audiovisual#3' and the corresponding 'TV Program Related Data#3'; and 'TV Program Audiovisual#4' and the corresponding 'TV Program Related Data#4'.

This paragraph illustrates the software programs stored in TV Program Information Displaying Software Storage Area H179c. In the present embodiment, TV Program Information Displaying Software Storage Area H179c stores TV Program Information Displaying Data Storing Software H179c1, TV Program Related Data Displaying Software H179c2, and TV Program Information Displaying Data Distributing Software H179c3. TV Program Information Displaying Data Storing Software H179c1 is the software program described hereinafter. TV Program Related Data Displaying Software H179c2 is the software program described hereinafter. TV Program Information Displaying Data Distributing Software H179c3 is the software program described hereinafter.

This paragraph illustrates the storage area included in RAM 206 (FIG. 1) of Communication Device 200. In the present embodiment, RAM 206 includes TV Program Information Displaying Information Storage Area 206179a of which the data and the software programs stored therein are described hereinafter.

The data and/or the software programs necessary to implement the present function may be downloaded from Host H (FIG. 2) to Communication Device 200.

This paragraph illustrates the storage areas included in TV Program Information Displaying Information Storage Area 206179a. In the present embodiment, TV Program Information Displaying Information Storage Area 206179a includes TV Program Information Displaying Data Storage Area 206179b and TV Program Information Displaying Software Storage Area 206179c. TV Program Information Displaying Data Storage Area 206179b stores the data necessary to implement the present function on the side of Communication Device 200, such as the ones described hereinafter. TV Program Information Displaying Software Storage Area 206179c stores the software programs necessary to implement the present function on the side of Communication Device 200, such as the ones described hereinafter.

This paragraph illustrates the storage areas included in TV Program Information Displaying Data Storage Area 206179b. In the present embodiment, TV Program Information Displaying Data Storage Area 206179b includes TV Program Audiovisual Data Storage Area 206179b1, TV Program Related Data Storage Area 206179b2, and Work Area 206179b3. TV Program Audiovisual Data Storage Area 206179b1 stores the data described hereinafter. TV Program Related Data Storage Area 206179b2 stores the data described hereinafter. Work Area 206179b3 is utilized as a work area to perform calculation and temporarily store data.

This paragraph illustrates the data stored in TV Program Audiovisual Data Storage Area 206179b1. In the present embodiment, TV Program Audiovisual Data Storage Area 206179b1 comprises two columns, i.e., 'TV Program Audiovisual ID' and 'TV Program Audiovisual Data'. Column 'TV Program Audiovisual ID' stores the TV program audiovisual IDs, and each TV program audiovisual ID is an identification of the corresponding TV program audiovisual data stored in column 'TV Program Audiovisual Data'. Column 'TV Program Audiovisual Data' stores the TV program audiovisual data, and each TV program audiovisual data is the audiovisual data of a TV program (e.g., cartoon, comedy, drama, news, science fiction, soap opera, and talk show) designed to be distributed to Communication Device 200 and displayed on LCD 201 (FIG. 1) and output from Speaker 216 (FIG. 1). In the present embodiment, TV Program Audiovisual Data Storage Area 206179b1 stores the following data: 'TV Program Audiovisual#1' and the corresponding 'TV Program Audiovisual Data#1'; 'TV Program Audiovisual#2' and the corresponding 'TV Program Audiovisual Data#2'; 'TV Program Audiovisual#3' and the corresponding 'TV Program Audiovisual Data#3'; and 'TV Program Audiovisual#4' and the corresponding 'TV Program Audiovisual Data#4'.

This paragraph illustrates the data stored in TV Program Related Data Storage Area 206179b2. In the present embodiment, TV Program Related Data Storage Area 206179b2 comprises two columns, i.e., 'TV Program Audiovisual ID' and 'TV Program Related Data'. Column 'TV Program Audiovisual ID' stores the TV program audiovisual IDs, and each TV program audiovisual ID is an identification of the corresponding TV program related data stored in column 'TV Program Related Data'. The TV program audiovisual IDs stored in the present storage area are identical to the ones described in the previous paragraph. Column 'TV Program Related Data' stores the TV program related data, and each TV program related data includes the following data: the TV program title data, the TV program starting time data, the TV program ending time data, the TV program category data, the TV program summary data, the cast data, the producer data, the original airdate data, the TV channel number data, and/or the broadcast station data. The TV program title data indicates the title of the TV program. The TV program starting time data indicates the starting time of the TV program represented by the TV program title data. The TV program ending time data indicates the ending time of the TV program represented by the TV program title data. The TV program category data indicates the category to which the TV program represented by the TV program title data pertains (e.g., cartoon, comedy, drama, news, science fiction, soap opera, and talk show). The TV program summary data indicates the summary (or the outline) of the TV program represented by the TV program title data. The cast data indicates the name of each performer, cast, actor, and/or actress participating in the TV program represented by the TV program title data. The cast data also includes the profile of the foregoing performer, cast, actor, and/or actress. The cast data may include the image data (i.e., photo data) of the foregoing performer, cast, actor, and/or actress. The producer data indicates the name of the producer who produced the TV program represented by the TV program title data. The producer data also includes the profile of the foregoing producer. The producer data may include the image data (i.e., photo data) of the foregoing producer. The original airdate data indicates the date at which the TV program represented by the TV program title data is (was) originally on-aired. The TV channel number data indicates the TV channel number (i.e., channel 1) at which the TV program represented by the TV program title data is on-aired. The broadcast station data indicates the name of the broadcast station (e.g., ABC) represented by the TV channel number data. In the present embodiment, TV Program Related Data Storage Area 206179b2 stores the following data: 'TV Program Audiovisual#1' and the corresponding 'TV Program Related Data#1'; 'TV Program Audiovisual#2' and the corresponding 'TV Program Related Data#2'; 'TV Program Audiovisual#3' and the corresponding 'TV Program Related Data#3'; and 'TV Program Audiovisual#4' and the corresponding 'TV Program Related Data#4'.

This paragraph illustrates the software programs stored in TV Program Info Displaying Software Storage Area 206179c. In the present embodiment, TV Program Info Displaying Software Storage Area 206179c stores TV Program Related Data Displaying Software 206179c2 and TV Program Info Displaying Data Distributing Software 206179c3. TV Program Related Data Displaying Software 206179c2 is the software program described hereinafter. TV Program Info Displaying Data Distributing Software 206179c3 is the software program described hereinafter.

This paragraph illustrate(s) TV Program Info Displaying Data Storing Software H179c1 of Host H (FIG. 2), which stores the TV program information displaying data for purposes of distributing the data to Communication Device 200. In the present embodiment, Host H receives the TV program audiovisual data and the TV program related data from a broadcast center (not shown) (S1). Host H stores the TV program audiovisual data in TV Program Audiovisual Data Storage Area H179b1 (S2). Host H stores the TV program related data in TV Program Related Data Storage Area H179b2 (S3). The foregoing sequence is performed periodically.

This paragraph illustrate(s) TV Program Related Data Displaying Software H179c2 of Host H (FIG. 2) and TV Program Related Data Displaying Software 206179c2 of Communication Device 200, which display the TV program related data with the TV program on LCD 201 (FIG. 1). In the present embodiment, the user selects a channel (e.g., channel 1) (S1). CPU 211 (FIG. 1) sends the selected channel signal to Host H in a wireless fashion (S2). Here, the selected channel signal is a signal indicating the channel number (e.g., channel 1) selected in the previous step. Host H receives the selected channel signal from Communication Device 200 and retrieves all TV program related data from TV Program Related Data Storage Area H179b2 (S3). Host H retrieves the TV channel number data from the TV program related data retrieved in the previous step (S4). Host H identifies the TV program related data (e.g., TV Program Related Data#1) corresponding to the selected channel signal (e.g., channel 1) received in S3 (S5). Host H sends the TV program related data (e.g., TV Program Related Data#1) identified in the previous step to Communication Device 200 (S6). CPU 211 (FIG. 1) receives the TV program related data (e.g., TV Program Related Data#1) from Host H in a wireless fashion and displays the data on LCD 201 (FIG. 1) (S7). Host H retrieves the TV program audiovisual data (e.g., TV Program Audiovisual Data#1) from TV Program Audiovisual Data Storage Area H179b1 corresponding to the TV program related data (e.g., TV Program Related Data#1) identified in S5 and sends the data to Communication Device 200 (S8). CPU 211 (FIG. 1) receives the TV program audiovisual data (e.g., TV Program Audiovisual Data#1) from Host H in a wireless fashion and displays the visual data thereof on LCD 201 (FIG. 1) and outputs the audio data thereof from Speaker 216 (FIG. 1) (S9). S8 and S9 are repeated thereafter.

The following paragraphs illustrate another embodiment wherein Communication Device 200 plays the major role in implementing the present function.

This paragraph illustrate(s) TV Program Information Displaying Data Distributing Software H179c3 of Host H (FIG. 2) and TV Program Information Displaying Data Distributing Software 206179c3 of Communication Device 200, which distribute the TV program information displaying data from Host H (FIG. 2) to Communication Device 200. In the present embodiment, Host H retrieves the TV program audiovisual data from TV Program Audiovisual Data Storage Area H179*b*1 (S1). Host H retrieves the TV program related data from TV Program Related Data Storage Area H179*b*2 (S2). Host H sends the data retrieved in S1 and S2 to Communication Device 200 (S3). CPU 211 (FIG. 1) receives the data sent in the previous step from Host H in a wireless fashion (S4). CPU 211 (FIG. 1) stores the TV program audiovisual data in TV Program Audiovisual Data Storage Area 206179*b*1 (S5). CPU 211 (FIG. 1) stores the TV program related data in TV Program Related Data Storage Area 206179*b*2 (S6). The foregoing sequence is performed periodically.

This paragraph illustrate(s) TV Program Related Data Displaying Software 206179*c*2 of Communication Device 200, which displays the TV program related data with the TV program on LCD 201 (FIG. 1). In the present embodiment, the user selects a channel (e.g., channel 1) (S1). CPU 211 (FIG. 1) retrieves all TV program related data from TV Program Related Data Storage Area 206179*b*2 (S2). CPU 211 (FIG. 1) retrieves the TV channel number data from the TV program related data retrieved in the previous step (S3). CPU 211 (FIG. 1) identifies the TV program related data (e.g., TV Program Related Data#1) corresponding to the channel (e.g., channel 1) selected in S1 (S4). CPU 211 (FIG. 1) displays the TV program related data (e.g., TV Program Related Data#1) identified in the previous step on LCD 201 (FIG. 1) (S5). CPU 211 (FIG. 1) retrieves the TV program audiovisual data (e.g., TV Program Audiovisual Data#1) from TV Program Audiovisual Data Storage Area 206179*b*1 corresponding to the TV program related data (e.g., TV Program Related Data#1) identified in S4 and displays the visual data thereof on LCD 201 (FIG. 1) and outputs the audio data thereof from Speaker 216 (FIG. 1) (S6). S6 is repeated thereafter (S7).

<<Cordless Phone Connecting Function>>

The following paragraphs illustrate the cordless phone connection function, wherein when a main phone receives a phone call, Communication Device 200 is utilized as a cordless handset of the main phone.

This paragraph illustrates the connection between Communication Device 200 and the cordless phones. Here, the cordless phones are the main phones. In the present embodiment, Communication Device 200 is connected with the cordless phones, i.e., Cordless Phone CP188*a*, Cordless Phone CP188*b*, Cordless Phone CP188*c*, and Cordless Phone CP188*d*. Cordless Phone CP188*a* implements wireless communication with a cordless handset or Communication Device 200 by utilizing Cordless Phone Signal Data#1. Cordless Phone CP188*b* implements wireless communication with a cordless handset or Communication Device 200 by utilizing Cordless Phone Signal Data#2. Cordless Phone CP188*c* implements wireless communication with a cordless handset or Communication Device 200 by utilizing Cordless Phone Signal Data#3. Cordless Phone CP1884 implements wireless communication with a cordless handset or Communication Device 200 by utilizing Cordless Phone Signal Data#4.

This paragraph illustrates the cordless phones and the fixed phone network. In the present embodiment, each cordless phone is connected to the corresponding fixed network. Cordless Phone CP188*a* is connected to Fixed Phone Network FPN188*a*. Cordless Phone CP188*b* is connected to Fixed Phone Network FPN188*b*. Cordless Phone CP188*c* is connected to Fixed Phone Network FPN188*c*. Cordless Phone CP188*d* is connected to Fixed Phone Network FPN188*d*.

This paragraph illustrates the connection between the fixed phone networks and the Internet. In the present embodiment, each fixed phone network, i.e., Fixed Phone Network FPN188*a*, Fixed Phone Network FPN188*b*, Fixed Phone Network FPN188*c*, and Fixed Phone Network FPN188*d*, is connected to Internet In188.

This paragraph illustrates the storage area included in Host H (FIG. 2). In the present embodiment, Host H includes Cordless Phone Connecting Information Storage Area H188*a* of which the data and the software programs stored therein are described hereinafter.

This paragraph illustrates the storage areas included in Cordless Phone Connecting Information Storage Area H188*a*. In the present embodiment, Cordless Phone Connecting Information Storage Area H188*a* includes Cordless Phone Connecting Data Storage Area H188*b* and Cordless Phone Connecting Software Storage Area H188*c*. Cordless Phone Connecting Data Storage Area H188*b* stores the data necessary to implement the present function on the side of Host H (FIG. 2), such as the ones described hereinafter. Cordless Phone Connecting Software Storage Area H188*c* stores the software programs necessary to implement the present function on the side of Host H, such as the ones described hereinafter.

This paragraph illustrates the storage areas included in Cordless Phone Connecting Data Storage Area H188*b*. In the present embodiment, Cordless Phone Connecting Data Storage Area H188*b* includes Cordless Phone Connection Flag Data Storage Area H188*b*1, Cordless Phone Signal Data Storage Area H188*b*2, Phone Ring Data Storage Area H188*b*3, Vibrating Pattern Data Storage Area H188*b*4, LED Pattern Data Storage Area H188*b*5, and Work Area H188*b*6. Cordless Phone Connection Flag Data Storage Area H188*b*1 stores the cordless phone connection flag data which is either the cordless phone connection active data or the cordless phone connection inactive data. Communication Device 200 is connected to one of the cordless phones described hereinbefore in a wireless fashion and thereby enables the user of Communication Device 200 to implement voice or data communication by utilizing the corresponding fixed phone network when the cordless phone connection active data is stored in the present storage area. On the other hand, Communication Device 200 is not connected to any of the cordless phones described hereinbefore and thereby the user of Communication Device 200 is not able to implement voice or data communication by utilizing any fixed phone network when the cordless phone connection inactive data is stored in the present storage area. Cordless Phone Signal Data Storage Area H188*b*2 stores the data described hereinafter. Phone Ring Data Storage Area H188*b*3 stores the data described hereinafter. Vibrating Pattern Data Storage Area H188*b*4 stores the data described hereinafter. LED Pattern Data Storage Area H188*b*5 stores the data described hereinafter. Work Area H188*b*6 is utilized as a work area to perform calculation and temporarily store data.

This paragraph illustrates the data stored in Cordless Phone Signal Data Storage Area H188*b*2. In the present embodiment, Cordless Phone Signal Data Storage Area H188*b*2 comprises two columns, i.e., 'Cordless Phone Signal ID' and 'Cordless Phone Signal Data'. Column 'Cordless Phone Signal ID' stores the cordless phone signal IDs, and each cordless phone signal ID is an identification of the corresponding cordless phone signal data stored in column 'Cordless Phone Signal Data'. Column 'Cordless Phone Signal Data' stores the cordless phone signal data, and each cordless phone signal data is unique to each cordless phone described hereinafter. In the present embodiment, Cordless Phone Signal Data Storage Area H188*b*2 stores the following data: 'Cordless Phone Signal#1' and the corresponding 'Cordless Phone Signal Data#1'; 'Cordless Phone Signal#2' and the corresponding 'Cordless Phone Signal Data#2'; 'Cordless Phone Signal#3' and the corresponding 'Cordless Phone Signal Data#3'; and 'Cordless Phone Signal#4' and the corresponding 'Cordless Phone Signal Data#4'. Cordless Phone Signal Data#1 is utilized by Cordless Phone CP188a for wireless communication. Cordless Phone Signal Data#2 is utilized by Cordless Phone CP188b for wireless communication. Cordless Phone Signal Data#3 is utilized by Cordless Phone CP188c for wireless communication. Cordless Phone Signal Data#4 is utilized by Cordless Phone CP188d for wireless communication.

This paragraph illustrates the data stored in Phone Ring Data Storage Area H188b3. In the present embodiment, Phone Ring Data Storage Area H188b3 comprises two columns, i.e., 'Phone Ring ID' and 'Phone Ring Data'. Column 'Phone Ring ID' stores the phone ring IDs, and each phone ring ID is an identification of the corresponding phone ring data stored in column 'Phone Ring Data'. Column 'Phone Ring Data' stores the phone ring data, and each phone ring data is the wave data designed to be output via Speaker 216 (FIG. 1) when Communication Device 200 receives a phone call. In the present embodiment, Phone Ring Data Storage Area H188b3 stores the following data: 'Phone Ring#1' and the corresponding 'Phone Ring Data#1'; 'Phone Ring#2' and the corresponding 'Phone Ring Data#2'; 'Phone Ring#3' and the corresponding 'Phone Ring Data#3'; and 'Phone Ring#4' and the corresponding 'Phone Ring Data#4'. Phone Ring Data#1 is utilized when Cordless Phone CP188a receives a phone call. Phone Ring Data#2 is utilized when Cordless Phone CP188b receives a phone call. Phone Ring Data#3 is utilized when Cordless Phone CP188c receives a phone call. Phone Ring Data#4 is utilized when Cordless Phone CP188d receives a phone call.

This paragraph illustrates the data stored in Vibrating Pattern Data Storage Area H188b4. In the present embodiment, Vibrating Pattern Data Storage Area H188b4 comprises two columns, i.e., 'Vibrating Pattern ID' and 'Vibrating Pattern Data'. Column 'Vibrating Pattern ID' stores the vibrating pattern IDs, and each vibrating pattern ID is an identification of the corresponding vibrating pattern data stored in column 'Vibrating Pattern Data'. Column 'Vibrating Pattern Data' stores the vibrating pattern data, and each vibrating pattern data indicates the vibrating pattern of Vibrator 217 (FIG. 1). In the present embodiment, Vibrating Pattern Data Storage Area H188b4 stores the following data: 'Vibrating Pattern#1' and the corresponding 'Vibrating Pattern Data#1'; 'Vibrating Pattern#2' and the corresponding 'Vibrating Pattern Data#2'; 'Vibrating Pattern#3' and the corresponding 'Vibrating Pattern Data#3'; and 'Vibrating Pattern#4' and the corresponding 'Vibrating Pattern Data#4'. Vibrating Pattern Data#1 is utilized when Cordless Phone CP188a receives a phone call. Vibrating Pattern Data#2 is utilized when Cordless Phone CP188b receives a phone call. Vibrating Pattern Data#3 is utilized when Cordless Phone CP188c receives a phone call. Vibrating Pattern Data#4 is utilized when Cordless Phone CP188d receives a phone call.

This paragraph illustrates the data stored in LED Pattern Data Storage Area H188b5. In the present embodiment, LED Pattern Data Storage Area H188b5 comprises two columns, i.e., 'LED Pattern ID' and 'LED Pattern Data'. Column 'LED Pattern ID' stores the LED pattern IDs, and each LED pattern ID is an identification of the corresponding LED pattern data stored in column 'LED Pattern Data'. Column 'LED Pattern Data' stores the LED pattern data, and each LED pattern data indicates the light emitting pattern of LED 219 (FIG. 380 of the Prior File Application). In the present embodiment, LED Pattern Data Storage Area H188b5 stores the following data: 'LED Pattern#1' and the corresponding 'LED Pattern Data#1'; 'LED Pattern#2' and the corresponding 'LED Pattern Data#2'; 'LED Pattern#3' and the corresponding 'LED Pattern Data#3'; and 'LED Pattern#4' and the corresponding 'LED Pattern Data#4'. LED Pattern Data#1 is utilized when Cordless Phone CP188a receives a phone call. LED Pattern Data#2 is utilized when Cordless Phone CP188b receives a phone call. LED Pattern Data#3 is utilized when Cordless Phone CP188c receives a phone call. LED Pattern Data#4 is utilized when Cordless Phone CP188d receives a phone call.

This paragraph illustrates the software programs stored in Cordless Phone Connecting Software Storage Area H188c. In the present embodiment, Cordless Phone Connecting Software Storage Area H188c stores Cordless Phone Connecting Function Activating Software H188c1, Phone Call For Cordless Phone CP188a Notifying Software H188c2, Phone Call For Cordless Phone CP188b Notifying Software H188c3, Phone Call For Cordless Phone CP188c Notifying Software H188c4, and Phone Call For Cordless Phone CP188d Notifying Software H188c5. Cordless Phone Connecting Function Activating Software H188c1 is the software program described hereinafter. Phone Call For Cordless Phone CP188a Notifying Software H188c2 is the software program described hereinafter. Phone Call For Cordless Phone CP188b Notifying Software H188c3 is the software program described hereinafter. Phone Call For Cordless Phone CP188c Notifying Software H188c4 is the software program described hereinafter. Phone Call For Cordless Phone CP188d Notifying Software H188c5 is the software program described hereinafter.

This paragraph illustrates the storage area included in RAM 206 (FIG. 1) of Communication Device 200. In the present embodiment, RAM 206 includes Cordless Phone Connecting Information Storage Area 206188a of which the data and the software programs stored therein are described hereinafter.

The data and/or the software programs necessary to implement the present function may be downloaded from Host H (FIG. 2) to Communication Device 200.

This paragraph illustrates the storage areas included in Cordless Phone Connecting Information Storage Area 206188a. In the present embodiment, Cordless Phone Connecting Information Storage Area 206188a includes Cordless Phone Connecting Data Storage Area 206188b and Cordless Phone Connecting Software Storage Area 206188c. Cordless Phone Connecting Data Storage Area 206188b stores the data necessary to implement the present function on the side of Communication Device 200, such as the ones described hereinafter. Cordless Phone Connecting Software Storage Area 206188c stores the software programs necessary to implement the present function on the side of Communication Device 200, such as the ones described hereinafter.

This paragraph illustrates the storage areas included in Cordless Phone Connecting Data Storage Area 206188b. In the present embodiment, Cordless Phone Connecting Data Storage Area 206188b includes Cordless Phone Connection Flag Data Storage Area 206188b1, Cordless Phone Signal Data Storage Area 206188b2, Phone Ring Data Storage Area 206188b3, Vibrating Pattern Data Storage Area 206188b4, LED Pattern Data Storage Area 206188b5, and Work Area 206188b6. Cordless Phone Connection Flag Data Storage Area 206188*b*1 stores the cordless phone connection flag data which is either the cordless phone connection active data or the cordless phone connection inactive data. Communication Device 200 is connected to one of the cordless phones described hereinbefore in a wireless fashion and thereby enables the user of Communication Device 200 to implement voice or data communication by utilizing the corresponding fixed phone network when the cordless phone connection active data is stored in the present storage area. On the other hand, Communication Device 200 is not connected to any of the cordless phones described hereinbefore and thereby the user of Communication Device 200 is not able to implement voice or data communication by utilizing any fixed phone network when the cordless phone connection inactive data is stored in the present storage area. Cordless Phone Signal Data Storage Area 206188*b*2 stores the data described hereinafter. Phone Ring Data Storage Area 206188*b*3 stores the data described hereinafter. Vibrating Pattern Data Storage Area 206188*b*4 stores the data described hereinafter. LED Pattern Data Storage Area 206188*b*5 stores the data described hereinafter. Work Area 206188*b*6 is utilized as a work area to perform calculation and temporarily store data.

This paragraph illustrates the data stored in Cordless Phone Signal Data Storage Area 206188*b*2. In the present embodiment, Cordless Phone Signal Data Storage Area 206188*b*2 comprises two columns, i.e., 'Cordless Phone Signal ID' and 'Cordless Phone Signal Data'. Column 'Cordless Phone Signal ID' stores the cordless phone signal IDs, and each cordless phone signal ID is an identification of the corresponding cordless phone signal data stored in column 'Cordless Phone Signal Data'. Column 'Cordless Phone Signal Data' stores the cordless phone signal data, and each cordless phone signal data is unique to each cordless phone described hereinafter. In the present embodiment, Cordless Phone Signal Data Storage Area 206188*b*2 stores the following data: 'Cordless Phone Signal#1' and the corresponding 'Cordless Phone Signal Data#1'; 'Cordless Phone Signal#2' and the corresponding 'Cordless Phone Signal Data#2'; 'Cordless Phone Signal#3' and the corresponding 'Cordless Phone Signal Data#3'; and 'Cordless Phone Signal#4' and the corresponding 'Cordless Phone Signal Data#4'. Cordless Phone Signal Data#1 is utilized by Cordless Phone CP188*a* for wireless communication. Cordless Phone Signal Data#2 is utilized by Cordless Phone CP188*b* for wireless communication. Cordless Phone Signal Data#3 is utilized by Cordless Phone CP188*c* for wireless communication. Cordless Phone Signal Data#4 is utilized by Cordless Phone CP188*d* for wireless communication.

This paragraph illustrates the data stored in Phone Ring Data Storage Area 206188*b*3. In the present embodiment, Phone Ring Data Storage Area 206188*b*3 comprises two columns, i.e., 'Phone Ring ID' and 'Phone Ring Data'. Column 'Phone Ring ID' stores the phone ring IDs, and each phone ring ID is an identification of the corresponding phone ring data stored in column 'Phone Ring Data'. Column 'Phone Ring Data' stores the phone ring data, and each phone ring data is the wave data designed to be output via Speaker 216 (FIG. 1) when Communication Device 200 receives a phone call. In the present embodiment, Phone Ring Data Storage Area 206188*b*3 stores the following data: 'Phone Ring#1' and the corresponding 'Phone Ring Data#1'; 'Phone Ring#2' and the corresponding 'Phone Ring Data#2'; 'Phone Ring#3' and the corresponding 'Phone Ring Data#3'; and 'Phone Ring#4' and the corresponding 'Phone Ring Data#4'. Phone Ring Data#1 is utilized when Cordless Phone CP188*a* receives a phone call. Phone Ring Data#2 is utilized when Cordless Phone CP188*b* receives a phone call. Phone Ring Data#3 is utilized when Cordless Phone CP188*c* receives a phone call. Phone Ring Data#4 is utilized when Cordless Phone CP188*d* receives a phone call.

This paragraph illustrates the data stored in Vibrating Pattern Data Storage Area 206188*b*4. In the present embodiment, Vibrating Pattern Data Storage Area 206188*b*4 comprises two columns, i.e., 'Vibrating Pattern ID' and 'Vibrating Pattern Data'. Column 'Vibrating Pattern ID' stores the vibrating pattern IDs, and each vibrating pattern ID is an identification of the corresponding vibrating pattern data stored in column 'Vibrating Pattern Data'. Column 'Vibrating Pattern Data' stores the vibrating pattern data, and each vibrating pattern data indicates the vibrating pattern of Vibrator 217 (FIG. 1). In the present embodiment, Vibrating Pattern Data Storage Area 206188*b*4 stores the following data: 'Vibrating Pattern#1' and the corresponding 'Vibrating Pattern Data#1'; 'Vibrating Pattern#2' and the corresponding 'Vibrating Pattern Data#2'; 'Vibrating Pattern#3' and the corresponding 'Vibrating Pattern Data#3'; and 'Vibrating Pattern#4' and the corresponding 'Vibrating Pattern Data#4'. Vibrating Pattern Data#1 is utilized when Cordless Phone CP188*a* receives a phone call. Vibrating Pattern Data#2 is utilized when Cordless Phone CP188*b* receives a phone call. Vibrating Pattern Data#3 is utilized when Cordless Phone CP188*c* receives a phone call. Vibrating Pattern Data#4 is utilized when Cordless Phone CP188*d* receives a phone call.

This paragraph illustrates the data stored in LED Pattern Data Storage Area 206188*b*5. In the present embodiment, LED Pattern Data Storage Area 206188*b*5 comprises two columns, i.e., 'LED Pattern ID' and 'LED Pattern Data'. Column 'LED Pattern ID' stores the LED pattern IDs, and each LED pattern ID is an identification of the corresponding LED pattern data stored in column 'LED Pattern Data'. Column 'LED Pattern Data' stores the LED pattern data, and each LED pattern data indicates the light emitting pattern of LED 219 (FIG. 380 of the Prior File Application). In the present embodiment, LED Pattern Data Storage Area 206188*b*5 stores the following data: 'LED Pattern#1' and the corresponding 'LED Pattern Data#1'; 'LED Pattern#2' and the corresponding 'LED Pattern Data#2'; 'LED Pattern#3' and the corresponding 'LED Pattern Data#3'; and 'LED Pattern#4' and the corresponding 'LED Pattern Data#4'. LED Pattern Data#1 is utilized when Cordless Phone CP188*a* receives a phone call. LED Pattern Data#2 is utilized when Cordless Phone CP188*b* receives a phone call. LED Pattern Data#3 is utilized when Cordless Phone CP188*c* receives a phone call. LED Pattern Data#4 is utilized when Cordless Phone CP188*d* receives a phone call.

This paragraph illustrates the software programs stored in Cordless Phone Connecting Software Storage Area 206188*c*. In the present embodiment, Cordless Phone Connecting Software Storage Area 206188*c* stores Cordless Phone Connecting Function Activating Software 206188*c*1, Phone Call For Cordless Phone CP188*a* Notifying Software 206188*c*2, Phone Call For Cordless Phone CP188*b* Notifying Software 206188*c*3, Phone Call For Cordless Phone CP188*c* Notifying Software 206188*c*4, and Phone Call For Cordless Phone CP188*d* Notifying Software 206188*c*5. Cordless Phone Connecting Function Activating Software 206188*c*1 is the software program described hereinafter. Phone Call For Cordless Phone CP188*a* Notifying Software 206188*c*2 is the software program described hereinafter. Phone Call For Cordless Phone CP188*b* Notifying Software 206188*c*3 is the software program described hereinafter.

Phone Call For Cordless Phone CP188c Notifying Software 206188c4 is the software program described hereinafter. Phone Call For Cordless Phone CP188d Notifying Software 206188c5 is the software program described hereinafter.

This paragraph illustrate(s) Cordless Phone Connecting Function Activating Software H188c1 of Host H (FIG. 2) and Cordless Phone Connecting Function Activating Software 206188c1 of Communication Device 200, which activate the present function. In the present embodiment, CPU 211 (FIG. 1) displays the cordless phone connecting function screen (S1). Here, the cordless phone connecting function screen is utilized to activate the present function. The following two options are displayed on the screen: 'Active' and 'Inactive'. If the user of Communication Device 200 selects 'Active', the present function is activated and implemented, whereas if the user of Communication Device 200 selects 'Inactive', the present function is not activated and implemented. The user selects by utilizing Input Device 210 (FIG. 1) or via voice recognition system one of the foregoing two options displayed on cordless phone connecting function screen (S2). CPU 211 (FIG. 1) sends the option selected in the previous step to Host H (FIG. 2) in a wireless fashion (S3). Host H (FIG. 2) receives the option sent in the previous step from Communication Device 200 (S4). If the option received in the previous step is 'Active', Host H (FIG. 2) stores the cordless phone connection active data in Cordless Phone Connection Flag Data Storage Area H188b1; if the option selected in the previous step is 'Inactive', Host H (FIG. 2) stores the cordless phone connection inactive data therein (S5).

This paragraph illustrate(s) Phone Call For Cordless Phone CP188a Notifying Software H188c2 of Host H (FIG. 2) and Phone Call For Cordless Phone CP188a Notifying Software 206188c2 of Communication Device 200, which output notification when Cordless Phone CP188a receives a phone call. In the present embodiment, CPU 211 (FIG. 1) checks the incoming signal (S1). CPU 211 (FIG. 1) scans Cordless Phone Signal Data Storage Area 206188b2 (S2). If Cordless Phone Signal Data#1 is detected in the incoming signal received in S1, CPU 211 (FIG. 1) proceeds to the next step (S3). CPU 211 (FIG. 1) sends the cordless phone signal data#1 acknowledgment and flag data inquiry to Host H in a wireless fashion (S4). Here, the cordless phone signal data#1 acknowledgment and flag data inquiry indicates that Cordless Phone Signal Data#1 is detected and inquires the data stored in Cordless Phone Connection Flag Data Storage Area H188b1 of Host H (FIG. 2). Host H (FIG. 2) receives the cordless phone signal data#1 acknowledgment and flag data inquiry from Communication Device 200 and checks the data stored in Cordless Phone Connection Flag Data Storage Area H188b1 (S5). If the cordless phone connection active data is stored in Cordless Phone Connection Flag Data Storage Area H188b1, Host H (FIG. 2) proceeds to the next step (S6). Host H (FIG. 2) retrieves Phone Ring Data#1 from Phone Ring Data Storage Area H188b3 and sends the data to Communication Device 200 (S7). CPU 211 (FIG. 1) receives Phone Ring Data#1 from Host H in a wireless fashion and outputs the data from Speaker 216 (FIG. 1) (S8). Host H (FIG. 2) retrieves Vibrating Pattern Data#1 from Vibrating Pattern Data Storage Area H188b4 and sends the data to Communication Device 200 (S9). CPU 211 (FIG. 1) receives Vibrating Pattern Data#1 from Host H in a wireless fashion and activates Vibrator 217 (FIG. 1) in accordance with Vibrating Pattern Data#1 (S10). Host H (FIG. 2) retrieves LED Pattern Data#1 from LED Pattern Data Storage Area H188b5 and sends the data to Communication Device 200 (S11). CPU 211 (FIG. 1) receives LED Pattern Data#1 from Host H in a wireless fashion and activates LED 219 (FIG. 380 of the Prior File Application) in accordance with LED Pattern Data#1 (S12). If the user answers the phone call, CPU 211 (FIG. 1) proceeds to the next step (S13). CPU 211 (FIG. 1) initiates voice and/or data communication thereafter via Cordless Phone CP188a (S14). The foregoing sequence is repeated periodically.

This paragraph illustrate(s) Phone Call For Cordless Phone CP188b Notifying Software H188c3 of Host H (FIG. 2) and Phone Call For Cordless Phone CP188b Notifying Software 206188c3 of Communication Device 200, which output notification when Cordless Phone CP188b receives a phone call. In the present embodiment, CPU 211 (FIG. 1) checks the incoming signal (S1). CPU 211 (FIG. 1) scans Cordless Phone Signal Data Storage Area 206188b2 (S2). If Cordless Phone Signal Data#2 is detected in the incoming signal received in S1, CPU 211 (FIG. 1) proceeds to the next step (S3). CPU 211 (FIG. 1) sends the cordless phone signal data#2 acknowledgment and flag data inquiry to Host H in a wireless fashion (S4). Here, the cordless phone signal data#2 acknowledgment and flag data inquiry indicates that Cordless Phone Signal Data#2 is detected and inquires the data stored in Cordless Phone Connection Flag Data Storage Area H188b1 of Host H (FIG. 2). Host H (FIG. 2) receives the cordless phone signal data#2 acknowledgment and flag data inquiry from Communication Device 200 and checks the data stored in Cordless Phone Connection Flag Data Storage Area H188b1 (S5). If the cordless phone connection active data is stored in Cordless Phone Connection Flag Data Storage Area H188b1, Host H (FIG. 2) proceeds to the next step (S6). Host H (FIG. 2) retrieves Phone Ring Data#2 from Phone Ring Data Storage Area H188b3 and sends the data to Communication Device 200 (S7). CPU 211 (FIG. 1) receives Phone Ring Data#2 from Host H in a wireless fashion and outputs the data from Speaker 216 (FIG. 1) (S8). Host H (FIG. 2) retrieves Vibrating Pattern Data#2 from Vibrating Pattern Data Storage Area H188b4 and sends the data to Communication Device 200 (S9). CPU 211 (FIG. 1) receives Vibrating Pattern Data#2 from Host H in a wireless fashion and activates Vibrator 217 (FIG. 1) in accordance with Vibrating Pattern Data#2 (S10). Host H (FIG. 2) retrieves LED Pattern Data#2 from LED Pattern Data Storage Area H188b5 and sends the data to Communication Device 200 (S11). CPU 211 (FIG. 1) receives LED Pattern Data#2 from Host H in a wireless fashion and activates LED 219 (FIG. 380 of the Prior File Application) in accordance with LED Pattern Data#2 (S12). If the user answers the phone call, CPU 211 (FIG. 1) proceeds to the next step (S13). CPU 211 (FIG. 1) initiates voice and/or data communication thereafter via Cordless Phone CP188b (S14). The foregoing sequence is repeated periodically.

This paragraph illustrate(s) Phone Call For Cordless Phone CP188c Notifying Software H188c4 of Host H (FIG. 2) and Phone Call For Cordless Phone CP188c Notifying Software 206188c4 of Communication Device 200, which output notification when Cordless Phone CP188c receives a phone call. In the present embodiment, CPU 211 (FIG. 1) checks the incoming signal (S1). CPU 211 (FIG. 1) scans Cordless Phone Signal Data Storage Area 206188b2 (S2). If Cordless Phone Signal Data#3 is detected in the incoming signal received in S1, CPU 211 (FIG. 1) proceeds to the next step (S3). CPU 211 (FIG. 1) sends the cordless phone signal data#3 acknowledgment and flag data inquiry to Host H in a wireless fashion (S4). Here, the cordless phone signal data#3 acknowledgment and flag data inquiry indicates that Cordless Phone Signal Data#3 is detected and inquires the data stored in Cordless Phone Connection Flag Data Storage Area H188*b*1 of Host H (FIG. 2). Host H (FIG. 2) receives the cordless phone signal data#3 acknowledgment and flag data inquiry from Communication Device 200 and checks the data stored in Cordless Phone Connection Flag Data Storage Area H188*b*1 (S5). If the cordless phone connection active data is stored in Cordless Phone Connection Flag Data Storage Area H188*b*1, Host H (FIG. 2) proceeds to the next step (S6). Host H (FIG. 2) retrieves Phone Ring Data#3 from Phone Ring Data Storage Area H188*b*3 and sends the data to Communication Device 200 (S7). CPU 211 (FIG. 1) receives Phone Ring Data#3 from Host H in a wireless fashion and outputs the data from Speaker 216 (FIG. 1) (S8). Host H (FIG. 2) retrieves Vibrating Pattern Data#3 from Vibrating Pattern Data Storage Area H188*b*4 and sends the data to Communication Device 200 (S9). CPU 211 (FIG. 1) receives Vibrating Pattern Data#3 from Host H in a wireless fashion and activates Vibrator 217 (FIG. 1) in accordance with Vibrating Pattern Data#3 (S10). Host H (FIG. 2) retrieves LED Pattern Data#3 from LED Pattern Data Storage Area H188*b*5 and sends the data to Communication Device 200 (S11). CPU 211 (FIG. 1) receives LED Pattern Data#3 from Host H in a wireless fashion and activates LED 219 (FIG. 380 of the Prior File Application) in accordance with LED Pattern Data#3 (S12). If the user answers the phone call, CPU 211 (FIG. 1) proceeds to the next step (S13). CPU 211 (FIG. 1) initiates voice and/or data communication thereafter via Cordless Phone CP188*c* (S14). The foregoing sequence is repeated periodically.

This paragraph illustrate(s) Phone Call For Cordless Phone CP188*d* Notifying Software H188*c*5 of Host H (FIG. 2) and Phone Call For Cordless Phone CP188*d* Notifying Software 206188*c*5 of Communication Device 200, which output notification when Cordless Phone CP188*d* receives a phone call. In the present embodiment, CPU 211 (FIG. 1) checks the incoming signal (S1). CPU 211 (FIG. 1) scans Cordless Phone Signal Data Storage Area 206188*b*2 (S2). If Cordless Phone Signal Data#4 is detected in the incoming signal received in S1, CPU 211 (FIG. 1) proceeds to the next step (S3). CPU 211 (FIG. 1) sends the cordless phone signal data#4 acknowledgment and flag data inquiry to Host H in a wireless fashion (S4). Here, the cordless phone signal data#4 acknowledgment and flag data inquiry indicates that Cordless Phone Signal Data#4 is detected and inquires the data stored in Cordless Phone Connection Flag Data Storage Area H188*b*1 of Host H (FIG. 2). Host H (FIG. 2) receives the cordless phone signal data#4 acknowledgment and flag data inquiry from Communication Device 200 and checks the data stored in Cordless Phone Connection Flag Data Storage Area H188*b*1 (S5). If the cordless phone connection active data is stored in Cordless Phone Connection Flag Data Storage Area H188*b*1, Host H (FIG. 2) proceeds to the next step (S6). Host H (FIG. 2) retrieves Phone Ring Data#4 from Phone Ring Data Storage Area H188*b*3 and sends the data to Communication Device 200 (S7). CPU 211 (FIG. 1) receives Phone Ring Data#4 from Host H in a wireless fashion and outputs the data from Speaker 216 (FIG. 1) (S8). Host H (FIG. 2) retrieves Vibrating Pattern Data#4 from Vibrating Pattern Data Storage Area H188*b*4 and sends the data to Communication Device 200 (S9). CPU 211 (FIG. 1) receives Vibrating Pattern Data#4 from Host H in a wireless fashion and activates Vibrator 217 (FIG. 1) in accordance with Vibrating Pattern Data#4 (S10). Host H (FIG. 2) retrieves LED Pattern Data#4 from LED Pattern Data Storage Area H188*b*5 and sends the data to Communication Device 200 (S11). CPU 211 (FIG. 1) receives LED Pattern Data#4 from Host H in a wireless fashion and activates LED 219 (FIG. 380 of the Prior File Application) in accordance with LED Pattern Data#4 (S12). If the user answers the phone call, CPU 211 (FIG. 1) proceeds to the next step (S13). CPU 211 (FIG. 1) initiates voice and/or data communication thereafter via Cordless Phone CP188*d* (S14). The foregoing sequence is repeated periodically.

The following paragraphs illustrate another embodiment wherein Communication Device 200 plays the major role in implementing the present function.

This paragraph illustrate(s) Cordless Phone Connecting Function Activating Software 206188*c*1 of Communication Device 200, which activates the present function. In the present embodiment, CPU 211 (FIG. 1) displays the cordless phone connecting function screen (S1). Here, the cordless phone connecting function screen is utilized to activate the present function. The following two options are displayed on the screen: 'Active' and 'Inactive'. If the user of Communication Device 200 selects 'Active', the present function is activated and implemented, whereas if the user of Communication Device 200 selects 'Inactive', the present function is not activated and implemented. The user selects by utilizing Input Device 210 (FIG. 1) or via voice recognition system one of the foregoing two options displayed on cordless phone connecting function screen (S2). If the option selected in the previous step is 'Active', CPU 211 (FIG. 1) stores the cordless phone connection active data in Cordless Phone Connection Flag Data Storage Area 206188*b*1; if the option selected in the previous step is 'Inactive', CPU 211 (FIG. 1) stores the cordless phone connection inactive data therein (S3).

This paragraph illustrate(s) Phone Call For Cordless Phone CP188*a* Notifying Software 206188*c*2 of Communication Device 200, which outputs notification when Cordless Phone CP188*a* receives a phone call. In the present embodiment, CPU 211 (FIG. 1) checks the incoming signal (S1). CPU 211 (FIG. 1) scans Cordless Phone Signal Data Storage Area 206188*b*2 (S2). If Cordless Phone Signal Data#1 is detected in the incoming signal received in S1, CPU 211 (FIG. 1) proceeds to the next step (S3). CPU 211 (FIG. 1) checks the data stored in Cordless Phone Connection Flag Data Storage Area 206188*b*1 (S4). If the cordless phone connection active data is stored in Cordless Phone Connection Flag Data Storage Area 206188*b*1, CPU 211 (FIG. 1) proceeds to the next step (S5). CPU 211 (FIG. 1) retrieves Phone Ring Data#1 from Phone Ring Data Storage Area 206188*b*3 and outputs the data from Speaker 216 (FIG. 1) (S6). CPU 211 (FIG. 1) retrieves Vibrating Pattern Data#1 from Vibrating Pattern Data Storage Area 206188*b*4 and activates Vibrator 217 (FIG. 1) in accordance with Vibrating Pattern Data#1 (S7). CPU 211 (FIG. 1) retrieves LED Pattern Data#1 from LED Pattern Data Storage Area 206188*b*5 and activates LED 219 (FIG. 380 of the Prior File Application) in accordance with LED Pattern Data#1 (S8). If the user answers the phone call, CPU 211 (FIG. 1) proceeds to the next step (S9). CPU 211 (FIG. 1) initiates voice and/or data communication thereafter via Cordless Phone CP188*a* (S10). The foregoing sequence is repeated periodically.

This paragraph illustrate(s) Phone Call For Cordless Phone CP188*b* Notifying Software 206188*c*3 of Communication Device 200, which outputs notification when Cordless Phone CP188*b* receives a phone call. In the present embodiment, CPU 211 (FIG. 1) checks the incoming signal (S1). CPU 211 (FIG. 1) scans Cordless Phone Signal Data Storage Area 206188*b*2 (S2). If Cordless Phone Signal Data#2 is detected in the incoming signal received in S1, CPU 211 (FIG. 1) proceeds to the next step (S3). CPU 211 (FIG. 1) checks the data stored in Cordless Phone Connection Flag Data Storage Area 206188*b*1 (S4). If the cordless phone connection active data is stored in Cordless Phone Connection Flag Data Storage Area 206188*b*1, CPU 211 (FIG. 1) proceeds to the next step (S5). CPU 211 (FIG. 1) retrieves Phone Ring Data#2 from Phone Ring Data Storage Area 206188*b*3 and outputs the data from Speaker 216 (FIG. 1) (S6). CPU 211 (FIG. 1) retrieves Vibrating Pattern Data#2 from Vibrating Pattern Data Storage Area 206188*b*4 and activates Vibrator 217 (FIG. 1) in accordance with Vibrating Pattern Data#2 (S7). CPU 211 (FIG. 1) retrieves LED Pattern Data#2 from LED Pattern Data Storage Area 206188*b*5 and activates LED 219 (FIG. 380 of the Prior File Application) in accordance with LED Pattern Data#2 (S8). If the user answers the phone call, CPU 211 (FIG. 1) proceeds to the next step (S9). CPU 211 (FIG. 1) initiates voice and/or data communication thereafter via Cordless Phone CP188*b* (S10). The foregoing sequence is repeated periodically.

This paragraph illustrate(s) Phone Call For Cordless Phone CP188*c* Notifying Software 206188*c*4 of Communication Device 200, which outputs notification when Cordless Phone CP188*c* receives a phone call. In the present embodiment, CPU 211 (FIG. 1) checks the incoming signal (S1). CPU 211 (FIG. 1) scans Cordless Phone Signal Data Storage Area 206188*b*2 (S2). If Cordless Phone Signal Data#3 is detected in the incoming signal received in S1, CPU 211 (FIG. 1) proceeds to the next step (S3). CPU 211 (FIG. 1) checks the data stored in Cordless Phone Connection Flag Data Storage Area 206188*b*1 (S4). If the cordless phone connection active data is stored in Cordless Phone Connection Flag Data Storage Area 206188*b*1, CPU 211 (FIG. 1) proceeds to the next step (S5). CPU 211 (FIG. 1) retrieves Phone Ring Data#3 from Phone Ring Data Storage Area 206188*b*3 and outputs the data from Speaker 216 (FIG. 1) (S6). CPU 211 (FIG. 1) retrieves Vibrating Pattern Data#3 from Vibrating Pattern Data Storage Area 206188*b*4 and activates Vibrator 217 (FIG. 1) in accordance with Vibrating Pattern Data#3 (S7). CPU 211 (FIG. 1) retrieves LED Pattern Data#3 from LED Pattern Data Storage Area 206188*b*5 and activates LED 219 (FIG. 380 of the Prior File Application) in accordance with LED Pattern Data#3 (S8). If the user answers the phone call, CPU 211 (FIG. 1) proceeds to the next step (S9). CPU 211 (FIG. 1) initiates voice and/or data communication thereafter via Cordless Phone CP188*c* (S10). The foregoing sequence is repeated periodically.

This paragraph illustrate(s) Phone Call For Cordless Phone CP188*d* Notifying Software 206188*c*5 of Communication Device 200, which outputs notification when Cordless Phone CP188*d* receives a phone call. In the present embodiment, CPU 211 (FIG. 1) checks the incoming signal (S1). CPU 211 (FIG. 1) scans Cordless Phone Signal Data Storage Area 206188*b*2 (S2). If Cordless Phone Signal Data#4 is detected in the incoming signal received in S1, CPU 211 (FIG. 1) proceeds to the next step (S3). CPU 211 (FIG. 1) checks the data stored in Cordless Phone Connection Flag Data Storage Area 206188*b*1 (S4). If the cordless phone connection active data is stored in Cordless Phone Connection Flag Data Storage Area 206188*b*1, CPU 211 (FIG. 1) proceeds to the next step (S5). CPU 211 (FIG. 1) retrieves Phone Ring Data#4 from Phone Ring Data Storage Area 206188*b*3 and outputs the data from Speaker 216 (FIG. 1) (S6). CPU 211 (FIG. 1) retrieves Vibrating Pattern Data#4 from Vibrating Pattern Data Storage Area 206188*b*4 and activates Vibrator 217 (FIG. 1) in accordance with Vibrating Pattern Data#4 (S7). CPU 211 (FIG. 1) retrieves LED Pattern Data#4 from LED Pattern Data Storage Area 206188*b*5 and activates LED 219 (FIG. 380 of the Prior File Application) in accordance with LED Pattern Data#4 (S8). If the user answers the phone call, CPU 211 (FIG. 1) proceeds to the next step (S9). CPU 211 (FIG. 1) initiates voice and/or data communication thereafter via Cordless Phone CP188*d* (S10). The foregoing sequence is repeated periodically.

<<Emoney Transferring Function>>

The following paragraphs illustrate the emoney transferring function, wherein the emoney data which is stored in Device A, a Communication Device 200, is retrieved and sent to Device B, another Communication Device 200, in a wireless fashion. Here, the emoney data is the data stored in an electronic form which represents a certain value of money. The foregoing emoney data may be stored in Host H (FIG. 2).

This paragraph illustrates the storage area included in Host H (FIG. 2). In the present embodiment, Host H includes Emoney Transferring Information Storage Area H192*a* of which the data and the software programs stored therein are described hereinafter.

This paragraph illustrates the storage areas included in Emoney Transferring Information Storage Area H192*a*. In the present embodiment, Emoney Transferring Information Storage Area H192*a* includes Emoney Transferring Data Storage Area H192*b* and Emoney Transferring Software Storage Area H192*c*. Emoney Transferring Data Storage Area H192*b* stores the data necessary to implement the present function on the side of Host H (FIG. 2), such as the ones described hereinafter. Emoney Transferring Software Storage Area H192*c* stores the software programs necessary to implement the present function on the side of Host H (FIG. 2), such as the ones described hereinafter.

This paragraph illustrates the storage areas included in Emoney Transferring Data Storage Area H192*b*. In the present embodiment, Emoney Transferring Data Storage Area H192*b* includes Total Emoney Data Storage Area H192*b*1, Processing Emoney Data Storage Area H192*b*2, Log Data Storage Area H192*b*3, and Work Area H192*b*4. Total Emoney Data Storage Area H192*b*1 stores the total emoney data which represents the total amount (or balance) of emoney data owned by Device A. Here, the emoney data is the data stored in an electronic form which represents a certain value of money in U.S. dollars. Processing Emoney Data Storage Area H192*b*2 stores the processing emoney data which represents the amount of emoney data processed by implementing the present function, i.e., sent to device or received from another device. Log Data Storage Area H192*b*3 stores the log data which indicates the log of disposing the emoney owned by Device A (e.g., depositing to bank, transferring to another Communication Device 200, purchasing goods, paying for services, buying tickets, etc.). Work Area H192*b*4 is utilized as a work area to perform calculation and temporarily store data.

This paragraph illustrates the software programs stored in Emoney Transferring Software Storage Area H192*c*. In the present embodiment, Emoney Transferring Software Storage Area H192*c* stores Transferring Emoney Data Identifying Software H192*c*1 and Emoney Data Sending/Receiving Software H192*c*2. Transferring Emoney Data Identifying Software H192*c*1 is the software program described hereinafter. Emoney Data Sending/Receiving Software H192*c*2 is the software program described hereinafter.

This paragraph illustrates the storage area included in RAM 206 (FIG. 1) of Device A. In the present embodiment, RAM 206 includes Emoney Transferring Information Storage Area 206A192a of which the data and the software programs stored therein are described hereinafter.

The data and/or the software programs necessary to implement the present function may be downloaded from Host H (FIG. 2) to Device A.

This paragraph illustrates the storage areas included in Emoney Transferring Information Storage Area 206A192a. In the present embodiment, Emoney Transferring Information Storage Area 206A192a includes Emoney Transferring Data Storage Area 206A192b and Emoney Transferring Software Storage Area 206A192c. Emoney Transferring Data Storage Area 206A192b stores the data necessary to implement the present function on the side of Device A, such as the ones described hereinafter. Emoney Transferring Software Storage Area 206A192c stores the software programs necessary to implement the present function on the side of Device A, such as the ones described hereinafter.

This paragraph illustrates the storage areas included in Emoney Transferring Data Storage Area 206A192b. In the present embodiment, Emoney Transferring Data Storage Area 206A192b includes Total Emoney Data Storage Area 206A192b1, Processing Emoney Data Storage Area 206A192b2, Log Data Storage Area 206A192b3, and Work Area 206A192b4. Total Emoney Data Storage Area 206A192b1 stores the total emoney data which represents the total amount (or balance) of emoney data stored in Device A. Here, the emoney data is the data stored in an electronic form which represents a certain value of money in U.S. dollars. Processing Emoney Data Storage Area 206A192b2 stores the processing emoney data which represents the amount of emoney data processed by implementing the present function, i.e., sent to device or received from another device. Log Data Storage Area 206A192b3 stores the log data which indicates the log of disposing the emoney stored in Device A (e.g., depositing to bank, transferring to another Communication Device 200, purchasing goods, paying for services, buying tickets, etc.). Work Area 206A192b4 is utilized as a work area to perform calculation and temporarily store data.

This paragraph illustrates the software programs stored in Emoney Transferring Software Storage Area 206A192c. In the present embodiment, Emoney Transferring Software Storage Area 206A192c stores Transferring Emoney Data Identifying Software 206A192c1 and Emoney Data Sending/Receiving Software 206A192c2. Transferring Emoney Data Identifying Software 206A192c1 is the software program described hereinafter. Emoney Data Sending/Receiving Software 206A192c2 is the software program described hereinafter.

This paragraph illustrates the storage area included in RAM 206 (FIG. 1) of Device B. In the present embodiment, RAM 206 includes Emoney Transferring Information Storage Area 206B192a of which the data and the software programs stored therein are described hereinafter.

The data and/or the software programs necessary to implement the present function may be downloaded from Host H (FIG. 2) to Device B.

This paragraph illustrates the storage areas included in Emoney Transferring Information Storage Area 206B192a. In the present embodiment, Emoney Transferring Information Storage Area 206B192a includes Emoney Transferring Data Storage Area 206B192b and Emoney Transferring Software Storage Area 206B192c. Emoney Transferring Data Storage Area 206B192b stores the data necessary to implement the present function on the side of Device B, such as the ones described hereinafter. Emoney Transferring Software Storage Area 206B192c stores the software programs necessary to implement the present function on the side of Device B, such as the ones described hereinafter.

This paragraph illustrates the storage areas included in Emoney Transferring Data Storage Area 206B192b. In the present embodiment, Emoney Transferring Data Storage Area 206B192b includes Total Emoney Data Storage Area 206B192b1, Processing Emoney Data Storage Area 206B192b2, Log Data Storage Area 206B192b3, and Work Area 206B192b4. Total Emoney Data Storage Area 206B192b1 stores the total emoney data which represents the total amount (or balance) of emoney data stored in Device B. Here, the emoney data is the data stored in an electronic form which represents a certain value of money in U.S. dollars. Processing Emoney Data Storage Area 206B192b2 stores the processing emoney data which represents the amount of emoney data processed by implementing the present function, i.e., sent to device or received from another device. Log Data Storage Area 206B192b3 stores the log data which indicates the log of disposing the emoney stored in Device B (e.g., depositing to bank, transferring to another Communication Device 200, purchasing goods, paying for services, buying tickets, etc.). Work Area 206B192b4 is utilized as a work area to perform calculation and temporarily store data.

This paragraph illustrates the software programs stored in Emoney Transferring Software Storage Area 206B192c. In the present embodiment, Emoney Transferring Software Storage Area 206B192c stores Emoney Data Sending/Receiving Software 206B192c2. Emoney Data Sending/Receiving Software 206B192c2 is the software program described hereinafter.

This paragraph illustrate(s) Transferring Emoney Data Identifying Software H192c1 of Host H (FIG. 2) and Transferring Emoney Data Identifying Software 206A192c1 of Device A, which identify the amount of emoney to be transferred to Device B. In the present embodiment, CPU 211 (FIG. 1) of Device A displays the transferring emoney data identifying screen on LCD 201 (FIG. 1) of Device A (S1). Here, the transferring emoney data identifying screen is utilized to input the amount of emoney to be transferred from Device A to Device B. The user of Device A inputs by utilizing Input Device 210 (FIG. 1) or via voice recognition system the amount of emoney to be transferred to Device B (S2). CPU 211 (FIG. 1) of Device A sends the amount of emoney to be transferred to Device B to Host H (FIG. 2) in a wireless fashion (S3). Host H (FIG. 2) receives the amount of emoney to be transferred to Device B from Device A and stores the data as the processing emoney data in Processing Emoney Data Storage Area H192b2 (S4).

This paragraph illustrate(s) Emoney Data Sending/Receiving Software H192c2 of Host H (FIG. 2), Emoney Data Sending/Receiving Software 206A192c2 of Device A, and Emoney Data Sending/Receiving Software 206B192c2 of Device B, which transfer the amount of emoney identified in the previous paragraph from Host H (FIG. 2) to Device B via Device A. In the present embodiment, Host H (FIG. 2) retrieves the processing emoney data from Processing Emoney Data Storage Area H192b2 and sends the data to Device A in a wireless fashion (S1). CPU 211 (FIG. 1) of Device A receives the processing emoney data from Host H (FIG. 2) in a wireless fashion and sends the data to Device B in a wireless fashion (S2). CPU 211 (FIG. 1) of Device B receives the processing emoney data from Device A in a wireless fashion and stores the data in Processing Emoney Data Storage Area 206B192b2 (S3). CPU 211 (FIG. 1) of Device B sends the processing emoney data receipt to Device A in a wireless fashion (S4). Here, the processing emoney data receipt indicates that Device B has duly received the processing emoney data from Device A. CPU 211 (FIG. 1) of Device A receives the processing emoney data receipt from Device B in a wireless fashion and sends the data to Host H (FIG. 2) in a wireless fashion (S5). Host H (FIG. 2) receives the processing emoney data receipt from Device A and updates the total emoney data stored in Total Emoney Data Storage Area H192b1 by deleting the processing emoney data stored in Processing Emoney Data Storage Area H192b2 therefrom (S6). Host H (FIG. 2) updates the log data stored in Log Data Storage Area H192b3 (S7). Host H (FIG. 2) retrieves the total emoney data from Total Emoney Data Storage Area H192b1 (S8). Host H (FIG. 2) retrieves the log data from Log Data Storage Area H192b3 (S9). Host H (FIG. 2) sends the total emoney data and the log data retrieved in the previous two steps to Device A (S10). CPU 211 (FIG. 1) of Device A receives the total emoney data and the log data sent in the previous step from Host H (FIG. 2) in a wireless fashion and displays the data on LCD 201 (FIG. 1) of Device A (S11). CPU 211 (FIG. 1) of Device B updates the total emoney data stored in Total Emoney Data Storage Area 206B192b1 by adding the processing emoney data stored in Processing Emoney Data Storage Area 206B192b2 thereto (S12). CPU 211 (FIG. 1) of Device B updates the log data stored in Log Data Storage Area 206B192b3 (S13). CPU 211 (FIG. 1) of Device B retrieves the total emoney data from Total Emoney Data Storage Area 206B192b1 and displays the data on LCD 201 (FIG. 1) of Device B (S14). CPU 211 (FIG. 1) of Device B retrieves the log data from Log Data Storage Area 206B192b3 and displays the data on LCD 201 (FIG. 1) of Device B (S15).

The following paragraphs illustrate another embodiment wherein Device A plays the major role in implementing the present function.

This paragraph illustrate(s) Transferring Emoney Data Identifying Software 206A192c1 of Device A, which identifies the amount of emoney to be transferred to Device B. In the present embodiment, CPU 211 (FIG. 1) of Device A displays the transferring emoney data identifying screen on LCD 201 (FIG. 1) of Device A (S1). Here, the transferring emoney data identifying screen is utilized to input the amount of emoney to be transferred from Device A to Device B. The user of Device A inputs by utilizing Input Device 210 (FIG. 1) or via voice recognition system the amount of emoney to be transferred to Device B (S2). CPU 211 (FIG. 1) of Device A stores the amount of emoney to be transferred to Device B as the processing emoney data in Processing Emoney Data Storage Area 206A192b2 (S3).

This paragraph illustrate(s) Emoney Data Sending/Receiving Software 206A192c2 of Device A and Emoney Data Sending/Receiving Software 206B192c2 of Device B, which transfer the amount of emoney identified in the previous paragraph from Device A to Device B. In the present embodiment, CPU 211 (FIG. 1) of Device A retrieves the processing emoney data from Processing Emoney Data Storage Area 206A192b2 and sends the data to Device B in a wireless fashion (S1). CPU 211 (FIG. 1) of Device B receives the processing emoney data from Device A in a wireless fashion and stores the data in Processing Emoney Data Storage Area 206B192b2 (S2). CPU 211 (FIG. 1) of Device B sends the processing emoney data receipt to Device A in a wireless fashion (S3). Here, the processing emoney data receipt indicates that Device B has duly received the processing emoney data from Device A. CPU 211 (FIG. 1) of Device A receives the processing emoney data receipt from Device B in a wireless fashion (S4). CPU 211 (FIG. 1) of Device A updates the total emoney data stored in Total Emoney Data Storage Area 206A192b1 by deleting the processing emoney data stored in Processing Emoney Data Storage Area 206A192b2 therefrom (S5). CPU 211 (FIG. 1) of Device A updates the log data stored in Log Data Storage Area 206A192b3 (S6). CPU 211 (FIG. 1) of Device A retrieves the total emoney data from Total Emoney Data Storage Area 206A192b1 and displays the data on LCD 201 (FIG. 1) of Device A (S7). CPU 211 (FIG. 1) of Device A retrieves the log data from Log Data Storage Area 206A192b3 and displays the data on LCD 201 (FIG. 1) of Device A (S8). CPU 211 (FIG. 1) of Device B updates the total emoney data stored in Total Emoney Data Storage Area 206B192b1 by adding the processing emoney data stored in Processing Emoney Data Storage Area 206B192b2 thereto (S9). CPU 211 (FIG. 1) of Device B updates the log data stored in Log Data Storage Area 206B192b3 (S10). CPU 211 (FIG. 1) of Device B retrieves the total emoney data from Total Emoney Data Storage Area 206B192b1 and displays the data on LCD 201 (FIG. 1) of Device B (S11). CPU 211 (FIG. 1) of Device B retrieves the log data from Log Data Storage Area 206B192b3 and displays the data on LCD 201 (FIG. 1) of Device B (S12).

<<Enhanced Caller ID Displaying Function>>

The following paragraphs illustrate the enhanced caller ID displaying function which displays the phone number data and the personal data of the caller upon receiving a phone call. The personal data may be retrieved from Communication Device 200 or Host H (FIG. 2). If the personal data of the caller is not found in Communication Device 200, the public data (disclosed in Yellow Pages and/or White Pages) stored in Host H (FIG. 2) may be displayed instead.

This paragraph illustrates the storage area included in Host H (FIG. 2). In the present embodiment, Host H (FIG. 2) includes Enhanced Caller ID Displaying Information Storage Area H210a of which the data and the software program(s) stored therein are described hereinafter.

This paragraph illustrates the storage area(s) included in Enhanced Caller ID Displaying Information Storage Area H210a. In the present embodiment, Enhanced Caller ID Displaying Information Storage Area H210a includes Enhanced Caller ID Displaying Data Storage Area H210b and Enhanced Caller ID Displaying Software Storage Area H210c. Enhanced Caller ID Displaying Data Storage Area H210b stores the data necessary to implement the present function on the side of Host H (FIG. 2), such as the one(s) described hereinafter. Enhanced Caller ID Displaying Software Storage Area H210c stores the software program(s) necessary to implement the present function on the side of Host H (FIG. 2), such as the one(s) described hereinafter.

This paragraph illustrates the storage area(s) included in Enhanced Caller ID Displaying Data Storage Area H210b. In the present embodiment, Enhanced Caller ID Displaying Data Storage Area H210b includes Private Individual Phone Number Data Storage Area H210b1, Private Individual Personal Data Storage Area H210b2, Public Individual Phone Number Data Storage Area H210b3, Public Individual Personal Data Storage Area H210b4, and Work Area H210b5. Private Individual Phone Number Data Storage Area H210b1 stores the data described hereinafter. Private Individual Personal Data Storage Area H210b2 stores the data described hereinafter. Public Individual Phone Number Data Storage Area H210b3 stores the data described hereinafter. Public Individual Personal Data Storage Area H210b4 stores the data described hereinafter. Work Area H210b5 is utilized as a work area to perform calculation and temporarily store data.

This paragraph illustrates the data stored in Private Individual Phone Number Data Storage Area H210b1. In the present embodiment, Private Individual Phone Number Data Storage Area H210b1 comprises two columns, i.e., 'Private Individual Phone Number ID' and 'Phone Number Data'. Column 'Private Individual Phone Number ID' stores the private individual phone number IDs, and each private individual phone number ID is an identification of the corresponding phone number data stored in column 'Phone Number Data'. Column 'Phone Number Data' stores the phone number data, and each phone number data indicates the phone number of an individual. Each of the phone number data is the data authored and/or registered by the user of Communication Device 200. In the present embodiment, Private Individual Phone Number Data Storage Area H210b1 stores the following data: 'Private Individual Phone Number#1' and the corresponding 'Phone Number Data#1'; 'Private Individual Phone Number#2' and the corresponding 'Phone Number Data#2'; 'Private Individual Phone Number#3' and the corresponding 'Phone Number Data#3'; and 'Private Individual Phone Number#4' and the corresponding 'Phone Number Data#4'.

This paragraph illustrates the data stored in Private Individual Personal Data Storage Area H210b2. In the present embodiment, Private Individual Personal Data Storage Area H210b2 comprises two columns, i.e., 'Private Individual Phone Number ID' and 'Personal Data'. Column 'Private Individual Phone Number ID' stores the private individual phone number IDs, and each private individual phone number ID is an identification of the corresponding personal data stored in column 'Personal Data'. The private individual phone number IDs stored in the present storage area are identical to the ones described in the previous paragraph. Column 'Personal Data' stores the personal data, and each personal data includes the following data of an individual: the personal name data, the title data, the company name data, the office phone number data, the office fax number data, the email address data, the office street address data, the home address data, and/or the home phone number data. The personal name data indicates the personal name of the individual of the corresponding phone number data. The title data indicates the title at work of the individual of the corresponding phone number data. The company name data indicates the name of the company for which the individual of the corresponding phone number data works. The office phone number data indicates the office phone number of the individual of the corresponding phone number data. The office fax number data indicates the office fax number of the individual of the corresponding phone number data. The email address data indicates the email address of the individual of the corresponding phone number data. The office street address data indicates the office street address of the individual of the corresponding phone number data. The home address data indicates the home address of the individual of the corresponding phone number data. The home phone number data indicates the home phone number of the individual of the corresponding phone number data. In the present embodiment, Private Individual Personal Data Storage Area H210b2 stores the following data: 'Private Individual Phone Number#1' and the corresponding 'Personal Data#1'; 'Private Individual Phone Number#2' and the corresponding 'Personal Data#2'; 'Private Individual Phone Number#3' and the corresponding 'Personal Data#3'; and 'Private Individual Phone Number#4' and the corresponding 'Personal Data#4'. Each of the personal data is the data authored and/or registered by the user of Communication Device 200.

This paragraph illustrates the data stored in Public Individual Phone Number Data Storage Area H210b3. In the present embodiment, Public Individual Phone Number Data Storage Area H210b3 comprises two columns, i.e., 'Public Individual Phone Number ID' and 'Phone Number Data'. Column 'Public Individual Phone Number ID' stores the public individual phone number IDs, and each public individual phone number ID is an identification of the corresponding phone number data stored in column 'Phone Number Data'. Column 'Phone Number Data' stores the phone number data, and each phone number data indicates the phone number of an individual. Each of the phone number data is the data disclosed to the public by, for example, Yellow Pages and/or White Pages. In the present embodiment, Public Individual Phone Number Data Storage Area H210b3 stores the following data: 'Public Individual Phone Number#1' and the corresponding 'Phone Number Data#1'; 'Public Individual Phone Number#2' and the corresponding 'Phone Number Data#2'; 'Public Individual Phone Number#3' and the corresponding 'Phone Number Data#3'; 'Public Individual Phone Number#4' and the corresponding 'Phone Number Data#4'; 'Public Individual Phone Number#5' and the corresponding 'Phone Number Data#5'; 'Public Individual Phone Number#6' and the corresponding 'Phone Number Data#6'; 'Public Individual Phone Number#7' and the corresponding 'Phone Number Data#7'; 'Public Individual Phone Number#8' and the corresponding 'Phone Number Data#8'; 'Public Individual Phone Number#9' and the corresponding 'Phone Number Data#9'; and 'Public Individual Phone Number#10' and the corresponding 'Phone Number Data#10'.

This paragraph illustrates the data stored in Public Individual Personal Data Storage Area H210b4. In the present embodiment, Public Individual Personal Data Storage Area H210b4 comprises two columns, i.e., 'Public Individual Phone Number ID' and 'Personal Data'. Column 'Public Individual Phone Number ID' stores the public individual phone number IDs, and each public individual phone number ID is an identification of the corresponding personal data stored in column 'Personal Data'. The public individual phone number IDs stored in the present storage area are identical to the ones described in the previous paragraph. Column 'Personal Data' stores the personal data, and each personal data includes the following data of an individual: the personal name data, the home address data, and/or the home phone number data. The personal name data indicates the personal name of the individual of the corresponding phone number data. The home address data indicates the home address of the individual of the corresponding phone number data. The home phone number data indicates the home phone number of the individual of the corresponding phone number data. In the present embodiment, Public Individual Personal Data Storage Area H210b4 stores the following data: 'Public Individual Phone Number#1' and the corresponding 'Personal Data#1'; 'Public Individual Phone Number#2' and the corresponding 'Personal Data#2'; 'Public Individual Phone Number#3' and the corresponding 'Personal Data#3'; 'Public Individual Phone Number#4' and the corresponding 'Personal Data#4'; 'Public Individual Phone Number#5' and the corresponding 'Personal Data#5'; 'Public Individual Phone Number#6' and the corresponding 'Personal Data#6'; 'Public Individual Phone Number#7' and the corresponding 'Personal Data#7'; 'Public Individual Phone Number#8' and the corresponding 'Personal Data#8'; 'Public Individual Phone Number#9' and the corresponding 'Personal Data#9'; and 'Public Individual Phone Number#10' and the corresponding 'Personal Data#10'.

Each of the personal data is the data disclosed to the public by, for example, Yellow Pages and/or White Pages.

This paragraph illustrates the software program(s) stored in Enhanced Caller ID Displaying Software Storage Area H210c. In the present embodiment, Enhanced Caller ID Displaying Software Storage Area H210c stores Caller ID Displaying Software H210c1, Upgraded Caller ID Displaying Software H210c2, and Super Caller ID Displaying Software H210c3. Caller ID Displaying Software H210c1 is the software program described hereinafter. Upgraded Caller ID Displaying Software H210c2 is the software program described hereinafter. Super Caller ID Displaying Software H210c3 is the software program described hereinafter.

This paragraph illustrates the storage area included in RAM 206 (FIG. 1) of Communication Device 200. In the present embodiment, RAM 206 includes Enhanced Caller ID Displaying Information Storage Area 206210a of which the data and the software program(s) stored therein are described hereinafter.

The data and/or the software program(s) necessary to implement the present function may be downloaded from Host H (FIG. 2) to Communication Device 200.

This paragraph illustrates the storage area(s) included in Enhanced Caller ID Displaying Information Storage Area 206210a. In the present embodiment, Enhanced Caller ID Displaying Information Storage Area 206210a includes Enhanced Caller ID Displaying Data Storage Area 206210b and Enhanced Caller ID Displaying Software Storage Area 206210c. Enhanced Caller ID Displaying Data Storage Area 206210b stores the data necessary to implement the present function on the side of Communication Device 200, such as the one(s) described hereinafter. Enhanced Caller ID Displaying Software Storage Area 206210c stores the software program(s) necessary to implement the present function on the side of Communication Device 200, such as the one(s) described hereinafter.

This paragraph illustrates the storage area(s) included in Enhanced Caller ID Displaying Data Storage Area 206210b. In the present embodiment, Enhanced Caller ID Displaying Data Storage Area 206210b includes Private Individual Phone Number Data Storage Area 206210b1, Private Individual Personal Data Storage Area 206210b2, Public Individual Phone Number Data Storage Area 206210b3, Public Individual Personal Data Storage Area 206210b4, and Work Area 206210b5. Private Individual Phone Number Data Storage Area 206210b1 stores the data described hereinafter. Private Individual Personal Data Storage Area 206210b2 stores the data described hereinafter. Public Individual Phone Number Data Storage Area 206210b3 stores the data described hereinafter. Public Individual Personal Data Storage Area 206210b4 stores the data described hereinafter. Work Area 206210b5 is utilized as a work area to perform calculation and temporarily store data.

This paragraph illustrates the data stored in Private Individual Phone Number Data Storage Area 206210b1. In the present embodiment, Private Individual Phone Number Data Storage Area 206210b1 comprises two columns, i.e., 'Private Individual Phone Number ID' and 'Phone Number Data'. Column 'Private Individual Phone Number ID' stores the private individual phone number IDs, and each private individual phone number ID is an identification of the corresponding phone number data stored in column 'Phone Number Data'. Column 'Phone Number Data' stores the phone number data, and each phone number data indicates the phone number of an individual. Each of the phone number data is the data authored and/or registered by the user of Communication Device 200. In the present embodiment, Private Individual Phone Number Data Storage Area 206210b1 stores the following data: 'Private Individual Phone Number#1' and the corresponding 'Phone Number Data#1'; 'Private Individual Phone Number#2' and the corresponding 'Phone Number Data#2'; 'Private Individual Phone Number#3' and the corresponding 'Phone Number Data#3'; and 'Private Individual Phone Number#4' and the corresponding 'Phone Number Data#4'.

This paragraph illustrates the data stored in Private Individual Personal Data Storage Area 206210b2. In the present embodiment, Private Individual Personal Data Storage Area 206210b2 comprises two columns, i.e., 'Private Individual Phone Number ID' and 'Personal Data'. Column 'Private Individual Phone Number ID' stores the private individual phone number IDs, and each private individual phone number ID is an identification of the corresponding personal data stored in column 'Personal Data'. The private individual phone number IDs stored in the present storage area are identical to the ones described in the previous paragraph. Column 'Personal Data' stores the personal data, and each personal data includes the following data of an individual: the personal name data, the title data, the company name data, the office phone number data, the office fax number data, the email address data, the office street address data, the home address data, and/or the home phone number data. The personal name data indicates the personal name of the individual of the corresponding phone number data. The title data indicates the title at work of the individual of the corresponding phone number data. The company name data indicates the name of the company for which the individual of the corresponding phone number data works. The office phone number data indicates the office phone number of the individual of the corresponding phone number data. The office fax number data indicates the office fax number of the individual of the corresponding phone number data. The email address data indicates the email address of the individual of the corresponding phone number data. The office street address data indicates the office street address of the individual of the corresponding phone number data. The home address data indicates the home address of the individual of the corresponding phone number data. The home phone number data indicates the home phone number of the individual of the corresponding phone number data. In the present embodiment, Private Individual Personal Data Storage Area 206210b2 stores the following data: 'Private Individual Phone Number#1' and the corresponding 'Personal Data#1'; 'Private Individual Phone Number#2' and the corresponding 'Personal Data#2'; 'Private Individual Phone Number#3' and the corresponding 'Personal Data#3'; and 'Private Individual Phone Number#4' and the corresponding 'Personal Data#4'. Each of the personal data is the data authored and/or registered by the user of Communication Device 200.

This paragraph illustrates the data stored in Public Individual Phone Number Data Storage Area 206210b3. In the present embodiment, Public Individual Phone Number Data Storage Area 206210b3 comprises two columns, i.e., 'Public Individual Phone Number ID' and 'Phone Number Data'. Column 'Public Individual Phone Number ID' stores the public individual phone number IDs, and each public individual phone number ID is an identification of the corresponding phone number data stored in column 'Phone Number Data'. Column 'Phone Number Data' stores the phone number data, and each phone number data indicates the phone number of an individual. Each of the phone number data is the data disclosed to the public by, for example, Yellow Pages and/or White Pages. In the present embodiment, Public Individual Phone Number Data Storage Area 206210*b*3 stores the following data: 'Public Individual Phone Number#1' and the corresponding 'Phone Number Data#1'; 'Public Individual Phone Number#2' and the corresponding 'Phone Number Data#2'; 'Public Individual Phone Number#3' and the corresponding 'Phone Number Data#3'; 'Public Individual Phone Number#4' and the corresponding 'Phone Number Data#4'; 'Public Individual Phone Number#5' and the corresponding 'Phone Number Data#5'; 'Public Individual Phone Number#6' and the corresponding 'Phone Number Data#6'; 'Public Individual Phone Number#7' and the corresponding 'Phone Number Data#7'; 'Public Individual Phone Number#8' and the corresponding 'Phone Number Data#8'; 'Public Individual Phone Number#9' and the corresponding 'Phone Number Data#9'; and 'Public Individual Phone Number#10' and the corresponding 'Phone Number Data#10'.

This paragraph illustrates the data stored in Public Individual Personal Data Storage Area 206210*b*4. In the present embodiment, Public Individual Personal Data Storage Area 206210*b*4 comprises two columns, i.e., 'Public Individual Phone Number ID' and 'Personal Data'. Column 'Public Individual Phone Number ID' stores the public individual phone number IDs, and each public individual phone number ID is an identification of the corresponding personal data stored in column 'Personal Data'. The public individual phone number IDs stored in the present storage area are identical to the ones described in the previous paragraph. Column 'Personal Data' stores the personal data, and each personal data includes the following data of an individual: the personal name data, the home address data, and/or the home phone number data. The personal name data indicates the personal name of the individual of the corresponding phone number data. The home address data indicates the home address of the individual of the corresponding phone number data. The home phone number data indicates the home phone number of the individual of the corresponding phone number data. In the present embodiment, Public Individual Personal Data Storage Area 206210*b*4 stores the following data: 'Public Individual Phone Number#1' and the corresponding 'Personal Data#1'; 'Public Individual Phone Number#2' and the corresponding 'Personal Data#2'; 'Public Individual Phone Number#3' and the corresponding 'Personal Data#3'; 'Public Individual Phone Number#4' and the corresponding 'Personal Data#4'; 'Public Individual Phone Number#5' and the corresponding 'Personal Data#5'; 'Public Individual Phone Number#6' and the corresponding 'Personal Data#6'; 'Public Individual Phone Number#7' and the corresponding 'Personal Data#7'; 'Public Individual Phone Number#8' and the corresponding 'Personal Data#8'; 'Public Individual Phone Number#9' and the corresponding 'Personal Data#9'; and 'Public Individual Phone Number#10' and the corresponding 'Personal Data#10'. Each of the personal data is the data disclosed to the public by, for example, Yellow Pages and/or White Pages.

This paragraph illustrates the software program(s) stored in Enhanced Caller ID Displaying Software Storage Area 206210*c*. In the present embodiment, Enhanced Caller ID Displaying Software Storage Area 206210*c* stores Caller ID Displaying Software 206210*c*1, Upgraded Caller ID Displaying Software 206210*c*2, and Super Caller ID Displaying Software 206210*c*3. Caller ID Displaying Software 206210*c*1 is the software program described hereinafter. Upgraded Caller ID Displaying Software 206210*c*2 is the software program described hereinafter. Super Caller ID Displaying Software 206210*c*3 is the software program described hereinafter.

This paragraph illustrate(s) Caller ID Displaying Software H210*c*1 of Host H (FIG. 2) and Caller ID Displaying Software 206210*c*1 of Communication Device 200, which display the personal data of the caller by retrieving the foregoing data from Host H (FIG. 2) which is authored and/or registered by the user of Communication Device 200. In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#1) of the phone call detected in the previous step (S3). CPU 211 (FIG. 1) sends the phone number data (e.g., Phone Number Data#1) identified in the previous step to Host H (FIG. 2) in a wireless fashion (S4). Host H (FIG. 2) receives the phone number data (e.g., Phone Number Data#1) from Communication Device 200 (S5). If the phone number data (e.g., Phone Number Data#1) received in the previous step is found in Private Individual Phone Number Data Storage Area H210*b*1, Host H (FIG. 2) proceeds to the next step (S6). Host H (FIG. 2) retrieves the personal data (e.g., Personal Data#1) corresponding to the phone number data (e.g., Phone Number Data#1) found in the previous step from Private Individual Personal Data Storage Area H210*b*2 (S7). Host H (FIG. 2) sends the personal data (e.g., Personal Data#1) retrieved in the previous step to Communication Device 200 (S8). CPU 211 (FIG. 1) receives the personal data (e.g., Personal Data#1) from Host H (FIG. 2) in a wireless fashion (S9). CPU 211 (FIG. 1) displays the phone number data (e.g., Phone Number Data#1) identified in S3 and the personal data (e.g., Personal Data#1) retrieved in the previous step on LCD 201 (FIG. 1) (S10).

This paragraph illustrate(s) Upgraded Caller ID Displaying Software H210*c*2 of Host H (FIG. 2) and Upgraded Caller ID Displaying Software 206210*c*2 of Communication Device 200, which display the personal data of the caller by retrieving the foregoing data from Host H (FIG. 2) which is authored and/or registered by the user of Communication Device 200. If the corresponding personal data is not found, the public data of the caller stored in Host H (FIG. 2) is displayed on LCD 201 (FIG. 1). In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#1) of the phone call detected in the previous step (S3). CPU 211 (FIG. 1) sends the phone number data (e.g., Phone Number Data#1) identified in the previous step to Host H (FIG. 2) in a wireless fashion (S4). Host H (FIG. 2) receives the phone number data (e.g., Phone Number Data#1) from Communication Device 200 (S5). If the phone number data (e.g., Phone Number Data#1) received in the previous step is found in Private Individual Phone Number Data Storage Area H210*b*1, Host H (FIG. 2) proceeds to the next step (S6). Host H (FIG. 2) retrieves the personal data (e.g., Personal Data#1) corresponding to the phone number data (e.g., Phone Number Data#1) found in the previous step from Private Individual Personal Data Storage Area H210*b*2 (S7). Host H (FIG. 2) sends the personal data (e.g., Personal Data#1) retrieved in the previous step to Communication Device 200 (S8). CPU 211 (FIG. 1) receives the personal data (e.g., Personal Data#1) from Host H (FIG. 2) in a wireless fashion (S9). CPU 211 (FIG. 1) displays the phone number data (e.g., Phone Number Data#1) identified in S3 and the personal data (e.g., Personal Data#1) retrieved in the previous step on LCD 201 (FIG. 1) (S10). If the phone number data (e.g., Phone Number Data#5) received in S5 is not found in Private Individual Phone Number Data Storage Area H210*b*1, Host H (FIG. 2) proceeds to the next step (S11). If the phone number data (e.g., Phone Number Data#5) not found in the previous step is found in Public Individual Phone Number Data Storage Area H210*b*3, Host H (FIG. 2) proceeds to the next step (S12). Host H (FIG. 2) retrieves the personal data (e.g., Personal Data#5) corresponding to the phone number data (e.g., Phone Number Data#5) received in S5 from Public Individual Personal Data Storage Area H210*b*4 (S13). Host H (FIG. 2) sends the personal data (e.g., Personal Data#5) retrieved in the previous step to Communication Device 200 (S14). CPU 211 (FIG. 1) receives the personal data (e.g., Personal Data#5) from Host H (FIG. 2) in a wireless fashion (S15). CPU 211 (FIG. 1) displays the phone number data (e.g., Phone Number Data#5) identified in S3 and the personal data (e.g., Personal Data#5) received in the previous step on LCD 201 (FIG. 1) (S16).

The following paragraphs illustrate another embodiment wherein Communication Device 200 plays the major role in implementing the present function.

This paragraph illustrate(s) Caller ID Displaying Software 206210*c*1 of Communication Device 200, which displays the personal data of the caller by retrieving the foregoing data from Communication Device 200 which is authored and/or registered by the user of Communication Device 200. In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#1) of the phone call detected in the previous step (S3). If the phone number data (e.g., Phone Number Data#1) identified in the previous step is found in Private Individual Phone Number Data Storage Area 206210*b*1, CPU 211 (FIG. 1) proceeds to the next step (S4). CPU 211 (FIG. 1) retrieves the personal data (e.g., Personal Data#1) corresponding to the phone number data (e.g., Phone Number Data#1) identified in S3 from Private Individual Personal Data Storage Area 206210*b*2 (S5). CPU 211 (FIG. 1) displays the phone number data (e.g., Phone Number Data#1) identified in S3 and the personal data (e.g., Personal Data#1) retrieved in the previous step on LCD 201 (FIG. 1) (S6).

This paragraph illustrate(s) Upgraded Caller ID Displaying Software H210*c*2 of Host H (FIG. 2) and Upgraded Caller ID Displaying Software 206210*c*2 of Communication Device 200, which display the personal data of the caller by retrieving the foregoing data from Communication Device 200 which is authored and/or registered by the user of Communication Device 200. If the corresponding personal data is not found, the public data of the caller stored in Host H (FIG. 2) is displayed on LCD 201 (FIG. 1). In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#5) of the phone call detected in the previous step (S3). If the phone number data (e.g., Phone Number Data#5) identified in the previous step is found in Private Individual Phone Number Data Storage Area 206210*b*1, CPU 211 (FIG. 1) proceeds to the next step (S4). CPU 211 (FIG. 1) retrieves the personal data (e.g., Personal Data#5) corresponding to the phone number data (e.g., Phone Number Data#5) identified in S3 from Private Individual Personal Data Storage Area 206210*b*2 (S5). CPU 211 (FIG. 1) displays the phone number data (e.g., Phone Number Data#1) identified in S3 and the personal data (e.g., Personal Data#5) retrieved in the previous step on LCD 201 (FIG. 1) (S6). If the phone number data (e.g., Phone Number Data#5) identified in S3 is not found in Private Individual Phone Number Data Storage Area 206210*b*1, CPU 211 (FIG. 1) proceeds to the next step (S7). CPU 211 (FIG. 1) sends the phone number data inquiry to Host H (FIG. 2) in a wireless fashion (S8). Here, the phone number data inquiry is the inquiry whether the phone number data identified in S3 is stored in Host H (FIG. 2). Host H (FIG. 2) receives the phone number data inquiry from Communication Device 200 (S9). If the phone number data (e.g., Phone Number Data#5) received in the previous step is found in Public Individual Phone Number Data Storage Area H210*b*3, Host H (FIG. 2) proceeds to the next step (S10). Host H (FIG. 2) retrieves the personal data (e.g., Personal Data#5) corresponding to the phone number data (e.g., Phone Number Data#5) identified in S3 from Public Individual Personal Data Storage Area H210*b*4 (S11). Host H (FIG. 2) sends the personal data (e.g., Personal Data#5) retrieved in the previous step to Communication Device 200 (S12). CPU 211 (FIG. 1) receives the personal data (e.g., Personal Data#5) from Host H (FIG. 2) in a wireless fashion (S13). CPU 211 (FIG. 1) displays the phone number data (e.g., Phone Number Data#5) identified in S3 and the personal data (e.g., Personal Data#5) received in the previous step on LCD 201 (FIG. 1) (S14).

This paragraph illustrate(s) Super Caller ID Displaying Software H210*c*3 of Host H (FIG. 2) and Super Caller ID Displaying Software 206210*c*3 of Communication Device 200, which display the personal data of the caller by retrieving the foregoing data from Communication Device 200. If the corresponding personal data is not found in Communication Device 200, the database stored in Communication Device 200 is enhanced by retrieving the database from Host H (FIG. 2). In the present embodiment, CPU 211 (FIG. 1) periodically checks the incoming signal (S1). If the incoming signal detected in the previous step is a phone call, CPU 211 (FIG. 1) proceeds to the next step (S2). CPU 211 (FIG. 1) identifies the phone number data (e.g., Phone Number Data#5) of the phone call detected in the previous step (S3). If the phone number data (e.g., Phone Number Data#5) identified in the previous step is found in Private Individual Phone Number Data Storage Area 206210*b*1, CPU 211 (FIG. 1) proceeds to the next step (S4). CPU 211 (FIG. 1) retrieves the personal data (e.g., Personal Data#5) corresponding to the phone number data (e.g., Phone Number Data#5) identified in S3 from Private Individual Personal Data Storage Area 206210*b*2 (S5). CPU 211 (FIG. 1) displays the phone number data (e.g., Phone Number Data#1) identified in S3 and the personal data (e.g., Personal Data#5) retrieved in the previous step on LCD 201 (FIG. 1) (S6). If the phone number data (e.g., Phone Number Data#5) identified in S3 is not found in Private Individual Phone Number Data Storage Area 206210*b*1, CPU 211 (FIG. 1) proceeds to the next step (S7). CPU 211 (FIG. 1) sends the public data sending request to Host H (FIG. 2) in a wireless fashion (S8). Here, the public data sending request is the request to send all phone number data and personal data stored in Host H (FIG. 2) to Communication Device 200. Host H (FIG. 2) receives the public data sending request from Communication Device 200 (S9). Host H (FIG. 2) retrieves all phone number data (e.g., Phone Number Data#1 through #10) from Public Individual Phone Number Data Storage Area H210*b*3 (S10). Host H (FIG. 2) retrieves all personal data (e.g., Personal Data#1 through #10) from Public Individual Personal Data Storage Area H210*b*4 (S11).

Host H (FIG. 2) sends the data retrieved in the previous two steps to Communication Device 200 (S12). CPU 211 (FIG. 1) receives the data sent in the previous step from Host H (FIG. 2) in a wireless fashion (S13). CPU 211 (FIG. 1) stores the phone number data (e.g., Phone Number Data#1 through #10) in Public Individual Phone Number Data Storage Area 206210b3 (S14). CPU 211 (FIG. 1) stores the personal data (e.g., Personal Data#1 through #10) in Public Individual Personal Data Storage Area 206210b4 (S15). If the phone number data (e.g., Phone Number Data#5) not found in S7 is found in Public Individual Phone Number Data Storage Area 206210b3, CPU 211 (FIG. 1) proceeds to the next step (S16). CPU 211 (FIG. 1) retrieves the personal data (e.g., Personal Data#5) corresponding to the phone number data (e.g., Phone Number Data#5) identified in S3 from Public Individual Personal Data Storage Area 206210b4 (S17). CPU 211 (FIG. 1) displays the phone number data (e.g., Phone Number Data#5) identified in S3 and the personal data (e.g., Personal Data#5) retrieved in the previous step on LCD 201 (FIG. 1) (S18).

The following paragraphs illustrate another embodiment wherein Host H (FIG. 2) detects the phone call.

This paragraph illustrate(s) Caller ID Displaying Software H210c1 of Host H (FIG. 2) and Caller ID Displaying Software 206210c1 of Communication Device 200, which display the personal data of the caller by retrieving the foregoing data from Host H (FIG. 2) which is authored and/or registered by the user of Communication Device 200. In the present embodiment, Host H (FIG. 2) periodically checks the incoming signal (S1). If the incoming signal detected in the previous step is a phone call, Host H (FIG. 2) proceeds to the next step (S2). Host H (FIG. 2) identifies the phone number data (e.g., Phone Number Data#1) of the phone call detected in the previous step (S3). If the phone number data (e.g., Phone Number Data#1) identified in the previous step is found in Private Individual Phone Number Data Storage Area H210b1, Host H (FIG. 2) proceeds to the next step (S4). Host H (FIG. 2) retrieves the personal data (e.g., Personal Data#1) corresponding to the phone number data (e.g., Phone Number Data#1) found in the previous step from Private Individual Personal Data Storage Area H210b2 (S5). Host H (FIG. 2) sends the phone number data (e.g., Phone Number Data#1) identified in S3 and the personal data (e.g., Personal Data#1) retrieved in the previous step to Communication Device 200 (S6). CPU 211 (FIG. 1) receives the phone number data (e.g., Phone Number Data#1) and the personal data (e.g., Personal Data#1) from Host H (FIG. 2) in a wireless fashion (S7). CPU 211 (FIG. 1) displays the phone number data (e.g., Phone Number Data#1) and the personal data (e.g., Personal Data#1) received in the previous step on LCD 201 (FIG. 1) (S8).

This paragraph illustrate(s) Upgraded Caller ID Displaying Software H210c2 of Host H (FIG. 2) and Upgraded Caller ID Displaying Software 206210c2 of Communication Device 200, which display the personal data of the caller by retrieving the foregoing data from Host H (FIG. 2) which is authored and/or registered by the user of Communication Device 200. If the corresponding personal data is not found, the public data of the caller stored in Host H (FIG. 2) is displayed on LCD 201 (FIG. 1). In the present embodiment, Host H (FIG. 2) periodically checks the incoming signal (S1). If the incoming signal detected in the previous step is a phone call, Host H (FIG. 2) proceeds to the next step (S2). Host H (FIG. 2) identifies the phone number data (e.g., Phone Number Data#1) of the phone call detected in the previous step (S3). If the phone number data (e.g., Phone Number Data#1) identified in the previous step is found in Private Individual Phone Number Data Storage Area H210b1, Host H (FIG. 2) proceeds to the next step (S4). Host H (FIG. 2) retrieves the personal data (e.g., Personal Data#1) corresponding to the phone number data (e.g., Phone Number Data#1) found in the previous step from Private Individual Personal Data Storage Area H210b2 (S5). Host H (FIG. 2) sends the phone number data (e.g., Phone Number Data#1) identified in S3 and the personal data (e.g., Personal Data#1) retrieved in the previous step to Communication Device 200 (S6). CPU 211 (FIG. 1) receives the phone number data (e.g., Phone Number Data#1) and the personal data (e.g., Personal Data#1) from Host H (FIG. 2) in a wireless fashion (S7). CPU 211 (FIG. 1) displays the phone number data (e.g., Phone Number Data#1) and the personal data (e.g., Personal Data#1) received in the previous step on LCD 201 (FIG. 1) (S8). If the phone number data (e.g., Phone Number Data#5) identified in S3 is not found in Private Individual Phone Number Data Storage Area H210b1, Host H (FIG. 2) proceeds to the next step (S9). If the phone number data (e.g., Phone Number Data#5) not found in the previous step is found in Public Individual Phone Number Data Storage Area H210b3, Host H (FIG. 2) proceeds to the next step (S10). Host H (FIG. 2) retrieves the personal data (e.g., Personal Data#5) corresponding to the phone number data (e.g., Phone Number Data#5) identified in S3 from Public Individual Personal Data Storage Area H210b4 (S11). Host H (FIG. 2) sends the phone number data (e.g., Phone Number Data#5) identified in S3 and the personal data (e.g., Personal Data#5) retrieved in the previous step to Communication Device 200 (S12). CPU 211 (FIG. 1) receives the phone number data (e.g., Phone Number Data#5) and the personal data (e.g., Personal Data#5) from Host H (FIG. 2) in a wireless fashion (S13). CPU 211 (FIG. 1) displays the phone number data (e.g., Phone Number Data#5) and the personal data (e.g., Personal Data#5) received in the previous step on LCD 201 (FIG. 1) (S14).

<<TV Phone Pausing Function>>

The following paragraphs illustrate the TV phone pausing function. The present function is capable to be implemented while the TV phone function is implemented. Assuming that the user of Device A, a Communication Device 200, is conversing with the user of Device B, another Communication Device 200. When the user of Device A inputs the TV phone pausing command, the pausing audiovisual data selected by the user of Device A is output from Device B until the user of Device A cancels the TV phone pausing command.

This paragraph illustrates the storage area included in RAM 206 (FIG. 1) of Device A. In the present embodiment, RAM 206 includes TV Phone Pausing Information Storage Area 206A242a of which the data and the software program(s) stored therein are described hereinafter.

The data and/or the software program(s) necessary to implement the present function may be downloaded from Host H (FIG. 2) to Device A.

This paragraph illustrates the storage area(s) included in TV Phone Pausing Information Storage Area 206A242a. In the present embodiment, TV Phone Pausing Information Storage Area 206A242a includes TV Phone Pausing Data Storage Area 206A242b and TV Phone Pausing Software Storage Area 206A242c. TV Phone Pausing Data Storage Area 206A242b stores the data necessary to implement the present function on the side of Device A, such as the one(s) described hereinafter. TV Phone Pausing Software Storage Area 206A242c stores the software program(s) necessary to implement the present function on the side of Device A, such as the one(s) described hereinafter.

This paragraph illustrates the storage area(s) included in TV Phone Pausing Data Storage Area 206A242b. In the present embodiment, TV Phone Pausing Data Storage Area 206A242b includes Device A's TV Phone Data Storage Area 206A242b1, Device B's TV Phone Data Storage Area 206A242b2, Pausing Audiovisual Data Storage Area 206A242b3, Pausing Audiovisual Selected Data Storage Area 206A242b4, and Work Area 206A242b5. Device A's TV Phone Data Storage Area 206A242b1 stores the Device A's TV phone data which is the audiovisual data of the user of Device A. Device B's TV Phone Data Storage Area 206A242b2 stores the Device B's TV phone data which is the audiovisual data of the user of Device B. Pausing Audiovisual Data Storage Area 206A242b3 stores the data described hereinafter. Pausing Audiovisual Selected Data Storage Area 206A242b4 stores the pausing audiovisual selected data which is one of the pausing audiovisual data selected by the user of Device A. The pausing audiovisual selected data is the pausing audiovisual data output from Device B when the TV phone function is paused. Work Area 206A242b5 is utilized as a work area to perform calculation and temporarily store data.

This paragraph illustrates the data stored in Pausing Audiovisual Data Storage Area 206A242b3. In the present embodiment, Pausing Audiovisual Data Storage Area 206A242b3 comprises two columns, i.e., 'Pausing Audiovisual ID' and 'Pausing Audiovisual Data'. Column 'Pausing Audiovisual ID' stores the pausing audiovisual IDs, and each pausing audiovisual ID is an identification of the corresponding pausing audiovisual data stored in column 'Pausing Audiovisual Data'. Column 'Pausing Audiovisual Data' stores the pausing audiovisual data, and each pausing audiovisual data is the audiovisual data output when the TV phone is paused. Each pausing audiovisual data may be a motion picture with audio data attached thereto or a still image. In the present embodiment, Pausing Audiovisual Data Storage Area 206A242b3 stores the following data: 'Pausing Audiovisual#1' and the corresponding 'Pausing Audiovisual Data#1'; 'Pausing Audiovisual#2' and the corresponding 'Pausing Audiovisual Data#2'; 'Pausing Audiovisual#3' and the corresponding 'Pausing Audiovisual Data#3'; and 'Pausing Audiovisual#4' and the corresponding 'Pausing Audiovisual Data#4'.

This paragraph illustrates the software program(s) stored in TV Phone Pausing Software Storage Area 206A242c. In the present embodiment, TV Phone Pausing Software Storage Area 206A242c stores Pausing Audiovisual Data Producing Software 206A242c1, Pausing Audiovisual Data Selecting Software 206A242c2, TV Phone Implementing Software 206A242c3, and TV Phone Pausing Software 206A242c4. Pausing Audiovisual Data Producing Software 206A242c1 is the software program described hereinafter. Pausing Audiovisual Data Selecting Software 206A242c2 is the software program described hereinafter. TV Phone Implementing Software 206A242c3 is the software program described hereinafter. TV Phone Pausing Software 206A242c4 is the software program described hereinafter.

This paragraph illustrates the storage area included in RAM 206 (FIG. 1) of Device B. In the present embodiment, RAM 206 includes TV Phone Pausing Information Storage Area 206B242a of which the data and the software program(s) stored therein are described hereinafter.

The data and/or the software program(s) necessary to implement the present function may be downloaded from Host H (FIG. 2) to Device B.

This paragraph illustrates the storage area(s) included in TV Phone Pausing Information Storage Area 206B242a. In the present embodiment, TV Phone Pausing Information Storage Area 206B242a includes TV Phone Pausing Data Storage Area 206B242b and TV Phone Pausing Software Storage Area 206B242c. TV Phone Pausing Data Storage Area 206B242b stores the data necessary to implement the present function on the side of Device B, such as the one(s) described hereinafter. TV Phone Pausing Software Storage Area 206B242c stores the software program(s) necessary to implement the present function on the side of Device B, such as the one(s) described hereinafter.

This paragraph illustrates the storage area(s) included in TV Phone Pausing Data Storage Area 206B242b. In the present embodiment, TV Phone Pausing Data Storage Area 206B242b includes Device A's TV Phone Data Storage Area 206B242b1, Device B's TV Phone Data Storage Area 206B242b2, Pausing Audiovisual Data Storage Area 206B242b3, Pausing Audiovisual Selected Data Storage Area 206B242b4, and Work Area 206B242b5. Device A's TV Phone Data Storage Area 206B242b1 stores the Device A's TV phone data which is the audiovisual data of the user of Device A. Device B's TV Phone Data Storage Area 206B242b2 stores the Device B's TV phone data which is the audiovisual data of the user of Device B. Pausing Audiovisual Data Storage Area 206B242b3 stores the data described hereinafter. Pausing Audiovisual Selected Data Storage Area 206B242b4 stores the pausing audiovisual selected data which is one of the pausing audiovisual data selected by the user of Device B. The pausing audiovisual selected data is the pausing audiovisual data output from Device A when the TV phone function is paused. Work Area 206B242b5 is utilized as a work area to perform calculation and temporarily store data.

This paragraph illustrates the data stored in Pausing Audiovisual Data Storage Area 206B242b3. In the present embodiment, Pausing Audiovisual Data Storage Area 206B242b3 comprises two columns, i.e., 'Pausing Audiovisual ID' and 'Pausing Audiovisual Data'. Column 'Pausing Audiovisual ID' stores the pausing audiovisual IDs, and each pausing audiovisual ID is an identification of the corresponding pausing audiovisual data stored in column 'Pausing Audiovisual Data'. Column 'Pausing Audiovisual Data' stores the pausing audiovisual data, and each pausing audiovisual data is the audiovisual data output when the TV phone is paused. Each pausing audiovisual data may be a motion picture with audio data attached thereto or a still image. In the present embodiment, Pausing Audiovisual Data Storage Area 206B242b3 stores the following data: 'Pausing Audiovisual#5' and the corresponding 'Pausing Audiovisual Data#5'; 'Pausing Audiovisual#6' and the corresponding 'Pausing Audiovisual Data#6'; 'Pausing Audiovisual#7' and the corresponding 'Pausing Audiovisual Data#7'; and 'Pausing Audiovisual#8' and the corresponding 'Pausing Audiovisual Data#8'.

This paragraph illustrates the software program(s) stored in TV Phone Pausing Software Storage Area 206B242c. In the present embodiment, TV Phone Pausing Software Storage Area 206B242c stores Pausing Audiovisual Data Producing Software 206B242c1, Pausing Audiovisual Data Selecting Software 206B242c2, TV Phone Implementing Software 206B242c3, and TV Phone Pausing Software 206B242c4. Pausing Audiovisual Data Producing Software 206B242c1 is the software program described hereinafter. Pausing Audiovisual Data Selecting Software 206B242c2 is the software program described hereinafter. TV Phone Implementing Software 206B242c3 is the software program described hereinafter. TV Phone Pausing Software 206B242c4 is the software program described hereinafter.

This paragraph illustrate(s) Pausing Audiovisual Data Producing Software 206A242c1 of Device A, which produces the pausing audiovisual data of Device A. In the present embodiment, CPU 211 (FIG. 1) of Device A retrieves the audio data from Microphone 215 (FIG. 1) of Device A (S1). CPU 211 (FIG. 1) of Device A retrieves the visual data from CCD Unit 214 (FIG. 1) of Device A (S2). CPU 211 (FIG. 1) of Device A produces the audiovisual data from the data retrieved in the previous two steps and stores the data as the pausing audiovisual data (e.g., Pausing Audiovisual Data#1) in Pausing Audiovisual Data Storage Area 206A242b3 (S3).

This paragraph illustrate(s) Pausing Audiovisual Data Producing Software 206B242c1 of Device B, which produces the pausing audiovisual data of Device B. In the present embodiment, CPU 211 (FIG. 1) of Device B retrieves the audio data from Microphone 215 (FIG. 1) of Device B (S1). CPU 211 (FIG. 1) of Device B retrieves the visual data from CCD Unit 214 (FIG. 1) of Device B (S2). CPU 211 (FIG. 1) of Device B produces the audiovisual data from the data retrieved in the previous two steps and stores the data as the pausing audiovisual data (e.g., Pausing Audiovisual Data#5) in Pausing Audiovisual Data Storage Area 206B242b3 (S3).

This paragraph illustrate(s) Pausing Audiovisual Data Selecting Software 206A242c2 of Device A, which selects the pausing audiovisual data to be utilized as the pausing audiovisual selected data of Device A. In the present embodiment, CPU 211 (FIG. 1) of Device A retrieves all pausing audiovisual data (e.g., Pausing Audiovisual Data#1 through #4) from Pausing Audiovisual Data Storage Area 206A242b3 (S1). CPU 211 (FIG. 1) of Device A produces the pausing audiovisual thumbnail data of each pausing audiovisual data (e.g., Pausing Audiovisual Data#1 through #4) retrieved in the previous step and displays each pausing audiovisual thumbnail data on LCD 201 (FIG. 1) (S2). Here, the pausing audiovisual thumbnail data is the thumbnail of the corresponding pausing audiovisual data. Each pausing audiovisual thumbnail data may be a motion picture with audio data attached thereto or a still image. The user of Device A selects, by utilizing Input Device 210 (FIG. 1) or via voice recognition system, a pausing audiovisual thumbnail data (S3). CPU 211 (FIG. 1) of Device A stores the pausing audiovisual data (e.g., Pausing Audiovisual Data#1) corresponding to the pausing audiovisual thumbnail data selected in the previous step as the pausing audiovisual selected data in Pausing Audiovisual Selected Data Storage Area 206A242b4 (S4).

This paragraph illustrate(s) Pausing Audiovisual Data Selecting Software 206B242c2 of Device B, which selects the pausing audiovisual data to be utilized as the pausing audiovisual selected data of Device B. In the present embodiment, CPU 211 (FIG. 1) of Device B retrieves all pausing audiovisual data (e.g., Pausing Audiovisual Data#1 through #4) from Pausing Audiovisual Data Storage Area 206B242b3 (S1). CPU 211 (FIG. 1) of Device B produces the pausing audiovisual thumbnail data of each pausing audiovisual data (e.g., Pausing Audiovisual Data#1 through #4) retrieved in the previous step and displays each pausing audiovisual thumbnail data on LCD 201 (FIG. 1) (S2). Here, the pausing audiovisual thumbnail data is the thumbnail of the corresponding pausing audiovisual data. Each pausing audiovisual thumbnail data may be a motion picture with audio data attached thereto or a still image. The user of Device B selects, by utilizing Input Device 210 (FIG. 1) or via voice recognition system, a pausing audiovisual thumbnail data (S3). CPU 211 (FIG. 1) of Device B stores the pausing audiovisual data (e.g., Pausing Audiovisual Data#5) corresponding to the pausing audiovisual thumbnail data selected in the previous step as the pausing audiovisual selected data in Pausing Audiovisual Selected Data Storage Area 206B242b4 (S4).

This paragraph illustrate(s) TV Phone Implementing Software 206A242c3 of Device A and TV Phone Implementing Software 206B242c3 of Device B, which implement the TV phone function. In the present embodiment, CPU 211 (FIG. 1) of Device A retrieves the audio data from Microphone 215 (FIG. 1) of Device A (S1). CPU 211 (FIG. 1) of Device A retrieves the visual data from CCD Unit 214 (FIG. 1) of Device A (S2). CPU 211 (FIG. 1) of Device A produces the device A's TV phone data from the data retrieved in the previous two steps and stores the data in Device A's TV Phone Data Storage Area 206A242b1 (S3). CPU 211 (FIG. 1) of Device A retrieves the device A's TV phone data from Device A's TV Phone Data Storage Area 206A242b1 and sends the data to Device B in a wireless fashion (S4). CPU 211 (FIG. 1) of Device B receives the device A's TV phone data from Device A in a wireless fashion and stores the data in Device A's TV Phone Data Storage Area 206B242b1 (S5). CPU 211 (FIG. 1) of Device B retrieves the device A's TV phone data from Device A's TV Phone Data Storage Area 206B242b1 and outputs the data from Speaker 216 (FIG. 1) and LCD 201 (FIG. 1) of Device B (S6). CPU 211 (FIG. 1) of Device B retrieves the audio data from Microphone 215 (FIG. 1) of Device B (S7). CPU 211 (FIG. 1) of Device B retrieves the visual data from CCD Unit 214 (FIG. 1) of Device B (S8). CPU 211 (FIG. 1) of Device B produces the device B's TV phone data from the data retrieved in the previous two steps and stores the data in Device B's TV Phone Data Storage Area 206B242b2 (S9). CPU 211 (FIG. 1) of Device B retrieves the device B's TV phone data from Device B's TV Phone Data Storage Area 206B242b2 and sends the data to Device A in a wireless fashion (S10). CPU 211 (FIG. 1) of Device A receives the device B's TV phone data from Device B in a wireless fashion and stores the data in Device B's TV Phone Data Storage Area 206A242b2 (S11). CPU 211 (FIG. 1) of Device A retrieves the device B's TV phone data from Device B's TV Phone Data Storage Area 206A242b2 and outputs the data from Speaker 216 (FIG. 1) and LCD 201 (FIG. 1) of Device A (S12). The foregoing sequence is repeated periodically.

This paragraph illustrate(s) TV Phone Pausing Software 206A242c4 of Device A and TV Phone Pausing Software 206B242c4 of Device B, which pause the TV phone function. The present sequence is repeated until the TV phone resuming command is input, wherein the TV phone resuming command is the command to resume the TV phone function. Once the TV phone resuming command is input, the sequence described hereinbefore is resumed. In the present embodiment, the user of Device A inputs, by utilizing Input Device 210 (FIG. 1) or via voice recognition system, the TV phone pausing command (S1). Here, the TV phone pausing command is the command to pause the TV phone function. CPU 211 (FIG. 1) of Device A retrieves the pausing audiovisual selected data from Pausing Audiovisual Selected Data Storage Area 206A242b4 and sends the data to Device B in a wireless fashion (S2). CPU 211 (FIG. 1) of Device B receives the pausing audiovisual selected data from Device A in a wireless fashion and outputs the data from Speaker 216 (FIG. 1) and LCD 201 (FIG. 1) of Device B (S3). CPU 211 (FIG. 1) of Device B retrieves the audio data from Microphone 215 (FIG. 1) of Device B (S4). CPU

211 (FIG. 1) of Device B retrieves the visual data from CCD Unit 214 (FIG. 1) of Device B (S5). CPU 211 (FIG. 1) of Device B produces the device B's TV phone data from the data retrieved in the previous two steps and stores the data in Device B's TV Phone Data Storage Area 206B242b2 (S6). CPU 211 (FIG. 1) of Device B retrieves the device B's TV phone data from Device B's TV Phone Data Storage Area 206B242b2 and sends the data to Device A in a wireless fashion (S7). CPU 211 (FIG. 1) of Device A receives the device B's TV phone data from Device B in a wireless fashion and stores the data in Device B's TV Phone Data Storage Area 206A242b2 (S8). CPU 211 (FIG. 1) of Device A retrieves the device B's TV phone data from Device B's TV Phone Data Storage Area 206A242b2 and outputs the data from Speaker 216 (FIG. 1) and LCD 201 (FIG. 1) of Device A (S9). The sequence of S2 through S9 is repeated (S10). The sequence described hereinbefore is resumed when the user of Device A inputs, by utilizing Input Device 210 (FIG. 1) or via voice recognition system, the TV phone resuming command.

This paragraph illustrate(s) TV Phone Pausing Software 206A242c4 of Device A and TV Phone Pausing Software 206B242c4 of Device B, which pause the TV phone function. The present sequence is repeated until the TV phone resuming command is input, wherein the TV phone resuming command is the command to resume the TV phone function. Once the TV phone resuming command is input, the sequence described hereinbefore is resumed. In the present embodiment, the user of Device A inputs, by utilizing Input Device 210 (FIG. 1) or via voice recognition system, the TV phone pausing command (S1). Here, the TV phone pausing command is the command to pause the TV phone function. CPU 211 (FIG. 1) of Device A retrieves the pausing audiovisual selected data from Pausing Audiovisual Selected Data Storage Area 206A242b4 and sends the data to Device B in a wireless fashion (S2). CPU 211 (FIG. 1) of Device B receives the pausing audiovisual selected data from Device A in a wireless fashion and outputs the data from Speaker 216 (FIG. 1) and LCD 201 (FIG. 1) of Device B (S3). CPU 211 (FIG. 1) of Device A outputs the pausing audiovisual selected data retrieved in S2 from Speaker 216 (FIG. 1) and LCD 201 (FIG. 1) of Device A (S4). The sequence of S2 through S4 is repeated (S5). The sequence described hereinbefore is resumed when the user of Device A inputs, by utilizing Input Device 210 (FIG. 1) or via voice recognition system, the TV phone resuming command.

<<Video-In-Video Displaying Function>>

The following paragraphs illustrate the video-in-video displaying function, wherein a main video display area is displayed on the display, a sub video display area is displayed in the main video display area, a first visual data is displayed in the main video display area, and a second visual data is displayed in the sub video display area, when implementing the present function.

This paragraph illustrates the display areas displayed on LCD 201 (FIG. 1). In the present embodiment, Main Video Display Area MVDA248 and Sub Video Display Area SVDA248 are displayed on LCD 201 (FIG. 1) when implementing the present function. Main Video Display Area MVDA248 is the display area in which a visual data is displayed. Sub Video Display Area SVDA248 is also the display area in which a visual data is displayed. Sub Video Display Area SVDA248 is displayed in Main Video Display Area MVDA248.

This paragraph illustrates the storage area included in Host H (FIG. 2). In the present embodiment, Host H (FIG. 2) includes Video-In-Video Displaying Information Storage Area H248a of which the data and the software program(s) stored therein are described hereinafter.

This paragraph illustrates the storage area(s) included in Video-In-Video Displaying Information Storage Area H248a. In the present embodiment, Video-In-Video Displaying Information Storage Area H248a includes Video-In-Video Displaying Data Storage Area H248b and Video-In-Video Displaying Software Storage Area H248c. Video-In-Video Displaying Data Storage Area H248b stores the data necessary to implement the present function on the side of Host H (FIG. 2), such as the one(s) described hereinafter. Video-In-Video Displaying Software Storage Area H248c stores the software program(s) necessary to implement the present function on the side of Host H (FIG. 2), such as the one(s) described hereinafter.

This paragraph illustrates the storage area(s) included in Video-In-Video Displaying Data Storage Area H248b. In the present embodiment, Video-In-Video Displaying Data Storage Area H248b includes Main Video Display Area Location Data Storage Area H248b1, Sub Video Display Area Location Data Storage Area H248b2, Visual Data Storage Area H248b3, and Work Area H248b4. Main Video Display Area Location Data Storage Area H248b1 stores the main video display area location data which indicates the location on LCD 201 (FIG. 1) at which Main Video Display Area MVDA248 is displayed. Sub Video Display Area Location Data Storage Area H248b2 stores the sub video display area location data which indicates the location on LCD 201 (FIG. 1) at which Sub Video Display Area SVDA248 is displayed. Visual Data Storage Area H248b3 stores the data described hereinafter. Work Area H248b4 is utilized as a work area to perform calculation and temporarily store data.

This paragraph illustrates the data stored in Visual Data Storage Area H248b3. In the present embodiment, Visual Data Storage Area H248b3 comprises two columns, i.e., 'Visual ID' and 'Visual Data'. Column 'Visual ID' stores the visual IDs, and each visual ID is an identification of the corresponding visual data stored in column 'Visual Data'. Each visual ID may indicate the name or title of the corresponding visual data. Column 'Visual Data' stores the visual data, and each visual data is the visual data which is capable to be replayed by Communication Device 200 (e.g., TV program, movie clip, etc.). In the present embodiment, Visual Data Storage Area H248b3 stores the following data: 'Visual#1' and the corresponding 'Visual Data#1'; 'Visual#2' and the corresponding 'Visual Data#2'; 'Visual#3' and the corresponding 'Visual Data#3'; and 'Visual#4' and the corresponding 'Visual Data#4'.

This paragraph illustrates the software program(s) stored in Video-In-Video Displaying Software Storage Area H248c. In the present embodiment, Video-In-Video Displaying Software Storage Area H248c stores Main Video Display Area Displaying Software H248c1, Sub Video Display Area Displaying Software H248c2, Main Visual Data Displaying Software H248c3, Sub Visual Data Displaying Software H248c4, Main Video Display Area Location Data Changing Software H248c5, Sub Video Display Area Location Data Changing Software H248c6, Main Visual Data Changing Software H248c7, and Sub Visual Data Changing Software H248c8. Main Video Display Area Displaying Software H248c1 is the software program described hereinafter. Sub Video Display Area Displaying Software H248c2 is the software program described hereinafter. Main Visual Data Displaying Software H248c3 is the software program described hereinafter. Sub Visual Data Displaying Software H248c4 is the software program described hereinafter. Main Video Display Area Location Data Changing Software H248c5 is the software program described hereinafter. Sub Video Display Area Location Data Changing Software H248c6 is the software program described hereinafter. Main Visual Data Changing Software H248c7 is the software program described hereinafter. Sub Visual Data Changing Software H248c8 is the software program described hereinafter.

This paragraph illustrates the storage area included in RAM 206 (FIG. 1) of Communication Device 200. In the present embodiment, RAM 206 includes Video-In-Video Displaying Information Storage Area 206248a of which the data and the software program(s) stored therein are described hereinafter.

The data and/or the software program(s) necessary to implement the present function may be downloaded from Host H (FIG. 2) to Communication Device 200.

This paragraph illustrates the storage area(s) included in Video-In-Video Displaying Information Storage Area 206248a. In the present embodiment, Video-In-Video Displaying Information Storage Area 206248a includes Video-In-Video Displaying Data Storage Area 206248b and Video-In-Video Displaying Software Storage Area 206248c. Video-In-Video Displaying Data Storage Area 206248b stores the data necessary to implement the present function on the side of Communication Device 200, such as the one(s) described hereinafter. Video-In-Video Displaying Software Storage Area 206248c stores the software program(s) necessary to implement the present function on the side of Communication Device 200, such as the one(s) described hereinafter.

This paragraph illustrates the storage area(s) included in Video-In-Video Displaying Data Storage Area 206248b. In the present embodiment, Video-In-Video Displaying Data Storage Area 206248b includes Main Video Display Area Location Data Storage Area 206248b1, Sub Video Display Area Location Data Storage Area 206248b2, Visual Data Storage Area 206248b3, and Work Area 206248b4. Main Video Display Area Location Data Storage Area 206248b1 stores the main video display area location data which indicates the location on LCD 201 (FIG. 1) at which Main Video Display Area MVDA248 is displayed. Sub Video Display Area Location Data Storage Area 206248b2 stores the sub video display area location data which indicates the location on LCD 201 (FIG. 1) at which Sub Video Display Area SVDA248 is displayed. Visual Data Storage Area 206248b3 stores the data described hereinafter. Work Area 206248b4 is utilized as a work area to perform calculation and temporarily store data.

This paragraph illustrates the data stored in Visual Data Storage Area 206248b3. In the present embodiment, Visual Data Storage Area 206248b3 comprises two columns, i.e., 'Visual ID' and 'Visual Data'. Column 'Visual ID' stores the visual IDs, and each visual ID is an identification of the corresponding visual data stored in column 'Visual Data'. Each visual ID may indicate the name or title of the corresponding visual data. Column 'Visual Data' stores the visual data, and each visual data is the visual data which is capable to be replayed by Communication Device 200 (e.g., TV program, movie clip, etc.). In the present embodiment, Visual Data Storage Area 206248b3 stores the following data: 'Visual#1' and the corresponding 'Visual Data#1'; 'Visual#2' and the corresponding 'Visual Data#2'; 'Visual#3' and the corresponding 'Visual Data#3'; and 'Visual#4' and the corresponding 'Visual Data#4'.

This paragraph illustrates the software program(s) stored in Video-In-Video Displaying Software Storage Area 206248c. In the present embodiment, Video-In-Video Displaying Software Storage Area 206248c stores Main Video Display Area Displaying Software 206248c1, Sub Video Display Area Displaying Software 206248c2, Main Visual Data Displaying Software 206248c3, Sub Visual Data Displaying Software 206248c4, Main Video Display Area Location Data Changing Software 206248c5, Sub Video Display Area Location Data Changing Software 206248c6, Main Visual Data Changing Software 206248c7, and Sub Visual Data Changing Software 206248c8. Main Video Display Area Displaying Software 206248c1 is the software program described hereinafter. Sub Video Display Area Displaying Software 206248c2 is the software program described hereinafter. Main Visual Data Displaying Software 206248c3 is the software program described hereinafter. Sub Visual Data Displaying Software 206248c4 is the software program described hereinafter. Main Video Display Area Location Data Changing Software 206248c5 is the software program described hereinafter. Sub Video Display Area Location Data Changing Software 206248c6 is the software program described hereinafter. Main Visual Data Changing Software 206248c7 is the software program described hereinafter. Sub Visual Data Changing Software 206248c8 is the software program described hereinafter.

This paragraph illustrate(s) Main Video Display Area Displaying Software H248c1 of Host H (FIG. 2) and Main Video Display Area Displaying Software 206248c1 of Communication Device 200, which display Main Video Display Area MVDA248 on LCD 201 (FIG. 1). In the present embodiment, the user of Communication Device 200 inputs, by utilizing Input Device 210 (FIG. 1) or via voice recognition system, the main video display area displaying command (S1). Here, the main video display area displaying command is the command to display Main Video Display Area MVDA248 on LCD 201 (FIG. 1). CPU 211 (FIG. 1) sends the main video display area displaying command to Host H (FIG. 2) in a wireless fashion (S2). Host H (FIG. 2) receives the main video display area displaying command from Communication Device 200 (S3). Host H (FIG. 2) retrieves the main video display area location data from Main Video Display Area Location Data Storage Area H248b1 and sends the data to Communication Device 200 (S4). CPU 211 (FIG. 1) receives the main video display area location data from Host H (FIG. 2) in a wireless fashion and displays Main Video Display Area MVDA248 on LCD 201 (FIG. 1) at the location identified by the main video display area location data (S5).

This paragraph illustrate(s) Sub Video Display Area Displaying Software H248c2 of Host H (FIG. 2) and Sub Video Display Area Displaying Software 206248c2 of Communication Device 200, which display Sub Video Display Area SVDA248 on LCD 201 (FIG. 1). In the present embodiment, the user of Communication Device 200 inputs, by utilizing Input Device 210 (FIG. 1) or via voice recognition system, the sub video display area displaying command (S1). Here, the sub video display area displaying command is the command to display Sub Video Display Area SVDA248 in Main Video Display Area MVDA248. CPU 211 (FIG. 1) sends the sub video display area displaying command to Host H (FIG. 2) in a wireless fashion (S2). Host H (FIG. 2) receives the sub video display area displaying command from Communication Device 200 (S3). Host H (FIG. 2) retrieves the sub video display area location data from Sub Video Display Area Location Data Storage Area H248b2 and sends the data to Communication Device 200 (S4). CPU 211 (FIG. 1) receives the sub video display area location data from Host H (FIG. 2) in a wireless fashion and displays Sub Video Display Area SVDA248 on LCD 201 (FIG. 1) at the location identified by the sub video display area location data (S5).

This paragraph illustrate(s) Main Visual Data Displaying Software H248c3 of Host H (FIG. 2) and Main Visual Data Displaying Software 206248c3 of Communication Device 200, which display visual data in Main Video Display Area MVDA248. In the present embodiment, Host H (FIG. 2) retrieves all visual IDs (e.g., Visual#1 through #4) from Visual Data Storage Area H248b3 and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#1) (S3). CPU 211 (FIG. 1) sends the visual ID (e.g., Visual#1) selected in the previous step to Host H (FIG. 2) in a wireless fashion (S4). Host H (FIG. 2) receives the visual ID (e.g., Visual#1) from Communication Device 200 (S5). Host H (FIG. 2) retrieves the corresponding visual data (e.g., Visual Data#1) from Visual Data Storage Area H248b3 and sends the data to Communication Device 200 (S6). CPU 211 (FIG. 1) receives the visual data (e.g., Visual Data#1) from Host H (FIG. 2) in a wireless fashion and displays the data in Main Video Display Area MVDA248 (S7). The sequence of the previous two steps is repeated (S8).

This paragraph illustrate(s) Sub Visual Data Displaying Software H248c4 of Host H (FIG. 2) and Sub Visual Data Displaying Software 206248c4 of Communication Device 200, which display visual data in Sub Video Display Area SVDA248. In the present embodiment, Host H (FIG. 2) retrieves all visual IDs (e.g., Visual#1 through #4) from Visual Data Storage Area H248b3 and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#2) (S3). CPU 211 (FIG. 1) sends the visual ID (e.g., Visual#2) selected in the previous step to Host H (FIG. 2) in a wireless fashion (S4). Host H (FIG. 2) receives the visual ID (e.g., Visual#2) from Communication Device 200 (S5). Host H (FIG. 2) retrieves the corresponding visual data (e.g., Visual Data#2) from Visual Data Storage Area H248b3 and sends the data to Communication Device 200 (S6). CPU 211 (FIG. 1) receives the visual data (e.g., Visual Data#2) from Host H (FIG. 2) in a wireless fashion and displays the data in Sub Video Display Area SVDA248 (S7). The sequence of the previous two steps is repeated (S8).

This paragraph illustrate(s) Main Video Display Area Location Data Changing Software H248c5 of Host H (FIG. 2) and Main Video Display Area Location Data Changing Software 206248c5 of Communication Device 200, which change the location of Main Video Display Area MVDA248. In the present embodiment, the user selects, by utilizing Input Device 210 (FIG. 1) or via voice recognition system, Main Video Display Area MVDA248 (S1). The user of Communication Device 200 inputs, by utilizing Input Device 210 (FIG. 1) or via voice recognition system, the main video display area location data changing command (S2). Here, the main video display area location data changing command is the command to change the main video display area location data. The main video display area location data changing command may be input by way of selecting Main Video Display Area MVDA248 and dragging it to a new location. CPU 211 (FIG. 1) identifies the new location of Main Video Display Area MVDA248 (S3). CPU 211 (FIG. 1) produces the main video display area location data by referring to the new location identified in the previous step and sends the data to Host H (FIG. 2) in a wireless fashion (S4). Host H (FIG. 2) receives the main video display area location data from Communication Device 200 and stores the data in Main Video Display Area Location Data Storage Area H248b1 (S5).

This paragraph illustrate(s) Sub Video Display Area Location Data Changing Software H248c6 of Host H (FIG. 2) and Sub Video Display Area Location Data Changing Software 206248c6 of Communication Device 200, which change the location of Sub Video Display Area SVDA248. In the present embodiment, the user selects, by utilizing Input Device 210 (FIG. 1) or via voice recognition system, Sub Video Display Area SVDA248 (S1). The user of Communication Device 200 inputs, by utilizing Input Device 210 (FIG. 1) or via voice recognition system, the sub video display area location data changing command (S2). Here, the sub video display area location data changing command is the command to change the sub video display area location data. The sub video display area location data changing command may be input by way of selecting Sub Video Display Area SVDA248 and dragging it to a new location. CPU 211 (FIG. 1) identifies the new location of Sub Video Display Area SVDA248 (S3). CPU 211 (FIG. 1) produces the sub video display area location data by referring to the new location identified in the previous step and sends the data to Host H (FIG. 2) in a wireless fashion (S4). Host H (FIG. 2) receives the sub video display area location data from Communication Device 200 and stores the data in Sub Video Display Area Location Data Storage Area H248b2 (S5).

This paragraph illustrate(s) Main Visual Data Changing Software H248c7 of Host H (FIG. 2) and Main Visual Data Changing Software 206248c7 of Communication Device 200, which change the visual data displayed in Main Video Display Area MVDA248 to another one. In the present embodiment, Host H (FIG. 2) retrieves all visual IDs (e.g., Visual#1 through #4) from Visual Data Storage Area H248b3 and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#3) (S3). CPU 211 (FIG. 1) sends the visual ID (e.g., Visual#3) selected in the previous step to Host H (FIG. 2) in a wireless fashion (S4). Host H (FIG. 2) receives the visual ID (e.g., Visual#3) from Communication Device 200 (S5). Host H (FIG. 2) retrieves the corresponding visual data (e.g., Visual Data#3) from Visual Data Storage Area H248b3 and sends the data to Communication Device 200 (S6). CPU 211 (FIG. 1) receives the visual data (e.g., Visual Data#3) from Host H (FIG. 2) in a wireless fashion and displays the data in Main Video Display Area MVDA248 instead of the visual data (e.g., Visual Data#1) previously displayed (S7). CPU 211 (FIG. 1) repeats S6 and the S7 (S8).

This paragraph illustrate(s) Sub Visual Data Changing Software H248c8 of Host H (FIG. 2) and Sub Visual Data Changing Software 206248c8 of Communication Device 200, which change the visual data displayed in Sub Video Display Area SVDA248 to another one. In the present embodiment, Host H (FIG. 2) retrieves all visual IDs (e.g., Visual#1 through #4) from Visual Data Storage Area H248b3 and sends the data to Communication Device 200 (S1). CPU 211 (FIG. 1) receives the visual IDs (e.g., Visual#1 through #4) from Host H (FIG. 2) in a wireless fashion and displays the data on LCD 201 (FIG. 1) (S2). The user selects, by utilizing Input Device 210 (FIG. 1) or via voice recognition system, a visual ID (e.g., Visual#4) (S3). CPU 211 (FIG. 1) sends the visual ID (e.g., Visual#4) selected in the previous step to Host H (FIG. 2) in a wireless fashion (S4). Host H (FIG. 2) receives the visual ID (e.g., Visual#4) from Communication Device 200 (S5). Host H (FIG. 2) retrieves the corresponding visual data (e.g., Visual Data#4) from Visual Data Storage Area H248b3 and sends the data to Communication Device 200 (S6). CPU 211 (FIG. 1) receives the visual data (e.g., Visual Data#4) from Host H (FIG. 2) in a wireless fashion and displays the data in Sub Video Display Area SVDA248 instead of the visual data (e.g., Visual Data#2) previously displayed (S7). CPU 211 (FIG. 1) repeats S6 and the S7 (S8).

The following paragraphs illustrate another embodiment wherein Communication Device 200 plays the major role in implementing the present function.

This paragraph illustrate(s) Main Video Display Area Displaying Software 206248c1 of Communication Device 200, which displays Main Video Display Area MVDA248 on LCD 201 (FIG. 1). In the present embodiment, the user of Communication Device 200 inputs, by utilizing Input Device 210 (FIG. 1) or via voice recognition system, the main video display area displaying command (S1). Here, the main video display area displaying command is the command to display Main Video Display Area MVDA248 on LCD 201 (FIG. 1). CPU 211 (FIG. 1) retrieves the main video display area location data from Main Video Display Area Location Data Storage Area 206248b1 (S2). CPU 211 (FIG. 1) displays Main Video Display Area MVDA248 on LCD 201 (FIG. 1) at the location identified by the main video display area location data retrieved in S2 (S3).

This paragraph illustrate(s) Sub Video Display Area Displaying Software 206248c2 of Communication Device 200, which displays Sub Video Display Area SVDA248 on LCD 201 (FIG. 1). In the present embodiment, the user of Communication Device 200 inputs, by utilizing Input Device 210 (FIG. 1) or via voice recognition system, the sub video display area displaying command (S1). Here, the sub video display area displaying command is the command to display Sub Video Display Area SVDA248 in Main Video Display Area MVDA248. CPU 211 (FIG. 1) retrieves the sub video display area location data from Sub Video Display Area Location Data Storage Area 206248b2 (S2). CPU 211 (FIG. 1) displays Sub Video Display Area SVDA248 on LCD 201 (FIG. 1) at the location identified by the sub video display area location data retrieved in S2 (S3).

This paragraph illustrate(s) Main Visual Data Displaying Software 206248c3 of Communication Device 200, which displays visual data in Main Video Display Area MVDA248. In the present embodiment, CPU 211 (FIG. 1) retrieves all visual IDs (e.g., Visual#1 through #4) from Visual Data Storage Area 206248b3 (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG. 1) or via voice recognition system, a visual ID (e.g., Visual#1) (S3). CPU 211 (FIG. 1) retrieves the corresponding visual data (e.g., Visual Data#1) from Visual Data Storage Area 206248b3 (S4). CPU 211 (FIG. 1) displays the visual data (e.g., Visual Data#1) retrieved in the previous step in Main Video Display Area MVDA248 (S5). The sequence of S4 and S5 is repeated (S6).

This paragraph illustrate(s) Sub Visual Data Displaying Software 206248c4 of Communication Device 200, which displays visual data in Sub Video Display Area SVDA248. In the present embodiment, CPU 211 (FIG. 1) retrieves all visual IDs (e.g., Visual#1 through #4) from Visual Data Storage Area 206248b3 (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG. 1) or via voice recognition system, a visual ID (e.g., Visual#2) (S3). CPU 211 (FIG. 1) retrieves the corresponding visual data (e.g., Visual Data#2) from Visual Data Storage Area 206248b3 (S4). CPU 211 (FIG. 1) displays the visual data (e.g., Visual Data#2) retrieved in the previous step in Sub Video Display Area SVDA248 (S5). The sequence of S4 and S5 is repeated (S6).

This paragraph illustrate(s) Main Video Display Area Location Data Changing Software 206248c5 of Communication Device 200, which changes the location of Main Video Display Area MVDA248. In the present embodiment, the user selects, by utilizing Input Device 210 (FIG. 1) or via voice recognition system, Main Video Display Area MVDA248 (S1). The user of Communication Device 200 inputs, by utilizing Input Device 210 (FIG. 1) or via voice recognition system, the main video display area location data changing command (S2). Here, the main video display area location data changing command is the command to change the main video display area location data. The main video display area location data changing command may be input by way of selecting Main Video Display Area MVDA248 and dragging it to a new location. CPU 211 (FIG. 1) identifies the new location of Main Video Display Area MVDA248 (S3). CPU 211 (FIG. 1) produces the main video display area location data by referring to the new location identified in the previous step and stores the data in Main Video Display Area Location Data Storage Area 206248b1 (S4).

This paragraph illustrate(s) Sub Video Display Area Location Data Changing Software 206248c6 of Communication Device 200, which changes the location of Sub Video Display Area SVDA248. In the present embodiment, the user selects, by utilizing Input Device 210 (FIG. 1) or via voice recognition system, Sub Video Display Area SVDA248 (S1). The user of Communication Device 200 inputs, by utilizing Input Device 210 (FIG. 1) or via voice recognition system, the sub video display area location data changing command (S2). Here, the sub video display area location data changing command is the command to change the sub video display area location data. The sub video display area location data changing command may be input by way of selecting Sub Video Display Area SVDA248 and dragging it to a new location. CPU 211 (FIG. 1) identifies the new location of Sub Video Display Area SVDA248 (S3). CPU 211 (FIG. 1) produces the sub video display area location data by referring to the new location identified in the previous step and stores the data in Sub Video Display Area Location Data Storage Area 206248b2 (S4).

This paragraph illustrate(s) Main Visual Data Changing Software 206248c7 of Communication Device 200, which changes the visual data displayed in Main Video Display Area MVDA248 to another one. In the present embodiment, CPU 211 (FIG. 1) retrieves all visual IDs (e.g., Visual#1 through #4) from Visual Data Storage Area 206248b3 (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG. 1) or via voice recognition system, a visual ID (e.g., Visual#3) (S3). CPU 211 (FIG. 1) retrieves the corresponding visual data (e.g., Visual Data#3) from Visual Data Storage Area 206248b3 (S4). CPU 211 (FIG. 1) displays the visual data (e.g., Visual Data#3) retrieved in the previous step in Main Video Display Area MVDA248 instead of the visual data (e.g., Visual Data#1) previously displayed (S5). The sequence of S4 and S5 is repeated (S6).

This paragraph illustrate(s) Sub Visual Data Changing Software 206248c8 of Communication Device 200, which changes the visual data displayed in Sub Video Display Area SVDA248 to another one. In the present embodiment, CPU 211 (FIG. 1) retrieves all visual IDs (e.g., Visual#1 through #4) from Visual Data Storage Area 206248b3 (S1). CPU 211 (FIG. 1) displays the visual IDs (e.g., Visual#1 through #4) retrieved in the previous step on LCD 201 (FIG. 1) (S2). The user selects, by utilizing Input Device 210 (FIG. 1) or via voice recognition system, a visual ID (e.g., Visual#4) (S3). CPU 211 (FIG. 1) retrieves the corresponding visual data (e.g., Visual Data#4) from Visual Data Storage Area 206248b3 (S4). CPU 211 (FIG. 1) displays the visual data (e.g., Visual Data#4) retrieved in the previous step in Sub Video Display Area SVDA248 instead of the visual data (e.g., Visual Data#2) previously displayed (S5). The sequence of S4 and S5 is repeated (S6).

<<File Auto Saving Function>>

The following paragraphs illustrate the file auto saving function which automatically produces a backup file data of the object file data when the user inputs the save command. The object file data is the data which is capable to be duplicated (e.g., text data (i.e., document data), audio data, visual data, audiovisual data, and software program). The backup file data is the duplicate (i.e., the backup data) of the object file data. The object file data may be stored in Device A (a Communication Device 200), Host H (FIG. 2), or Device B (another Communication Device 200 or a personal computer, such as desk top computer or a lap top computer). The backup file data may be stored in Device A, Host H (FIG. 2), or Device B.

This paragraph illustrates the storage area included in Host H (FIG. 2). In the present embodiment, Host H (FIG. 2) includes File Auto Saving Information Storage Area H252a of which the data and the software program(s) stored therein are described hereinafter.

This paragraph illustrates the storage area(s) included in File Auto Saving Information Storage Area H252a. In the present embodiment, File Auto Saving Information Storage Area H252a includes File Auto Saving Data Storage Area H252b and File Auto Saving Software Storage Area H252c. File Auto Saving Data Storage Area H252b stores the data necessary to implement the present function on the side of Host H (FIG. 2), such as the one(s) described hereinafter. File Auto Saving Software Storage Area H252c stores the software program(s) necessary to implement the present function on the side of Host H (FIG. 2), such as the one(s) described hereinafter.

This paragraph illustrates the storage area(s) included in File Auto Saving Data Storage Area H252b. In the present embodiment, File Auto Saving Data Storage Area H252b includes Object File Data Storage Area H252b1, Backup File Data Storage Area H252b2, Backup Log Data Storage Area H252b3, and Work Area H252b4. Object File Data Storage Area H252b1 stores the data described hereinafter. Backup File Data Storage Area H252b2 stores the data described hereinafter. Backup Log Data Storage Area H252b3 stores the data described hereinafter. Work Area H252b4 is utilized as a work area to perform calculation and temporarily store data.

This paragraph illustrates the data stored in Object File Data Storage Area H252b1. In the present embodiment, Object File Data Storage Area H252b1 comprises two columns, i.e., 'Object File ID' and 'Object File Data'. Column 'Object File ID' stores the object file IDs, and each object file ID is an identification of the corresponding object file data stored in column 'Object File Data'. Column 'Object File Data' stores the object file data, and each object file data is the data which is capable to be duplicated (e.g., text data (i.e., document data), audio data, visual data, audiovisual data, and software program). In the present embodiment, Object File Data Storage Area H252b1 stores the following data: 'Object File#1' and the corresponding 'Object File Data#1'; 'Object File#2' and the corresponding 'Object File Data#2'; 'Object File#3' and the corresponding 'Object File Data#3'; and 'Object File#4' and the corresponding 'Object File Data#4'.

This paragraph illustrates the data stored in Backup File Data Storage Area H252b2. In the present embodiment, Backup File Data Storage Area H252b2 comprises two columns, i.e., 'Object File ID' and 'Backup File Data'. Column 'Object File ID' stores the object file IDs, and each object file ID is an identification of the corresponding backup file data stored in column 'Backup File Data'. The object file IDs stored in the present storage area are identical to the ones described in the previous paragraph. Column 'Backup File Data' stores the backup file data, and each backup file data is the duplicate (i.e., the backup data) of the corresponding object file data. In the present embodiment, Backup File Data Storage Area H252b2 stores the following data: 'Object File#1' and the corresponding 'Backup File Data#1'; 'Object File#2' and the corresponding 'Backup File Data#2'; 'Object File#3' and the corresponding 'Backup File Data#3'; and 'Object File#4' and the corresponding 'Backup File Data#4'. Backup File Data#1 is the duplicate of Object File Data#1. Backup File Data#2 is the duplicate of Object File Data#2. Backup File Data#3 is the duplicate of Object File Data#3. Backup File Data#4 is the duplicate of Object File Data#4.

This paragraph illustrates the data stored in Backup Log Data Storage Area H252b3. In the present embodiment, Backup Log Data Storage Area H252b3 comprises two columns, i.e., 'Object File ID' and 'Backup Log Data'. Column 'Object File ID' stores the object file IDs, and each object file ID is an identification of the corresponding backup log data stored in column 'Backup Log Data'. The object file IDs stored in the present storage area are identical to the ones described in the previous paragraph. Column 'Backup Log Data' stores the backup log data, and each backup log data indicates the date and time (i.e., the history log) at which the corresponding object file data is duplicated (i.e., backed up). In the present embodiment, Backup Log Data Storage Area H252b3 stores the following data: 'Object File#1' and the corresponding 'Backup Log Data#1'; 'Object File#2' and the corresponding 'Backup Log Data#2'; 'Object File#3' and the corresponding 'Backup Log Data#3'; and 'Object File#4' and the corresponding 'Backup Log Data#4'.

This paragraph illustrates the software program(s) stored in File Auto Saving Software Storage Area H252c. In the present embodiment, File Auto Saving Software Storage Area H252c stores Auto Backing Up Software H252c1. Auto Backing Up Software H252c1 is the software program described hereinafter.

This paragraph illustrates the storage area included in RAM 206 (FIG. 1) of Device A. In the present embodiment, RAM 206 includes File Auto Saving Information Storage Area 206A252a of which the data and the software program(s) stored therein are described hereinafter.

The data and/or the software program(s) necessary to implement the present function may be downloaded from Host H (FIG. 2) to Device A.

This paragraph illustrates the storage area(s) included in File Auto Saving Information Storage Area 206A252a. In the present embodiment, File Auto Saving Information Storage Area 206A252a includes File Auto Saving Data Storage Area 206A252b and File Auto Saving Software Storage Area 206A252c. File Auto Saving Data Storage Area 206A252b stores the data necessary to implement the present function on the side of Device A, such as the one(s) described hereinafter. File Auto Saving Software Storage Area 206A252c stores the software program(s) necessary to implement the present function on the side of Device A, such as the one(s) described hereinafter.

This paragraph illustrates the storage area(s) included in File Auto Saving Data Storage Area 206A252b. In the present embodiment, File Auto Saving Data Storage Area 206A252b includes Object File Data Storage Area 206A252b1, Backup File Data Storage Area 206A252b2, Backup Log Data Storage Area 206A252b3, and Work Area 206A252b4. Object File Data Storage Area 206A252b1 stores the data described hereinafter. Backup File Data Storage Area 206A252b2 stores the data described hereinafter. Backup Log Data Storage Area 206A252b3 stores the data described hereinafter. Work Area 206A252b4 is utilized as a work area to perform calculation and temporarily store data.

This paragraph illustrates the data stored in Object File Data Storage Area 206A252b1. In the present embodiment, Object File Data Storage Area 206A252b1 comprises two columns, i.e., 'Object File ID' and 'Object File Data'. Column 'Object File ID' stores the object file IDs, and each object file ID is an identification of the corresponding object file data stored in column 'Object File Data'. Column 'Object File Data' stores the object file data, and each object file data is the data which is capable to be duplicated (e.g., text data (i.e., document data), audio data, visual data, audiovisual data, and software program). In the present embodiment, Object File Data Storage Area 206A252b1 stores the following data: 'Object File#1' and the corresponding 'Object File Data#1'; 'Object File#2' and the corresponding 'Object File Data#2'; 'Object File#3' and the corresponding 'Object File Data#3'; and 'Object File#4' and the corresponding 'Object File Data#4'.

This paragraph illustrates the data stored in Backup File Data Storage Area 206A252b2. In the present embodiment, Backup File Data Storage Area 206A252b2 comprises two columns, i.e., 'Object File ID' and 'Backup File Data'. Column 'Object File ID' stores the object file IDs, and each object file ID is an identification of the corresponding backup file data stored in column 'Backup File Data'. The object file IDs stored in the present storage area are identical to the ones described in the previous paragraph. Column 'Backup File Data' stores the backup file data, and each backup file data is the duplicate (i.e., the backup data) of the corresponding object file data. In the present embodiment, Backup File Data Storage Area 206A252b2 stores the following data: 'Object File#1' and the corresponding 'Backup File Data#1'; 'Object File#2' and the corresponding 'Backup File Data#2'; 'Object File#3' and the corresponding 'Backup File Data#3'; and 'Object File#4' and the corresponding 'Backup File Data#4'. Backup File Data#1 is the duplicate of Object File Data#1. Backup File Data#2 is the duplicate of Object File Data#2. Backup File Data#3 is the duplicate of Object File Data#3. Backup File Data#4 is the duplicate of Object File Data#4.

This paragraph illustrates the data stored in Backup Log Data Storage Area 206A252b3. In the present embodiment, Backup Log Data Storage Area 206A252b3 comprises two columns, i.e., 'Object File ID' and 'Backup Log Data'. Column 'Object File ID' stores the object file IDs, and each object file ID is an identification of the corresponding backup log data stored in column 'Backup Log Data'. The object file IDs stored in the present storage area are identical to the ones described in the previous paragraph. Column 'Backup Log Data' stores the backup log data, and each backup log data indicates the date and time (i.e., the history log) at which the corresponding object file data is duplicated (i.e., backed up). In the present embodiment, Backup Log Data Storage Area 206A252b3 stores the following data: 'Object File#1' and the corresponding 'Backup Log Data#1'; 'Object File#2' and the corresponding 'Backup Log Data#2'; 'Object File#3' and the corresponding 'Backup Log Data#3'; and 'Object File#4' and the corresponding 'Backup Log Data#4'.

This paragraph illustrates the software program(s) stored in File Auto Saving Software Storage Area 206A252c. In the present embodiment, File Auto Saving Software Storage Area 206A252c stores Auto Backing Up Software 206A252c1. Auto Backing Up Software 206A252c1 is the software program described hereinafter.

This paragraph illustrates the storage area included in RAM 206 (FIG. 1) of Device B. In the present embodiment, RAM 206 includes File Auto Saving Information Storage Area 206B252a of which the data and the software program(s) stored therein are described hereinafter.

The data and/or the software program(s) necessary to implement the present function may be downloaded from Host H (FIG. 2) to Device B.

This paragraph illustrates the storage area(s) included in File Auto Saving Information Storage Area 206B252a. In the present embodiment, File Auto Saving Information Storage Area 206B252a includes File Auto Saving Data Storage Area 206B252b and File Auto Saving Software Storage Area 206B252c. File Auto Saving Data Storage Area 206B252b stores the data necessary to implement the present function on the side of Device B, such as the one(s) described hereinafter. File Auto Saving Software Storage Area 206B252c stores the software program(s) necessary to implement the present function on the side of Device B, such as the one(s) described hereinafter.

This paragraph illustrates the storage area(s) included in File Auto Saving Data Storage Area 206B252b. In the present embodiment, File Auto Saving Data Storage Area 206B252b includes Object File Data Storage Area 206B252b1, Backup File Data Storage Area 206B252b2, Backup Log Data Storage Area 206B252b3, and Work Area 206B252b4. Object File Data Storage Area 206B252b1 stores the data described hereinafter. Backup File Data Storage Area 206B252b2 stores the data described hereinafter. Backup Log Data Storage Area 206B252b3 stores the data described hereinafter. Work Area 206B252b4 is utilized as a work area to perform calculation and temporarily store data.

This paragraph illustrates the data stored in Object File Data Storage Area 206B252b1. In the present embodiment, Object File Data Storage Area 206B252b1 comprises two columns, i.e., 'Object File ID' and 'Object File Data'. Column 'Object File ID' stores the object file IDs, and each object file ID is an identification of the corresponding object file data stored in column 'Object File Data'. Column 'Object File Data' stores the object file data, and each object file data is the data which is capable to be duplicated (e.g., text data (i.e., document data), audio data, visual data, audiovisual data, and software program). In the present embodiment, Object File Data Storage Area 206B252b1 stores the following data: 'Object File#1' and the corresponding 'Object File Data#1'; 'Object File#2' and the corresponding 'Object File Data#2'; 'Object File#3' and the corresponding 'Object File Data#3'; and 'Object File#4' and the corresponding 'Object File Data#4'.

This paragraph illustrates the data stored in Backup File Data Storage Area 206B252b2. In the present embodiment, Backup File Data Storage Area 206B252b2 comprises two columns, i.e., 'Object File ID' and 'Backup File Data'. Column 'Object File ID' stores the object file IDs, and each object file ID is an identification of the corresponding backup file data stored in column 'Backup File Data'. The object file IDs stored in the present storage area are identical to the ones described in the previous paragraph. Column 'Backup File Data' stores the backup file data, and each backup file data is the duplicate (i.e., the backup data) of the corresponding object file data. In the present embodiment, Backup File Data Storage Area 206B252b2 stores the following data: 'Object File#1' and the corresponding 'Backup File Data#1'; 'Object File#2' and the corresponding 'Backup File Data#2'; 'Object File#3' and the corresponding 'Backup File Data#3'; and 'Object File#4' and the corresponding 'Backup File Data#4'. Backup File Data#1 is the duplicate of Object File Data#1. Backup File Data#2 is the duplicate of Object File Data#2. Backup File Data#3 is the duplicate of Object File Data#3. Backup File Data#4 is the duplicate of Object File Data#4.

This paragraph illustrates the data stored in Backup Log Data Storage Area 206B252b3. In the present embodiment, Backup Log Data Storage Area 206B252b3 comprises two columns, i.e., 'Object File ID' and 'Backup Log Data'. Column 'Object File ID' stores the object file IDs, and each object file ID is an identification of the corresponding backup log data stored in column 'Backup Log Data'. The object file IDs stored in the present storage area are identical to the ones described in the previous paragraph. Column 'Backup Log Data' stores the backup log data, and each backup log data indicates the date and time (i.e., the history log) at which the corresponding object file data is duplicated (i.e., backed up). In the present embodiment, Backup Log Data Storage Area 206B252b3 stores the following data: 'Object File#1' and the corresponding 'Backup Log Data#1'; 'Object File#2' and the corresponding 'Backup Log Data#2'; 'Object File#3' and the corresponding 'Backup Log Data#3'; and 'Object File#4' and the corresponding 'Backup Log Data#4'.

This paragraph illustrates the software program(s) stored in File Auto Saving Software Storage Area 206B252c. In the present embodiment, File Auto Saving Software Storage Area 206B252c stores Auto Backing Up Software 206B252c1. Auto Backing Up Software 206B252c1 is the software program described hereinafter.

This paragraph illustrate(s) Auto Backing Up Software 206A252c1 of Device A, which automatically produces the backup file data (i.e., a duplicate). The present embodiment illustrates the sequence to backup the object file data stored in Device A to Device A. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A identifies the object file data (e.g., Object File Data#1) stored in Object File Data Storage Area 206A252b1 for which the save command is input (S3). CPU 211 (FIG. 1) of Device A saves the object file data (e.g., Object File Data#1) identified in the previous step (S4). CPU 211 (FIG. 1) of Device A produces a duplicate of the object file data (e.g., Object File Data#1) saved in the previous step (S5). CPU 211 (FIG. 1) of Device A stores the duplicate produced in the previous step as the backup file data (e.g., Backup File Data#1) in Backup File Data Storage Area 206A252b2 (S6). CPU 211 (FIG. 1) of Device A updates the corresponding backup log data (e.g., Backup Log Data#1) stored in Backup Log Data Storage Area 206A252b3 (S7). The foregoing sequence is repeated periodically.

This paragraph illustrate(s) Auto Backing Up Software H252c1 of Host H (FIG. 2) and Auto Backing Up Software 206A252c1 of Device A, which automatically produce the backup file data (i.e., a duplicate). The present embodiment illustrates the sequence to backup the object file data stored in Device A to Host H (FIG. 2). In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A identifies the object file data (e.g., Object File Data#1) stored in Object File Data Storage Area 206A252b1 for which the save command is input (S3). CPU 211 (FIG. 1) of Device A saves the object file data (e.g., Object File Data#1) identified in the previous step (S4). CPU 211 (FIG. 1) of Device A produces a duplicate of the object file data (e.g., Object File Data#1) saved in the previous step and sends the data to Host H (FIG. 2) in a wireless fashion (S5). Host H (FIG. 2) receives the duplicate of the object file data (e.g., Object File Data#1) from Device A and stores the data as the backup file data (e.g., Backup File Data#1) in Backup File Data Storage Area H252b2 (S6). Host H (FIG. 2) updates the corresponding backup log data (e.g., Backup Log Data#1) stored in Backup Log Data Storage Area H252b3 (S7). The foregoing sequence is repeated periodically.

This paragraph illustrate(s) Auto Backing Up Software 206A252c1 of Device A and Auto Backing Up Software 206B252c1 of Device B, which automatically produce the backup file data (i.e., a duplicate). The present embodiment illustrates the sequence to backup the object file data stored in Device A to Device B. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A identifies the object file data (e.g., Object File Data#1) stored in Object File Data Storage Area 206A252b1 for which the save command is input (S3). CPU 211 (FIG. 1) of Device A saves the object file data (e.g., Object File Data#1) identified in the previous step (S4). CPU 211 (FIG. 1) of Device A produces a duplicate of the object file data (e.g., Object File Data#1) saved in the previous step and sends the data to Device B in a wireless fashion (S5). CPU 211 (FIG. 1) of Device B receives the duplicate of the object file data (e.g., Object File Data#1) from Device A and stores the data as the backup file data (e.g., Backup File Data#1) in Backup File Data Storage Area 206B252b2 (S6). CPU 211 (FIG. 1) of Device B updates the corresponding backup log data (e.g., Backup Log Data#1) stored in Backup Log Data Storage Area 206B252*b*3 (S7). The foregoing sequence is repeated periodically.

This paragraph illustrate(s) Auto Backing Up Software H252*c*1 of Host H (FIG. 2) and Auto Backing Up Software 206A252*c*1 of Device A, which automatically produce the backup file data (i.e., a duplicate). The present embodiment illustrates the sequence to backup the object file data stored in Host H (FIG. 2) to Device A. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Host H (FIG. 2) in a wireless fashion (S3). Host H (FIG. 2) receives the save command from Device A (S4). Host H (FIG. 2) identifies the object file data (e.g., Object File Data#1) stored in Object File Data Storage Area H252*b*1 for which the save command is input (S5). Host H (FIG. 2) saves the object file data (e.g., Object File Data#1) identified in the previous step (S6). Host H (FIG. 2) produces a duplicate of the object file data (e.g., Object File Data#1) saved in the previous step and sends the data to Device A in a wireless fashion (S7). CPU 211 (FIG. 1) of Device A receives the duplicate of the object file data (e.g., Object File Data#1) from Host H (FIG. 2) in a wireless fashion and stores the data as the backup file data (e.g., Backup File Data#1) in Backup File Data Storage Area 206A252*b*2 (S8). CPU 211 (FIG. 1) of Device A updates the corresponding backup log data (e.g., Backup Log Data#1) stored in Backup Log Data Storage Area 206A252*b*3 (S9). The foregoing sequence is repeated periodically.

This paragraph illustrate(s) Auto Backing Up Software H252*c*1 of Host H (FIG. 2) and Auto Backing Up Software 206A252*c*1 of Device A, which automatically produce the backup file data (i.e., a duplicate). The present embodiment illustrates the sequence to backup the object file data stored in Host H (FIG. 2) to Host H (FIG. 2). In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Host H (FIG. 2) in a wireless fashion (S3). Host H (FIG. 2) receives the save command from Device A (S4). Host H (FIG. 2) identifies the object file data (e.g., Object File Data#1) stored in Object File Data Storage Area H252*b*1 for which the save command is input (S5). Host H (FIG. 2) saves the object file data (e.g., Object File Data#1) identified in the previous step (S6). Host H (FIG. 2) produces a duplicate of the object file data (e.g., Object File Data#1) saved in the previous step (S7). Host H (FIG. 2) stores the duplicate produced in the previous step as the backup file data (e.g., Backup File Data#1) in Backup File Data Storage Area H252*b*2 (S8). Host H (FIG. 2) updates the corresponding backup log data (e.g., Backup Log Data#1) stored in Backup Log Data Storage Area H252*b*3 (S9). The foregoing sequence is repeated periodically.

This paragraph illustrate(s) Auto Backing Up Software H252*c*1 of Host H (FIG. 2), Auto Backing Up Software 206A252*c*1 of Device A, and Auto Backing Up Software 206B252*c*1 of Device B, which automatically produce the backup file data (i.e., a duplicate). The present embodiment illustrates the sequence to backup the object file data stored in Host H (FIG. 2) to Device B. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Host H (FIG. 2) in a wireless fashion (S3). Host H (FIG. 2) receives the save command from Device A (S4). Host H (FIG. 2) identifies the object file data (e.g., Object File Data#1) stored in Object File Data Storage Area H252*b*1 for which the save command is input (S5). Host H (FIG. 2) saves the object file data (e.g., Object File Data#1) identified in the previous step (S6). Host H (FIG. 2) produces a duplicate of the object file data (e.g., Object File Data#1) saved in the previous step and sends the data to Device B in a wireless fashion (S7). CPU 211 (FIG. 1) of Device B receives the duplicate of the object file data (e.g., Object File Data#1) from Host H (FIG. 2) and stores the data as the backup file data (e.g., Backup File Data#1) in Backup File Data Storage Area 206B252*b*2 (S8). CPU 211 (FIG. 1) of Device B updates the corresponding backup log data (e.g., Backup Log Data#1) stored in Backup Log Data Storage Area 206B252*b*3 (S9). The foregoing sequence is repeated periodically.

This paragraph illustrate(s) Auto Backing Up Software 206A252*c*1 of Device A and Auto Backing Up Software 206B252*c*1 of Device B, which automatically produce the backup file data (i.e., a duplicate). The present embodiment illustrates the sequence to backup the object file data stored in Device B to Device A. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Device B in a wireless fashion (S3). CPU 211 (FIG. 1) of Device B receives the save command from Device A (S4). CPU 211 (FIG. 1) of Device B identifies the object file data (e.g., Object File Data#1) stored in Object File Data Storage Area 206B252*b*1 for which the save command is input (S5). CPU 211 (FIG. 1) of Device B saves the object file data (e.g., Object File Data#1) identified in the previous step (S6). CPU 211 (FIG. 1) of Device B produces a duplicate of the object file data (e.g., Object File Data#1) saved in the previous step and sends the data to Device A in a wireless fashion (S7). CPU 211 (FIG. 1) of Device A receives the duplicate of the object file data (e.g., Object File Data#1) from Device B in a wireless fashion and stores the data as the backup file data (e.g., Backup File Data#1) in Backup File Data Storage Area 206A252*b*2 (S8). CPU 211 (FIG. 1) of Device A updates the corresponding backup log data (e.g., Backup Log Data#1) stored in Backup Log Data Storage Area 206A252*b*3 (S9). The foregoing sequence is repeated periodically.

This paragraph illustrate(s) Auto Backing Up Software H252*c*1 of Host H (FIG. 2), Auto Backing Up Software 206A252*c*1 of Device A, and Auto Backing Up Software 206B252*c*1 of Device B, which automatically produce the backup file data (i.e., a duplicate). The present embodiment illustrates the sequence to backup the object file data stored in Device B to Host H (FIG. 2). In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active or opened by the user of Host H (FIG. 2). CPU 211 (FIG. 1) of Device A sends the save command to Device B in a wireless fashion (S3). CPU 211 (FIG. 1) of Device B receives the save command from Device A (S4). CPU 211 (FIG. 1) of Device B identifies the object file data (e.g., Object File Data#1) stored in Object File Data Storage Area 206B252b1 for which the save command is input (S5). CPU 211 (FIG. 1) of Device B saves the object file data (e.g., Object File Data#1) identified in the previous step (S6). CPU 211 (FIG. 1) of Device B produces a duplicate of the object file data (e.g., Object File Data#1) saved in the previous step and sends the data to Host H (FIG. 2) in a wireless fashion (S7). Host H (FIG. 2) receives the duplicate of the object file data (e.g., Object File Data#1) from Device B in a wireless fashion and stores the data as the backup file data (e.g., Backup File Data#1) in Backup File Data Storage Area H252b2 (S8). Host H (FIG. 2) updates the corresponding backup log data (e.g., Backup Log Data#1) stored in Backup Log Data Storage Area H252b3 (S9). The foregoing sequence is repeated periodically.

This paragraph illustrate(s) Auto Backing Up Software 206A252c1 of Device A and Auto Backing Up Software 206B252c1 of Device B, which automatically produce the backup file data (i.e., a duplicate). The present embodiment illustrates the sequence to backup the object file data stored in Device B to Device B. In the present embodiment, CPU 211 (FIG. 1) of Device A checks the input signal input by utilizing Input Device 210 (FIG. 1) or via voice recognition system (S1). If the input signal includes the save command, CPU 211 (FIG. 1) of Device A proceeds to the next step (S2). Here, the save command is the command to save the object file data which is currently active and/or edited by the user of Device A. CPU 211 (FIG. 1) of Device A sends the save command to Device B in a wireless fashion (S3). CPU 211 (FIG. 1) of Device B receives the save command from Device A (S4). CPU 211 (FIG. 1) of Device B identifies the object file data (e.g., Object File Data#1) stored in Object File Data Storage Area 206B252b1 for which the save command is input (S5). CPU 211 (FIG. 1) of Device B saves the object file data (e.g., Object File Data#1) identified in the previous step (S6). CPU 211 (FIG. 1) of Device B produces a duplicate of the object file data (e.g., Object File Data#1) saved in the previous step (S7). CPU 211 (FIG. 1) of Device B stores the duplicate produced in the previous step as the backup file data (e.g., Backup File Data#1) in Backup File Data Storage Area 206B252b2 (S8). CPU 211 (FIG. 1) of Device B updates the corresponding backup log data (e.g., Backup Log Data#1) stored in Backup Log Data Storage Area 206B252b3 (S9). The foregoing sequence is repeated periodically.

<<Unknown File Icon Displaying Function>>

The following paragraphs illustrates the unknown file icon displaying function, wherein an identification of a file data and a linked icon are displayed on LCD 201 (FIG. 1), if the file data is not linked to any software program, a predetermined icon is displayed in lieu of the linked icon.

This paragraph illustrates the storage area included in Host H (FIG. 2). In the present embodiment, Host H (FIG. 2) includes Unknown File Icon Displaying Information Storage Area H283a of which the data and the software program(s) stored therein are described hereinafter.

This paragraph illustrates the storage area(s) included in Unknown File Icon Displaying Information Storage Area H283a. In the present embodiment, Unknown File Icon Displaying Information Storage Area H283a includes Unknown File Icon Displaying Data Storage Area H283b and Unknown File Icon Displaying Software Storage Area H283c. Unknown File Icon Displaying Data Storage Area H283b stores the data necessary to implement the present function on the side of Host H (FIG. 2), such as the one(s) described hereinafter. Unknown File Icon Displaying Software Storage Area H283c stores the software program(s) necessary to implement the present function on the side of Host H (FIG. 2), such as the one(s) described hereinafter.

This paragraph illustrates the storage area(s) included in Unknown File Icon Displaying Data Storage Area H283b. In the present embodiment, Unknown File Icon Displaying Data Storage Area H283b includes Program Data Storage Area H283b1, File Data Storage Area H283b2, Linked Icon Data Storage Area H283b3, Program/File Linking Data Storage Area H283b4, Unknown File Icon Data Storage Area H283b5, and Work Area H283b6. Program Data Storage Area H283b1 stores the data described hereinafter. File Data Storage Area H283b2 stores the data described hereinafter. Linked Icon Data Storage Area H283b3 stores the data described hereinafter. Program/File Linking Data Storage Area H283b4 stores the data described hereinafter. Unknown File Icon Data Storage Area H283b5 stores the unknown file icon data which is the image data indicating an icon designed to be displayed on LCD 201 (FIG. 1) indicating that the corresponding program data is not found. Work Area H283b6 is utilized as a work area to perform calculation and temporarily store data.

This paragraph illustrates the data stored in Program Data Storage Area H283b1. In the present embodiment, Program Data Storage Area H283b1 comprises two columns, i.e., 'Program ID' and 'Program Data'. Column 'Program ID' stores the program IDs, and each program ID is an identification of the corresponding program data stored in column 'Program Data'. Column 'Program Data' stores the program data, and each program data is a software program. In the present embodiment, Program Data Storage Area H283b1 stores the following data: 'Program#1' and the corresponding 'Program Data#1'; 'Program#2' and the corresponding 'Program Data#2'; 'Program#3' and the corresponding 'Program Data#3'; and 'Program#4' and the corresponding 'Program Data#4'.

This paragraph illustrates the data stored in File Data Storage Area H283b2. In the present embodiment, File Data Storage Area H283b2 comprises two columns, i.e., 'File ID' and 'File Data'. Column 'File ID' stores the file IDs, and each file ID is an identification of the corresponding file data stored in column 'File Data'. Each file ID may be the name or title of the corresponding file data. Column 'File Data' stores the file data, and each file data is the data which is capable to be opened, closed, and/or activated by a software program. Each file data may be a text data, document data, data base data, audio data, visual data, or audio visual data. In the present embodiment, File Data Storage Area H283b2 stores the following data: 'File#1' and the corresponding 'File Data#1'; 'File#2' and the corresponding 'File Data#2'; 'File#3' and the corresponding 'File Data#3'; and 'File#4' and the corresponding 'File Data#4'.

This paragraph illustrates the data stored in Linked Icon Data Storage Area H283b3. In the present embodiment, Linked Icon Data Storage Area H283b3 comprises two columns, i.e., 'Program ID' and 'Linked Icon Data'. Column 'Program ID' stores the program IDs, and each program ID is an identification of the corresponding linked icon data stored in column 'Linked Icon Data'. Column 'Linked Icon Data' stores the linked icon data, and each linked icon data is an image data of an icon designed to be displayed on LCD 201 (FIG. 1) indicating the corresponding program data. In the present embodiment, Linked Icon Data Storage Area H283b3 stores the following data: 'Program#1' and the corresponding 'Linked Icon Data#1'; 'Program#2' and the corresponding 'Linked Icon Data#2'; 'Program#3' and the corresponding 'Linked Icon Data#3'; and 'Program#4' and the corresponding 'Linked Icon Data#4'. In the present embodiment, Linked Icon Data#1 is the linked icon data indicating Program Data#1 stored in Program Data Storage Area H283b1. Linked Icon Data#2 is the linked icon data indicating Program Data#2 stored in Program Data Storage Area H283b1. Linked Icon Data#3 is the linked icon data indicating Program Data#3 stored in Program Data Storage Area H283b1. Linked Icon Data#4 is the linked icon data indicating Program Data#4 stored in Program Data Storage Area H283b1.

This paragraph illustrates the data stored in Program/File Linking Data Storage Area H283b4. In the present embodiment, Program/File Linking Data Storage Area H283b4 comprises two columns, i.e., 'File ID' and 'Program/File Linking Data'. Column 'File ID' stores the file IDs, and each file ID is an identification of the corresponding program/file linking data stored in column 'Program/File Linking Data'. Column 'Program/File Linking Data' stores the program/file linking data, and each program/file linking data indicates the link between the program data stored in Program Data Storage Area H283b1 and the file data stored in File Data Storage Area H283b2. If a file data is linked with a program data, the file data is capable to be opened, closed, and/or activated by the program data. In the present embodiment, Program/File Linking Data Storage Area H283b4 stores the following data: 'File#1' and the corresponding 'Program/File Linking Data#1'; 'File#2' and the corresponding 'Program/File Linking Data#2'; and 'File#3' and the corresponding 'Program/File Linking Data#3'. In the present embodiment, Program/File Linking Data#1 indicates that File Data#1 indicated by the file ID 'File#1' is capable to be opened, closed, and/or activated by Program Data#1. Program/File Linking Data#2 indicates that File Data#2 indicated by the file ID 'File#2' is capable to be opened, closed, and/or activated by Program Data#2. Program/File Linking Data#3 indicates that File Data#3 indicated by the file ID 'File#3' is capable to be opened, closed, and/or activated by Program Data#3. No program/file linking data is found corresponding to File Data#4 indicated by the file ID 'File#4'.

This paragraph illustrates the software program(s) stored in Unknown File Icon Displaying Software Storage Area H283c. In the present embodiment, Unknown File Icon Displaying Software Storage Area H283c stores File Data List Displaying Software H283c1. File Data List Displaying Software H283c1 is the software program described hereinafter.

This paragraph illustrates the storage area included in RAM 206 (FIG. 1) of Communication Device 200. In the present embodiment, RAM 206 includes Unknown File Icon Displaying Information Storage Area 206283a of which the data and the software program(s) stored therein are described hereinafter.

The data and/or the software program(s) necessary to implement the present function may be downloaded from Host H (FIG. 2) to Communication Device 200.

This paragraph illustrates the storage area(s) included in Unknown File Icon Displaying Information Storage Area 206283a. In the present embodiment, Unknown File Icon Displaying Information Storage Area 206283a includes Unknown File Icon Displaying Data Storage Area 206283b and Unknown File Icon Displaying Software Storage Area 206283c. Unknown File Icon Displaying Data Storage Area 206283b stores the data necessary to implement the present function on the side of Communication Device 200, such as the one(s) described hereinafter. Unknown File Icon Displaying Software Storage Area 206283c stores the software program(s) necessary to implement the present function on the side of Communication Device 200, such as the one(s) described hereinafter.

This paragraph illustrates the storage area(s) included in Unknown File Icon Displaying Data Storage Area 206283b. In the present embodiment, Unknown File Icon Displaying Data Storage Area 206283b includes Program Data Storage Area 206283b1, File Data Storage Area 206283b2, Linked Icon Data Storage Area 206283b3, Program/File Linking Data Storage Area 206283b4, Unknown File Icon Data Storage Area 206283b5, and Work Area 206283b6. Program Data Storage Area 206283b1 stores the data described hereinafter. File Data Storage Area 206283b2 stores the data described hereinafter. Linked Icon Data Storage Area 206283b3 stores the data described hereinafter. Program/File Linking Data Storage Area 206283b4 stores the data described hereinafter. Unknown File Icon Data Storage Area 206283b5 stores the unknown file icon data which is the image data indicating an icon designed to be displayed on LCD 201 (FIG. 1) indicating that the corresponding program data is not found. Work Area 206283b6 is utilized as a work area to perform calculation and temporarily store data.

This paragraph illustrates the data stored in Program Data Storage Area 206283b1. In the present embodiment, Program Data Storage Area 206283b1 comprises two columns, i.e., 'Program ID' and 'Program Data'. Column 'Program ID' stores the program IDs, and each program ID is an identification of the corresponding program data stored in column 'Program Data'. Column 'Program Data' stores the program data, and each program data is a software program. In the present embodiment, Program Data Storage Area 206283b1 stores the following data: 'Program#1' and the corresponding 'Program Data#1'; 'Program#2' and the corresponding 'Program Data#2'; 'Program#3' and the corresponding 'Program Data#3'; and 'Program#4' and the corresponding 'Program Data#4'.

This paragraph illustrates the data stored in File Data Storage Area 206283b2. In the present embodiment, File Data Storage Area 206283b2 comprises two columns, i.e., 'File ID' and 'File Data'. Column 'File ID' stores the file IDs, and each file ID is an identification of the corresponding file data stored in column 'File Data'. Each file ID may be the name or title of the corresponding file data. Column 'File Data' stores the file data, and each file data is the data which is capable to be opened, closed, and/or activated by a software program. Each file data may be a text data, document data, data base data, audio data, visual data, or audio visual data. In the present embodiment, File Data Storage Area 206283b2 stores the following data: 'File#1' and the corresponding 'File Data#1'; 'File#2' and the corresponding 'File Data#2'; 'File#3' and the corresponding 'File Data#3'; and 'File#4' and the corresponding 'File Data#4'.

This paragraph illustrates the data stored in Linked Icon Data Storage Area 206283b3. In the present embodiment, Linked Icon Data Storage Area 206283b3 comprises two columns, i.e., 'Program ID' and 'Linked Icon Data'. Column 'Program ID' stores the program IDs, and each program ID is an identification of the corresponding linked icon data stored in column 'Linked Icon Data'. Column 'Linked Icon Data' stores the linked icon data, and each linked icon data is an image data of an icon designed to be displayed on LCD 201 (FIG. 1) indicating the corresponding program data. In the present embodiment, Linked Icon Data Storage Area 206283b3 stores the following data: 'Program#1' and the corresponding 'Linked Icon Data#1'; 'Program#2' and the corresponding 'Linked Icon Data#2'; 'Program#3' and the corresponding 'Linked Icon Data#3'; and 'Program#4' and the corresponding 'Linked Icon Data#4'. In the present embodiment, Linked Icon Data#1 is the linked icon data indicating Program Data#1 stored in Program Data Storage Area 206283b1. Linked Icon Data#2 is the linked icon data indicating Program Data#2 stored in Program Data Storage Area 206283b1. Linked Icon Data#3 is the linked icon data indicating Program Data#3 stored in Program Data Storage Area 206283b1. Linked Icon Data#4 is the linked icon data indicating Program Data#4 stored in Program Data Storage Area 206283b1.

This paragraph illustrates the data stored in Program/File Linking Data Storage Area 206283b4. In the present embodiment, Program/File Linking Data Storage Area 206283b4 comprises two columns, i.e., 'File ID' and 'Program/File Linking Data'. Column 'File ID' stores the file IDs, and each file ID is an identification of the corresponding program/file linking data stored in column 'Program/File Linking Data'. Column 'Program/File Linking Data' stores the program/file linking data, and each program/file linking data indicates the link between the program data stored in Program Data Storage Area 206283b1 and the file data stored in File Data Storage Area 206283b2. If a file data is linked with a program data, the file data is capable to be opened, closed, and/or activated by the program data. In the present embodiment, Program/File Linking Data Storage Area 206283b4 stores the following data: 'File#1' and the corresponding 'Program/File Linking Data#1'; 'File#2' and the corresponding 'Program/File Linking Data#2'; and 'File#3' and the corresponding 'Program/File Linking Data#3'. In the present embodiment, Program/File Linking Data#1 indicates that File Data#1 indicated by the file ID 'File#1' is capable to be opened, closed, and/or activated by Program Data#1. Program/File Linking Data#2 indicates that File Data#2 indicated by the file ID 'File#2' is capable to be opened, closed, and/or activated by Program Data#2. Program/File Linking Data#3 indicates that File Data#3 indicated by the file ID 'File#3' is capable to be opened, closed, and/or activated by Program Data#3. No program/file linking data is found corresponding to File Data#4 indicated by the file ID 'File#4'.

This paragraph illustrates the software program(s) stored in Unknown File Icon Displaying Software Storage Area 206283c. In the present embodiment, Unknown File Icon Displaying Software Storage Area 206283c stores File Data List Displaying Software 206283c1. File Data List Displaying Software 206283c1 is the software program described hereinafter.

This paragraph illustrate(s) File Data List Displaying Software H283c1 of Host H (FIG. 2) and File Data List Displaying Software 206283c1 of Communication Device 200, which display a list of file data on LCD 201 (FIG. 1). In the present embodiment, the user of Communication Device 200 inputs, by utilizing Input Device 210 (FIG. 1) or via voice recognition system, the file data list displaying command (S1). Here, the file data list displaying command is the command to display a list of file data on LCD 201 (FIG. 1). CPU 211 (FIG. 1) sends the file data list displaying command to Host H (FIG. 2) in a wireless fashion (S2). Host H (FIG. 2) receives the file data list displaying command from Communication Device 200 (S3). Host H (FIG. 2) retrieves the file ID (e.g., File#1) from File Data Storage Area H283b2 (S4). Host H (FIG. 2) identifies the program/file linking data (e.g., Program/File Linking Data#1) corresponding to the file ID (e.g., File#1) retrieved in the previous step stored in Program/File Linking Data Storage Area H283b4 (S5). If the corresponding program/file linking data (e.g., Program/File Linking Data#1) is found in Program/File Linking Data Storage Area H283b4, Host H (FIG. 2) proceeds to the next step; if the corresponding program/file linking data is not found in Program/File Linking Data Storage Area H283b4, Host H (FIG. 2) proceeds to S13 (S6). Host H (FIG. 2) identifies the program data (e.g., Program Data#1) indicated by the program/file linking data (e.g., Program/File Linking Data#1) identified in S5 stored in Program Data Storage Area H283b1 (S7). Host H (FIG. 2) retrieves the linked icon data (e.g., Linked Icon Data#1) corresponding to the program data (e.g., Program Data#1) identified in the previous step from Linked Icon Data Storage Area H283b3 (S8). Host H (FIG. 2) sends the file ID (e.g., File#1) retrieved in S4 and the linked icon data (e.g., Linked Icon Data#1) retrieved in S8 to Communication Device 200 (S9). CPU 211 (FIG. 1) receives the file ID (e.g., File#1) and the linked icon data (e.g., Linked Icon Data#1) from Host H (FIG. 2) in a wireless fashion (S10). CPU 211 (FIG. 1) displays the file ID (e.g., File#1) received in the previous step on LCD 201 (FIG. 1) (S11). CPU 211 (FIG. 1) displays the linked icon data (e.g., Linked Icon Data#1) received in S10 adjacent to the file ID (e.g., File#1) displayed in the previous step (S12). Host H (FIG. 2) retrieves the unknown file icon data from Unknown File Icon Data Storage Area H283b5 (S13). Host H (FIG. 2) sends the file ID (e.g., File#1) retrieved in S4 and the unknown file icon data retrieved in the previous step to Communication Device 200 (S14). CPU 211 (FIG. 1) receives the file ID (e.g., File#1) and the unknown file icon data from Host H (FIG. 2) in a wireless fashion (S15). CPU 211 (FIG. 1) displays the file ID (e.g., File#4) received in the previous step on LCD 201 (FIG. 1) (S16). CPU 211 (FIG. 1) displays the unknown file icon data retrieved in S15 adjacent to the file ID (e.g., File#4) displayed in the previous step (S17). The sequence of S2 through S17 is repeated for all file IDs (e.g., File#1 through #4) stored in File Data Storage Area H283b2.

The following paragraph illustrate another embodiment wherein Communication Device 200 plays the major role in implementing the present function.

This paragraph illustrate(s) File Data List Displaying Software 206283c1 of Communication Device 200, which displays a list of file data on LCD 201 (FIG. 1). In the present embodiment, the user of Communication Device 200 inputs, by utilizing Input Device 210 (FIG. 1) or via voice recognition system, the file data list displaying command (S1). Here, the file data list displaying command is the command to display a list of file data on LCD 201 (FIG. 1). CPU 211 (FIG. 1) retrieves the file ID (e.g., File#1) from File Data Storage Area 206283b2 (S2). CPU 211 (FIG. 1) identifies the program/file linking data (e.g., Program/File Linking Data#1) corresponding to the file ID (e.g., File#1) retrieved in the previous step stored in Program/File Linking Data Storage Area 206283b4 (S3). If the corresponding program/file linking data (e.g., Program/File Linking Data#1) is found in Program/File Linking Data Storage Area 206283b4, CPU 211 (FIG. 1) proceeds to the next step; if the corresponding program/file linking data is not found in Program/File Linking Data Storage Area 206283b4, CPU 211 (FIG. 1) proceeds to S9 (S4). CPU 211 (FIG. 1) identifies the program data (e.g., Program Data#1) indicated by the program/file linking data (e.g., Program/File Linking Data#1) identified in S3 stored in Program Data Storage Area 206283b1 (S5). CPU 211 (FIG. 1) retrieves the linked icon data (e.g., Linked Icon Data#1) corresponding to the program data (e.g., Program Data#1) identified in the previous step from Linked Icon Data Storage Area 206283b3 (S6). CPU 211 (FIG. 1) displays the file ID (e.g., File#1) retrieved in S2 on LCD 201 (FIG. 1) (S7). CPU 211 (FIG. 1) displays the linked icon data (e.g., Linked Icon Data#1) retrieved in S6 adjacent to the file ID (e.g., File#1) displayed in the previous step (S8). CPU 211 (FIG. 1) retrieves the unknown file icon data from Unknown File Icon Data Storage Area 206283b5 (S9). CPU 211 (FIG. 1) displays the file ID (e.g., File#4) retrieved in S2 on LCD 201 (FIG. 1) (S10). CPU 211 (FIG. 1) displays the unknown file icon data retrieved in S9 adjacent to the file ID (e.g., File#4) displayed in the previous step (S11). The sequence of S2 through S11 is repeated for all file IDs (e.g., File#1 through #4) stored in File Data Storage Area 206283b2.

<<Multiple Mode Implementing Function>>

The following paragraphs illustrate the multiple mode implementing function of Communication Device 200 which enables to activate and implement a plurality of modes, functions, and/or systems described in this specification simultaneously.

This paragraph illustrates the software programs stored in RAM 206 (FIG. 1) to implement the multiple mode implementing function (FIG. 1). In this embodiment, RAM 206 includes Multiple Mode Implementer Storage Area 20690a. Multiple Mode Implementer Storage Area 20690a stores Multiple Mode Implementer 20690b, Mode List Displaying Software 20690c, Mode Selecting Software 20690d, Mode Activating Software 20690e, and Mode Implementation Repeater 20690f, all of which are software programs. Multiple Mode Implementer 20690b administers the overall implementation of the present function. One of the major tasks of Multiple Mode Implementer 20690b is to administer and control the timing and sequence of Mode List Displaying Software 20690c, Mode Selecting Software 20690d, Mode Activating Software 20690e, and Mode Implementation Repeater 20690f. For example, Multiple Mode Implementer 20690b executes them in the following order: Mode List Displaying Software 20690c, Mode Selecting Software 20690d, Mode Activating Software 20690e, and Mode Implementation Repeater 20690f. Mode List Displaying Software 20690c displays on LCD 201 (FIG. 1) a list of a certain amount or all modes, functions, and/or systems explained in this specification of which the sequence is explained hereinafter. Mode Selecting Software 20690d selects a certain amount or all modes, functions, and/or systems explained in this specification of which the sequence is explained hereinafter. Mode Activating Software 20690e activates a certain amount or all modes, functions, and/or systems selected by the Mode Selecting Software 20690d of which the sequence is explained hereinafter. Mode Implementation Repeater 20690f executes Multiple Mode Implementer 20690b which reactivates Mode List Displaying Software 20690c, Mode Selecting Software 20690d, Mode Activating Software 20690e of which the sequence is explained hereinafter.

This paragraph illustrates the sequence of Mode List Displaying Software 20690c. In this embodiment, CPU 211 (FIG. 1), under the command of Mode List Displaying Software 20690c, displays a list of a certain amount or all modes, functions, and/or systems described in this specification on LCD 201 (FIG. 1).

This paragraph illustrates the sequence of Mode Selecting Software 20690d. In this embodiment, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690d, interprets the input signal and selects the corresponding mode, function, or system (S2).

This paragraph illustrates the sequence of Mode Activating Software 20690e. In this embodiment, CPU 211 (FIG. 1), under the command of Mode Activating Software 20690e, activates the mode, function, or, system selected in S2 described in the previous paragraph. CPU 211 thereafter implements the activated mode, function, or system as described in the relevant paragraphs in this specification.

This paragraph illustrates the sequence of Mode Implementation Repeater 20690f. In this embodiment, the user of Communication Device 200 inputs an input signal by utilizing Input Device 210 (FIG. 1) or via voice recognition system (S1). Once the activation of the selected mode, function, or system described hereinbefore is completed, and if the input signal indicates to repeat the process to activate another mode, function, or system (S2), CPU 211 (FIG. 1), under the command of Mode Implementation Repeater 20690f, executes Multiple Mode Implementer 20690b, which reactivates Mode List Displaying Software 20690c, Mode Selecting Software 20690d, and Mode Activating Software 20690e to activate the second mode, function, or system while the first mode, function, or system is implemented by utilizing the method of so-called 'time sharing' (S3). Mode List Displaying Software 20690c, Mode Selecting Software 20690d, and Mode Activating Software 20690e can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690b, Mode List Displaying Software 20690c, Mode Selecting Software 20690d, Mode Activating Software 20690e, and Mode Implementation Repeater 20690f described hereinbefore may be integrated into one software program, Multiple Mode Implementer 20690b. In this embodiment, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interprets the input signal and selects the corresponding mode, function, or system (S3). CPU 211 activates the mode, function, or system selected in S3, and thereafter implements the activated mode, function, or system as described in the relevant paragraphs in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of S1 though S4 can be repeatedly executed until all modes, function, and systems displayed on LCD 201 are selected and activated. The activation of modes, functions, and/or systems is not repeated if the input signal explained in S5 so indicates. As another embodiment, before or at the time one software program is activated, CPU 211 may, either automatically or manually (i.e., by a signal input by the user of Communication Device), terminate the other software programs already activated or prohibit other software programs to be activated while one software program is implemented in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

INCORPORATION BY REFERENCE

Without limiting the generality of the first paragraph of this specification, the following paragraphs and drawings described in the original file of the Prior Filed Application are incorporated to this application by reference: The preamble described in paragraph [2149] (no drawings); Communication Device 200 (Voice Communication Mode) described in paragraphs [2150] through [2155] (FIGS. 1 through 2c); Voice Recognition System described in paragraphs [2156] through [2188] (FIGS. 3 through 19); Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [2237] through [2249] (FIGS. 39 through 44b); Digital Mirror (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition System—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2906] through [2863] (FIGS. 428 through 456); Start Up Software Function described in paragraphs [2864] through [2880] (FIGS. 457 through 466); Another Embodiment Of Communication Device-Wireless described in paragraphs [2881] through [2885] (FIGS. 467a through 467d); Stereo Audio Data Output Function described in paragraphs [2886] through [2950] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375] (FIGS. 754 through 774); Business Card Function described in paragraphs [3376] through [3392] (FIGS. 775 through 783); Game Vibrating Function described in paragraphs [3393] through [3403] (FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666] (FIGS. 924 through 950f); Digital Camera Function described in paragraphs [3667] through [3694] (FIGS. 951 through 968); Phone Number Linking Function described in paragraphs [3695] through [3718] (FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419] (FIGS. 1499 through 1509); OS Updating Function described in paragraphs [4420] through [4487] (FIGS. 1510 through 1575); Device Managing Function described in paragraphs [4488] through [4505] (FIGS. 1576 through 1587); Automobile Controlling Function described in paragraphs [4506] through [4554] (FIGS. 1588 through 1627); OCR Function described in paragraphs [4555] through [4590] (FIGS. 1628 through 1652); Real-time GPS Function described in paragraphs [4591] through [4660] (FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854] (FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); and Vital Sign Monitoring Function described in paragraphs [4920] through [5009] (FIGS. 1890a through 1954).

Without limiting the generality of the first paragraph of this specification, the following paragraphs and drawings described in Preliminary Amendment B of the Prior Filed Application are incorporated to this application by reference: Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs [5009.857] through [5009.876] (FIGS. 2553 through 2566b); Satellite TV Program Displaying Function described in paragraphs [5009.877] through [5009.921] (FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through [5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 2895f); Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); and Multiple Direction Scrolling Function described in paragraphs [5009.1661] through [5009.1762] (FIGS. 3151 through 3238).

Without limiting the generality of the first paragraph of this specification, the following paragraphs and drawings described in Preliminary Amendment C of the Prior Filed Application are incorporated to this application by reference: Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612] (FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320 through 4333b); TV Phone Recording Function described in paragraphs [5009.3348] through [5009.3381] (FIGS. 4334 through 4358b); and Hybrid GPS Function described in paragraphs [5009.3382] through [5009.3421] (FIGS. 4359 through 4381).

Without limiting the generality of the first paragraph of this specification, the following paragraphs and drawings described in Preliminary Amendment D of the Prior Filed Application are incorporated to this application by reference: Elevator Controlling Function described in paragraphs [5009.3422] through [5009.3447] (FIGS. 4382 through 4397); Device Migrating Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518f); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199); Nearest Printer Selecting Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); and Form Auto Filling Function described in paragraphs [5009.5035] through [5009.5072] (FIGS. 5472 through 5495e).

Without limiting the generality of the first paragraph of this specification, the following paragraphs and drawings described in Preliminary Amendment E of the Prior Filed Application are incorporated to this application by reference: Hybrid Carrier Function described in paragraphs [5009. 5073] through [5009. 5105] (FIGS. 5496 through 5522b); Carrier Current Condition Monitoring Function described in paragraphs [5009. 5106] through [5009. 5141] (FIGS. 5523 through 5546c); Memory Defragmenting Function described in paragraphs [5009. 5142] through [5009. 5175] (FIGS. 5547 through 5568); Memory Formatting Function described in paragraphs [5009. 5176] through [5009. 5209] (FIGS. 5569 through 5590); Memory Partitioning Function described in paragraphs [5009. 5210] through [5009. 5243] (FIGS. 5591 through 5612); TV Phone Pausing Function described in paragraphs [5009. 5244] through [5009. 5268] (FIGS. 5613 through 5629); Reflecting Object Displaying Function described in paragraphs [5009. 5269] through [5009. 5294] (FIGS. 5630 through 5648c); Alternative TV Program Receiving Function described in paragraphs [5009. 5295] through [5009. 5325] (FIGS. 5649 through 5670c); Alternative Radio Program Receiving Function described in paragraphs [5009. 5326] through [5009. 5356] (FIGS. 5671 through 5692c); Audiovisual Auto Fading Function described in paragraphs [5009. 5357] through [5009. 5377] (FIGS. 5693 through 5706); Audio Auto Fading Function described in paragraphs [5009. 5378] through [5009. 5398] (FIGS. 5707 through 5720); Video-In-Video Displaying Function described in paragraphs [5009. 5399] through [5009. 5431] (FIGS. 5721 through 5747b); Pre-Installed Item Purchasing Function described in paragraphs [5009. 5432] through [5009. 5470] (FIGS. 5748 through 5775b); Multiple CPU Function described in paragraphs [5009. 5471] through [5009. 5476] (FIGS. 5776 and 5777); Radio Music Downloading Function described in paragraphs [5009. 5477] through [5009. 5516] (FIGS. 5778 through 5807); File Auto Saving Function described in paragraphs [5009. 5517] through [5009. 5559] (FIGS. 5808 through 5837b); TV Tuner Function described in paragraphs [5009. 5560] through [5009. 5600] (FIGS. 5838 through 5866); GPS Receiver's Log Function described in paragraphs [5009. 5601] through [5009. 5629] (FIGS. 5867 through 5884b); Remote Room Light Controlling Function described in paragraphs [5009. 5630] through [5009. 5662] (FIGS. 5885 through 5906b); Remote Kitchen Stove Controlling Function described in paragraphs [5009. 5663] through [5009. 5695] (FIGS. 5907 through 5928b); Remote Refrigerator Controlling Function described in paragraphs [5009. 5696] through [5009. 5728] (FIGS. 5929 through 5950b); Remote Washing Machine Controlling Function described in paragraphs [5009. 5729] through [5009. 5761] (FIGS. 5951 through 5972b); Remote Faucet Controlling Function described in paragraphs [5009. 5762] through [5009. 5794] (FIGS. 5973 through 5994b); Remote Door Lock Controlling Function described in paragraphs [5009. 5795] through [5009. 5827] (FIGS. 5995 through 6016b); Remote Air Conditioner Controlling Function described in paragraphs [5009. 5828] through [5009. 5860] (FIGS. 6017 through 6038b); Remote Vending Machine Controlling Function described in paragraphs [5009. 5861] through [5009. 5893] (FIGS. 6039 through 6060b); Remote Video Recorder Controlling Function described in paragraphs [5009. 5894] through [5009. 5926] (FIGS. 6061 through 6082b); Remote Printer Controlling Function described in paragraphs [5009. 5927] through [5009. 5959] (FIGS. 6083 through 6104b); Remote Camera Controlling Function described in paragraphs [5009. 5960] through [5009. 5992] (FIGS. 6105 through 6126b); Remote TV Tuner Controlling Function described in paragraphs [5009. 5993] through [5009. 6025] (FIGS. 6127 through 6148b); Remote Radio Tuner Controlling Function described in paragraphs [5009. 6026] through [5009. 6058] (FIGS. 6149 through 6170b); Remote Computer Controlling Function described in paragraphs [5009. 6059] through [5009. 6091] (FIGS. 6171 through 6192b); Remote Carrier Controlling Function described in paragraphs [5009. 6092] through [5009. 6124] (FIGS. 6193 through 6214b); Remote Food Processor Controlling Function described in paragraphs [5009. 6125] through [5009. 6157] (FIGS. 6215 and 6236b); Remote Dryer Controlling Function described in paragraphs [5009. 6158] through [5009. 6190] (FIGS. 6237 and 6258b); Remote Rice Cooker Controlling Function described in paragraphs [5009. 6191] through [5009. 6223] (FIGS. 6259 and 6280b); Remote Sound Outputting Device Controlling Function described in paragraphs [5009. 6224] through [5009. 6256] (FIGS. 6281 and 6302b); Remote Vacuum Cleaner Controlling Function described in paragraphs [5009. 6257] through [5009. 6289] (FIGS. 6303 and 6324b); Remote FAX Machine Controlling Function described in paragraphs [5009. 6290] through [5009. 6322] (FIGS. 6325 and 6346b); Remote Copying Machine Controlling Function described in paragraphs [5009. 6323] through [5009. 6355] (FIGS. 6347 and 6368b); Remote Coffee Maker Controlling Function described in paragraphs [5009. 6356] through [5009. 6388] (FIGS. 6369 and 6390b); Remote Scanner Controlling Function described in paragraphs [5009. 6389]

through [5009. 6421] (FIGS. 6391 and 6412b); Remote Clothes Iron Controlling Function described in paragraphs [5009. 6422] through [5009. 6454] (FIGS. 6413 and 6434b); Remote Escalator Controlling Function described in paragraphs [5009. 6455] through [5009. 6487] (FIGS. 6435 and 6456b); Vending Machine Accessing Function described in paragraphs [5009. 6488] through [5009. 6527] (FIGS. 6457 through 6485d); Audiovisual Data Shuffling Function described in paragraphs [5009. 6528] through [5009. 6551] (FIGS. 6486 through 6503b); Unknown File Icon Displaying Function described in paragraphs [5009. 6552] through [5009. 6575] (FIGS. 6504 through 6521c); Audiovisual Document Producing Function described in paragraphs [5009. 6576] through [5009. 6601] (FIGS. 6522 through 6539b); Audiovisual Data Searching Function described in paragraphs [5009. 6602] through [5009. 6626] (FIGS. 6540 through 6558b); Finger Print Log-on Function described in paragraphs [5009. 6627] through [5009. 6645] (FIGS. 6559 through 6571c); Voice Print Log-on Function described in paragraphs [5009. 6646] through [5009. 6663] (FIGS. 6572 through 6583c); Finger Print Screen Saver Deactivating Function described in paragraphs [5009. 6664] through [5009. 6682] (FIGS. 6584 through 6596c); Voice Print Screen Saver Deactivating Function described in paragraphs [5009. 6683] through [5009. 6700] (FIGS. 6597 through 6608c); Finger Print Folder Accessing Function described in paragraphs [5009. 6701] through [5009. 6719] (FIGS. 6609 through 6621c); Voice Print Folder Accessing Function described in paragraphs [5009. 6720] through [5009. 6737] (FIGS. 6622 through 6633c); Finger Print File Accessing Function described in paragraphs [5009. 6738] through [5009. 6756] (FIGS. 6634 through 6646c); Voice Print File Accessing Function described in paragraphs [5009. 6757] through [5009. 6774] (FIGS. 6647 through 6658c); Finger Print Internet Accessing Function described in paragraphs [5009. 6775] through [5009. 6793] (FIGS. 6659 through 6671c); Voice Print Internet Accessing Function described in paragraphs [5009. 6794] through [5009. 6811] (FIGS. 6672 through 6683c); Finger Print PC Log-on Function described in paragraphs [5009. 6812] through [5009. 6838] (FIGS. 6684 through 6703b); Voice Print PC Log-on Function described in paragraphs [5009. 6839] through [5009. 6864] (FIGS. 6704 through 6722b); and Finger Print PC Screen Saver Deactivating Function described in paragraphs [5009. 6865] through [5009. 6891] (FIGS. 6723 through 6742b).

Without limiting the generality of the first paragraph of this specification, the following paragraphs and drawings described in the original file of the Prior Filed Application are incorporated to this application by reference: Multiple Mode Implementing Function described in paragraphs [5011] through [5018] (FIGS. 395 through 400); Multiple Software Download Function described in paragraphs [5019] through [5028] (FIGS. 401 through 407); Selected Software Distributing Function described in paragraphs [5029] through [5048] (FIGS. 1376 through 1393d); Multiple Software Download And Mode Implementation Function described in paragraphs [5049] through [5056] (FIGS. 408 through 412); and the last sentence described in paragraph [5058] (no drawings).

Having thus described a presently preferred embodiment of the present invention, it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. For the avoidance of doubt, the applicant has no intent to surrender any equivalent of any element included in the claims by any amendment of the claims unless expressly and unambiguously stated otherwise in the amendment. Further, for the avoidance of doubt, the number of the prior arts introduced herein (and/or in IDS) may be of a large one, however, the applicant has no intent to hide the more relevant prior art(s) in the less relevant ones. For the avoidance of doubt, words using the singular or plural number also include the plural or singular number, respectively. The words 'herein', 'above', 'below', and words of similar import, when used in this application, refer to this application as a whole, and not to any particular portions of this application. The description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. For the avoidance of doubt, all of the U.S. patents, U.S. patent application publications, U.S. patent applications, foreign patents, foreign patent applications and non-patent publications referred to in the specification of this application and/or the parent application of this application are incorporated herein by reference, in their entirety. Further, all of the U.S. patents, U.S. patent application publications, U.S. patent applications, foreign patents, foreign patent applications and non-patent publications listed in the Application Data Sheet of this application and/or the parent application of this application are incorporated herein by reference in their entirety. Various types of signals are input in this specification by utilizing Input Device 210 (FIG. 1) or voice recognition system. As another embodiment, a touch panel may be utilized to input signals. In other words, the touch panel is installed in LCD 201 (FIG. 1), and the user is enabled to operate Communication Device 200 by touching LCD 201 instead of utilizing Input Device 210 (FIG. 1) or voice recognition system. The mechanism and/or the structure of the touch panel is primarily described in the following patents and the references cited thereof: U.S. Pat. No. 6,690,363; U.S. Pat. No. 6,690,361; U.S. Pat. No. 6,689,458; U.S. Pat. No. 6,686,909; U.S. Pat. No. 6,685,805; U.S. Pat. No. 6,680,448; U.S. Pat. No. 6,677,934; U.S. Pat. No. 6,677,542; U.S. Pat. No. 6,664,952; U.S. Pat. No. 6,664,951; U.S. Pat. No. 6,664,950; U.S. Pat. No. 6,661,406; U.S. Pat. No. 6,654,006; U.S. Pat. No. 6,646,634; U.S. Pat. No. 6,639,587; U.S. Pat. No. 6,639,163; U.S. Pat. No. 6,633,280; U.S. Pat. No. 6,633,279; U.S. Pat. No. 6,630,058; U.S. Pat. No. 6,629,833; U.S. Pat. No. 6,628,271; U.S. Pat. No. 6,628,269; U.S. Pat. No. 6,628,268; U.S. Pat. No. 6,621,486; U.S. Pat. No. 6,611,299; U.S. Pat. No. 6,597,508; U.S. Pat. No. 6,593,917; U.S. Pat. No. 6,590,622; U.S. Pat. No. 6,583,935; U.S. Pat. No. 6,573,155; U.S. Pat. No. 6,572,941; U.S. Pat. No. 6,570,707; U.S. Pat. No. 6,567,077; U.S. Pat. No. 6,559,902; U.S. Pat. No. 6,559,834; U.S. Pat. No. 6,556,189; U.S. Pat. No. 6,552,718; U.S. Pat. No. 6,549,195; U.S. Pat. No. 6,549,193; U.S. Pat. No. 6,538,706; U.S. Pat. No. 6,538,644; U.S. Pat. No. 6,529,188; U.S. Pat.

No. 6,522,322; U.S. Pat. No. 6,512,512; U.S. Pat. No. 6,507,337; U.S. Pat. No. 6,504,583; U.S. Pat. No. 6,502,668; U.S. Pat. No. 6,492,633; U.S. Pat. No. 6,480,187; and U.S. Pat. No. 6,473,235. For the avoidance of doubt, when Communication Device 200 performs wireless communication with Host H (FIG. 429) and/or other devices, Antenna 218 (FIG. 1) and/or LED 219 (FIG. 380) are utilized for purposes of implementing the wireless communication. For the avoidance of doubt, the roles played by Host H (FIG. 429) to implement various types of functions described in this specification may be performed by a personal computer (e.g., desktop computer and lap top computer), PDA, and another Communication Device 200 in lieu of Host H (FIG. 429). For the avoidance of doubt, the tasks of CPU 211 (FIG. 1) described in this specification may be performed by a plurality of central processing units installed in Communication Device 200. For the avoidance of doubt, the data and software programs stored in RAM 206 (FIG. 1) described in this specification may be stored in a plurality of memories installed in Communication Device 200.

The invention claimed is:

1. A communication device, which is operable to implement audiovisual communication with another device, comprising:
   a microphone;
   a speaker;
   an input device;
   a display;
   an antenna;
   a TV phone pausing visual data selecting implementer, wherein a list of visual data is processed to be displayed from which a visual data is selected in accordance with user input;
   a TV phone implementer, wherein audiovisual communication is implemented with said another device;
   a TV phone pausing visual data transferring implementer, wherein, upon detecting the user instruction to pause the audiovisual communication, a TV phone pausing visual data which is the visual data selected by implementing said TV phone pausing visual data selecting implementer is transferred to said another device; and
   a digital camera implementer, wherein the output from a camera is stored with the image quality identified by the user in advance to said output;
   wherein said TV phone pausing visual data is transferred to said another device so as to be shown on the display of said another device in lieu of a certain visual data which is the visual data transferred from said communication device to said another device for the audiovisual communication.

2. A system comprising:
   a communication device, which is operable to implement audiovisual communication with another device, comprising a microphone, a speaker, an input device, a display, and an antenna;
   a TV phone pausing visual data selecting implementer, wherein a list of visual data is processed to be displayed on said communication device from which a visual data is selected in accordance with user input;
   a TV phone implementer, wherein said communication device implements audiovisual communication with said another device;
   a TV phone pausing visual data transferring implementer, wherein, upon detecting the user instruction of said communication device to pause the audiovisual communication, a TV phone pausing visual data which is the visual data selected by implementing said TV phone pausing visual data selecting implementer is transferred from said communication device to said another device; and
   a digital camera implementer, wherein the output from a camera is stored with the image quality identified by the user in advance to said output;
   wherein said TV phone pausing visual data is transferred to said another device so as to be shown on the display of said another device in lieu of a certain visual data which is the visual data transferred from said communication device to said another device for the audiovisual communication.

3. A method for a communication device, which is operable to implement audiovisual communication with another device, comprising a microphone, a speaker, an input device, a display, and an antenna, said method comprising:
   a TV phone pausing visual data selecting implementing step, wherein a list of visual data is processed to be displayed from which a visual data is selected in accordance with user input;
   a TV phone implementing step, wherein audiovisual communication is implemented with said another device;
   a TV phone pausing visual data transferring implementing step, wherein, upon detecting the user instruction to pause the audiovisual communication, a TV phone pausing visual data which is the visual data selected by implementing said TV phone pausing visual data selecting implementing step is transferred to said another device; and
   a digital camera implementing step, wherein the output from a camera is stored with the image quality identified by the user in advance to said output;
   wherein said TV phone pausing visual data is transferred to said another device so as to be shown on the display of said another device in lieu of a certain visual data which is the visual data transferred from said communication device to said another device for the audiovisual communication.

4. The communication device of claim 1, wherein said TV phone pausing visual data includes a motion picture data.

5. The communication device of claim 1, wherein said list of visual data includes the picture data retrieved from said camera of said communication device.

6. The communication device of claim 1, wherein said list of visual data includes the picture data produced by said communication device.

7. The communication device of claim 1, wherein said TV phone pausing visual data is displayed on said communication device and said another device simultaneously.

8. The communication device of claim 1, wherein said certain visual data indicates the visual data retrieved from said camera of said communication device.

9. The system of claim 2, wherein said TV phone pausing visual data includes a motion picture data.

10. The system of claim 2, wherein said list of visual data includes the picture data retrieved from said camera of said communication device.

11. The system of claim 2, wherein said list of visual data includes the picture data produced by said communication device.

12. The system of claim 2, wherein said TV phone pausing visual data is displayed on said communication device and said another device simultaneously.

13. The system of claim 2, wherein said certain visual data indicates the visual data retrieved from said camera of said communication device.

14. The method of claim 3, wherein said TV phone pausing visual data includes a motion picture data.

15. The method of claim 3, wherein said list of visual data includes the picture data retrieved from said camera of said communication device.

16. The method of claim 3, wherein said list of visual data includes the picture data produced by said communication device.

17. The method of claim 3, wherein said TV phone pausing visual data is displayed on said communication device and said another device simultaneously.

18. The method of claim 3, wherein said certain visual data indicates the visual data retrieved from said camera of said communication device.

* * * * *